US012415172B2

(12) United States Patent
Miansarigavzan et al.

(10) Patent No.: US 12,415,172 B2
(45) Date of Patent: Sep. 16, 2025

(54) SYSTEMS AND METHOD FOR AUTOMATED OLIGONUCLEOTIDE SYNTHESIS

(71) Applicant: Synthego Corporation, Redwood City, CA (US)

(72) Inventors: Morteza Miansarigavzan, Redwood City, CA (US); Sammy Datwani, Redwood City, CA (US)

(73) Assignee: Synthego Corporation, Redwood City, CA (US)

( * ) Notice: Subject to any disclaimer, the term of this patent is extended or adjusted under 35 U.S.C. 154(b) by 0 days.

(21) Appl. No.: 18/544,146

(22) Filed: Dec. 18, 2023

(65) Prior Publication Data
US 2024/0207804 A1  Jun. 27, 2024

Related U.S. Application Data

(60) Provisional application No. 63/445,536, filed on Feb. 14, 2023, provisional application No. 63/434,777, filed on Dec. 22, 2022.

(51) Int. Cl.
*B01J 19/18* (2006.01)
*B01J 19/00* (2006.01)

(52) U.S. Cl.
CPC .......... *B01J 19/0046* (2013.01); *B01J 19/18* (2013.01); *B01J 2219/0029* (2013.01);
(Continued)

(58) Field of Classification Search
None
See application file for complete search history.

(56) References Cited

U.S. PATENT DOCUMENTS 2,677,271 A * 5/1954 Faris, Jr. .................. G01N 3/20
73/789
4,121,289 A * 10/1978 Stiel .......................... A61J 3/10
702/41
(Continued)

FOREIGN PATENT DOCUMENTS

CN  201579035 U  9/2010
CN  205216837 U  5/2016
(Continued)

OTHER PUBLICATIONS

"Asahi Axial Compression Synthesis Columns" AsahiKASEI BioProcess. webpage <<https://fluidmgmt.ak-bio.com/products/asahi-acs-column/>> Accessed Mar. 15, 2024.
(Continued)

*Primary Examiner* — Jennifer A Leung
(74) *Attorney, Agent, or Firm* — Quarles & Brady, LLP

(57) ABSTRACT

A reactor system is disclosed. The reactor system includes a vessel configured to contain a solid support, the vessel including: a vessel wall defining a reaction chamber, the reaction chamber having a first end and a second end opposite the first end; a piston operatively arranged at the first end and configured to translate within the reaction chamber; a force measuring device coupled to the piston and configured to measure a load on the piston; a piston driver coupled to the piston; and a processor operably coupled to the force measuring device and the piston driver, the processor configured to: measure a load on the piston using the force measuring device, and adjust a position of the piston using the piston driver based on measuring the load on the piston.

24 Claims, 51 Drawing Sheets

(52) U.S. Cl.
CPC ........... *B01J 2219/00353* (2013.01); *B01J 2219/00477* (2013.01); *B01J 2219/00596* (2013.01); *B01J 2219/00686* (2013.01); *B01J 2219/00698* (2013.01); *B01J 2219/00722* (2013.01)

(56) References Cited

U.S. PATENT DOCUMENTS

| | | | |
|---|---|---|---|
| 4,299,794 | A | 11/1981 | Kelley |
| 4,680,958 | A * | 7/1987 | Ruelle .................... G01N 11/04 73/54.14 |
| 4,728,502 | A | 3/1988 | Hamill |
| 4,800,166 | A | 1/1989 | Horn |
| 4,861,866 | A * | 8/1989 | Durrum ................. C07K 1/045 530/333 |
| 5,112,575 | A | 5/1992 | Whitehouse |
| 5,190,075 | A | 3/1993 | Tentler |
| 5,273,715 | A | 12/1993 | Bridgham |
| 5,324,426 | A * | 6/1994 | Joseph .................. B01D 15/14 210/656 |
| 5,411,697 | A * | 5/1995 | McGraw ............... B30B 9/3007 428/903.3 |
| 5,460,786 | A * | 10/1995 | Nokihara ............. B01J 19/0046 422/138 |
| 5,681,474 | A * | 10/1997 | Gunther ............. G01N 30/6021 210/91 |
| 5,807,525 | A | 9/1998 | Allen |
| 5,851,494 | A * | 12/1998 | Dillard ................. B01J 19/0046 422/50 |
| 6,028,172 | A | 2/2000 | Stepaniuk |
| 6,036,923 | A | 3/2000 | Laugharn |
| 6,168,914 | B1 | 1/2001 | Campbell |
| 6,221,332 | B1 | 4/2001 | Thumm |
| 6,248,521 | B1 | 6/2001 | Van Ness |
| 6,335,438 | B1 | 1/2002 | Fonnum |
| 6,395,235 | B1 | 5/2002 | Kilcoin |
| 6,409,925 | B1 | 6/2002 | Gombinsky |
| 6,416,642 | B1 | 7/2002 | Alajoki |
| 6,537,817 | B1 | 3/2003 | Papen |
| 6,544,775 | B2 | 4/2003 | Brugger |
| 6,566,494 | B1 | 5/2003 | Jensen |
| 6,569,672 | B1 | 5/2003 | Laugharn |
| 6,613,580 | B1 | 9/2003 | Chow |
| 6,685,884 | B2 | 2/2004 | Stylli |
| 6,772,642 | B2 | 8/2004 | Hajduk |
| 6,858,186 | B2 | 2/2005 | Hilson |
| 6,887,990 | B1 | 5/2005 | Bhan |
| 6,899,137 | B2 | 5/2005 | Unger |
| 6,915,713 | B2 | 7/2005 | Kipke |
| 6,929,030 | B2 | 8/2005 | Unger |
| 6,949,176 | B2 | 9/2005 | Vacca |
| 7,013,709 | B2 | 3/2006 | Hajduk |
| 7,052,545 | B2 | 5/2006 | Unger |
| 7,101,515 | B2 | 9/2006 | Schwalbe |
| 7,132,053 | B2 * | 11/2006 | Hauck .................... B01D 15/20 210/656 |
| 7,150,994 | B2 | 12/2006 | Bergh |
| 7,160,511 | B2 | 1/2007 | Takahashi |
| 7,195,670 | B2 | 3/2007 | Hansen |
| 7,216,671 | B2 | 5/2007 | Unger |
| 7,223,363 | B2 | 5/2007 | McNeely |
| 7,250,128 | B2 | 7/2007 | Unger |
| 7,306,672 | B2 | 12/2007 | Hansen |
| 7,326,296 | B2 | 2/2008 | Quake |
| 7,431,685 | B2 | 10/2008 | Frey |
| 7,431,837 | B2 | 10/2008 | Cohee |
| 7,431,884 | B2 | 10/2008 | Ryan |
| 7,459,022 | B2 | 12/2008 | Hansen |
| 7,479,186 | B2 | 1/2009 | Quake |
| 7,517,440 | B2 | 4/2009 | Anex |
| 7,569,354 | B2 | 8/2009 | Okano |
| 7,644,759 | B2 | 1/2010 | Davidson |
| 7,670,429 | B2 | 3/2010 | Quake |
| 7,678,335 | B2 | 3/2010 | Kreuzer |
| 7,704,322 | B2 | 4/2010 | Hansen |
| 7,754,010 | B2 | 7/2010 | Unger |
| 7,763,685 | B2 | 7/2010 | Michielin |
| 7,766,055 | B2 | 8/2010 | Unger |
| 7,846,392 | B2 | 12/2010 | Chow |
| 7,867,757 | B2 | 1/2011 | Karlsen |
| 7,901,939 | B2 | 3/2011 | Ismagliov |
| 7,968,060 | B2 | 6/2011 | Tuyl |
| 8,021,480 | B2 | 9/2011 | Hansen |
| 8,104,497 | B2 | 1/2012 | Unger |
| 8,263,387 | B2 | 9/2012 | Pagano |
| 8,372,340 | B2 | 2/2013 | Bird |
| 8,382,896 | B2 | 2/2013 | Hansen |
| 8,414,774 | B2 | 4/2013 | LaMarr |
| 8,486,340 | B2 | 7/2013 | Lee |
| 8,491,178 | B2 | 7/2013 | Breidenthal |
| 8,500,852 | B2 | 8/2013 | Galbraith |
| 8,546,561 | B2 | 10/2013 | Kilambi |
| 8,550,119 | B2 | 10/2013 | Unger |
| 8,592,498 | B2 | 11/2013 | Enomura |
| 8,597,592 | B2 | 12/2013 | Wang |
| 8,656,958 | B2 | 2/2014 | Unger |
| 8,709,152 | B2 | 4/2014 | Hansen |
| 8,784,745 | B2 | 7/2014 | Nelson |
| 8,791,176 | B2 | 7/2014 | Van De Runstraat |
| 8,920,752 | B2 | 12/2014 | Tisone |
| 9,034,272 | B2 | 5/2015 | Cedillo |
| 9,069,358 | B2 | 6/2015 | Demmitt |
| 9,221,921 | B2 | 12/2015 | Fourarge |
| 9,273,308 | B2 | 3/2016 | Link |
| 9,519,000 | B2 | 12/2016 | Wilson |
| 9,522,380 | B2 | 12/2016 | Herman |
| 9,545,737 | B2 | 1/2017 | Henn |
| 9,555,342 | B2 | 1/2017 | Wheeler |
| 9,643,136 | B2 | 5/2017 | Hansen |
| 9,651,568 | B2 | 5/2017 | Putnam |
| 9,670,451 | B2 | 6/2017 | Dilorenzo |
| 9,695,214 | B2 | 7/2017 | Simon |
| 9,764,060 | B2 | 9/2017 | Nazhat |
| 9,921,166 | B2 | 3/2018 | Glezer |
| 9,931,636 | B2 | 4/2018 | Ching |
| 9,968,902 | B2 | 5/2018 | Chu |
| 9,993,818 | B2 | 6/2018 | Taylor |
| 10,105,705 | B2 | 10/2018 | Chen |
| 10,155,250 | B2 | 12/2018 | Chou |
| 10,227,377 | B2 | 3/2019 | Avallin |
| 10,731,181 | B2 | 8/2020 | Chen |
| 10,955,067 | B2 | 3/2021 | Laser |
| 11,014,060 | B2 | 5/2021 | Ledwon |
| 11,071,964 | B2 | 7/2021 | Garcia |
| 11,191,723 | B2 | 12/2021 | Panagiotou |
| 11,318,440 | B2 | 5/2022 | Guthrie |
| 11,406,980 | B2 | 8/2022 | Blainey |
| 11,439,970 | B2 | 9/2022 | Nguyen |
| 11,484,858 | B2 | 11/2022 | Slager |
| 11,610,652 | B2 | 3/2023 | Aykol |
| 11,623,201 | B2 | 4/2023 | Ramezani |
| 11,633,736 | B2 | 4/2023 | Cauley |
| 11,685,889 | B2 | 6/2023 | Garst |
| 11,708,553 | B2 | 7/2023 | Govind |
| 11,740,255 | B2 | 8/2023 | Foley |
| 11,766,655 | B2 | 9/2023 | Ledwon |
| 11,801,485 | B2 | 10/2023 | Doering |
| 2001/0043883 | A1 | 11/2001 | Chalk |
| 2002/0100714 | A1 | 8/2002 | Staats |
| 2002/0187564 | A1 | 12/2002 | Chow |
| 2003/0086829 | A1 | 5/2003 | Livesay |
| 2004/0181343 | A1 | 9/2004 | Wigstrom |
| 2005/0112674 | A1 | 5/2005 | Palti |
| 2005/0158213 | A1 | 7/2005 | Tsudome |
| 2005/0169816 | A1 | 8/2005 | Kirshner |
| 2005/0272144 | A1 | 12/2005 | Sando |
| 2007/0169686 | A1 | 7/2007 | Quake |
| 2007/0258862 | A1 | 11/2007 | Vann |
| 2008/0177054 | A1 | 7/2008 | Evans |
| 2008/0277007 | A1 | 11/2008 | Unger |
| 2009/0053732 | A1 | 2/2009 | Vermesh |
| 2009/0291505 | A1 | 11/2009 | Sarofim |
| 2010/0184232 | A1 | 7/2010 | Jepsen |

(56) References Cited

U.S. PATENT DOCUMENTS

| | | |
|---|---|---|
| 2011/0259831 A1 | 10/2011 | Brandt |
| 2012/0047668 A1 | 3/2012 | David |
| 2012/0135404 A1 | 5/2012 | Schwoebel et al. |
| 2012/0171090 A1 | 7/2012 | Chang |
| 2012/0315211 A1 | 12/2012 | Mahamuni |
| 2014/0097353 A1 | 4/2014 | Ben-Hur |
| 2015/0276089 A1 | 10/2015 | Unger |
| 2016/0244547 A1 | 8/2016 | Jagannathan |
| 2019/0314777 A1 | 10/2019 | Li |
| 2019/0366293 A1 | 12/2019 | Banyai et al. |
| 2020/0222905 A1 | 7/2020 | Hill |
| 2020/0254410 A1 | 8/2020 | Inaka |
| 2021/0023514 A1 | 1/2021 | Ramsay |
| 2021/0039106 A1 | 2/2021 | Eldridge |
| 2021/0061844 A1 | 3/2021 | Slavazza |
| 2021/0155476 A1 | 5/2021 | Futerman |
| 2021/0187468 A1 | 6/2021 | Gilmore |
| 2021/0214664 A1 | 7/2021 | Rao |
| 2022/0064208 A1 | 3/2022 | Kreuzer |
| 2022/0090183 A1 | 3/2022 | Hill |
| 2022/0118455 A1 | 4/2022 | Jebrail |
| 2022/0307079 A1 | 9/2022 | Hodko |
| 2022/0339598 A1 | 10/2022 | Mueller |
| 2022/0362770 A1 | 11/2022 | Blainey |
| 2022/0372466 A1 | 11/2022 | Xie |
| 2022/0380718 A1 | 12/2022 | Komuckzi |
| 2023/0026870 A1 | 1/2023 | Seeberger |
| 2023/0041595 A1 | 2/2023 | Wu |
| 2023/0083189 A1 | 3/2023 | Burgess |
| 2023/0135860 A1 | 5/2023 | Sillard |
| 2023/0149887 A1 | 5/2023 | Rogers |
| 2023/0158468 A1 | 5/2023 | Johnson |
| 2023/0219043 A1 | 7/2023 | Link |
| 2023/0257658 A1 | 8/2023 | Hoffman |
| 2023/0271155 A1 | 8/2023 | Bickmore |
| 2023/0279512 A1 | 9/2023 | Masters |

FOREIGN PATENT DOCUMENTS

| | | | |
|---|---|---|---|
| EP | 0933125 A1 | 8/1998 | |
| EP | 0386238 A1 | 9/1999 | |
| EP | 0934113 A1 | 4/2002 | |
| EP | 937096 A2 | 2/2004 | |
| EP | 1485204 B1 | 2/2006 | |
| EP | 1324829 B1 | 12/2007 | |
| EP | 1345551 B1 | 4/2009 | |
| EP | 1718411 A1 | 4/2010 | |
| EP | 1392484 B1 | 6/2013 | |
| EP | 3341112 A1 | 7/2018 | |
| EP | 2402460 B1 | 5/2019 | |
| EP | 3749740 B1 | 12/2020 | |
| EP | 4208286 A1 | 7/2023 | |
| EP | 4217112 A1 | 8/2023 | |
| EP | 4251326 A2 | 10/2023 | |
| GB | 2561982 A | 10/2018 | |
| SU | 1650240 A1 | 5/1991 | |
| WO | 2000070353 A2 | 11/2000 | |
| WO | 2001019518 A1 | 3/2001 | |
| WO | 2004064999 A2 | 8/2004 | |
| WO | 2004104228 A1 | 12/2004 | |
| WO | 2006043642 A1 | 4/2006 | |
| WO | 2008024319 A2 | 2/2008 | |
| WO | 2010141361 A1 | 12/2010 | |
| WO | 2017023380 A1 | 2/2017 | |
| WO | 2018060354 A1 | 4/2018 | |
| WO | 2018197421 A1 | 4/2018 | |
| WO | 2019035998 A1 | 2/2019 | |
| WO | 2021138210 A1 | 7/2021 | |
| WO | 2021148818 A1 | 7/2021 | |
| WO | 2021188032 A1 | 9/2021 | |
| WO | 2022068937 A1 | 4/2022 | |
| WO | WO-02095390 A1 * | 11/2022 | ........... B01D 15/206 |
| WO | 2023004035 A1 | 1/2023 | |
| WO | 2023035003 A1 | 3/2023 | |
| WO | 2023044569 A1 | 3/2023 | |

OTHER PUBLICATIONS

"Cytiva: Adjustable Oligo Column", webpage <<cytivalifesciences.com/en/us/shop/oligonucleotide-synthesis/columns/adjustable-oligo-column-for-oligopilot-oligonucleotide-synthesizers-p-03868>> Accessed Mar. 15, 2024.

"Cytiva: Columns" webpage <<https://www.cytivalifesciences.com/en/us/shop/oligonucleotide-synthesis/columns?sort=NameAsc&chunk=1>> Accessed Mar. 15, 2024.

"Galak Chromatography: Glass Chromatography Columns," webpage <<https://galaklc.com/compression-glass-column/>> Accessed Mar. 18, 2024.

"Vapourtec: Precision Flow Chemistry: Variable Bed Flow Reactor (VBFR)" webpage <<https://.vapourtec.com/products/flow-reactors/variable-bed-flow-reactor-features/>> Accessed Mar. 15, 2024.

"YMC Europe GMBH: YMC-Actus: Semi-preparative HPLC columns." webpage <<https://ymc.eu/ymc-actus.html>> Accessed Mar. 15, 2024.

"YMC Home: Preparative LC systems: ECO Plus series (Glass column)" webpage <<https://.ymc.co.jp/en/chromato/glass/eco_plus_glass_columns.html>> Accessed Mar. 15, 2024.

United Kingdom Intellectual Property Office, "Patents Act 1977: Search Report under Section 17" issued for Application No. GB1806565.6, dated Jul. 24, 2018. 2 pages.

International Searching Authority, International Search Report and Written Opinion for International Patent Application No. PCT/US2023/084644, dated Apr. 23, 2024.

* cited by examiner

Prior art
Common Solid Phase Oligonucleotide (RNA) Synthesis Cycle
100

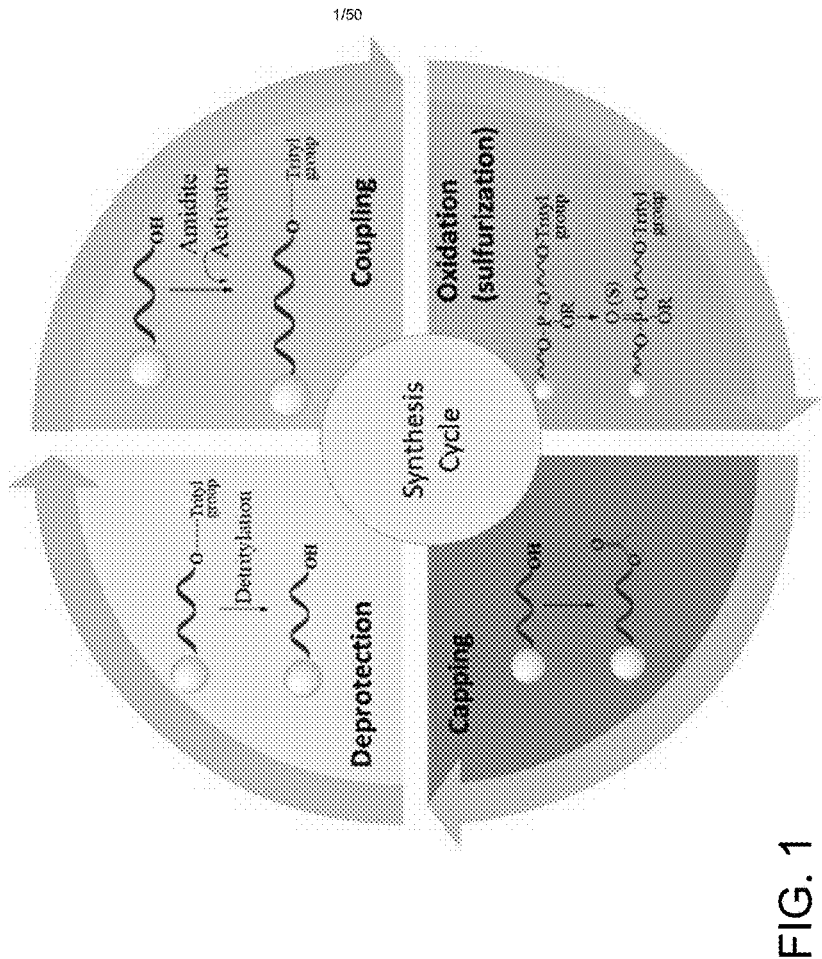

Steps of Synthesis:

- Deblocking: Using DiChloroacetic Acid in small quantities allows us to break the DMT bond off of the 5' Hydroxyl group. (Detritylation)
- Coupling: A 50:50 mix of 5-(Benzylthio)-1H-tetrazole (BTT) Activator and the desired amidite allows the amidite to bond to the existing oligo chain
- Oxidation: After coupling, Iodine and Pyridine convert stabilize the phosphorus backbone to strengthen the bond between the bases
- Sulfonation (instead of Oxidation): Stabilizes bond with a sulfur double bond. This both increases stability and prevents RNase degradation
- Capping: Any strand that does not receive an amidite during coupling instead receives an acetyl cap from a 50:50 mix of Acetic Anhydride and 1-Methyl-imidazole

FIG. 1

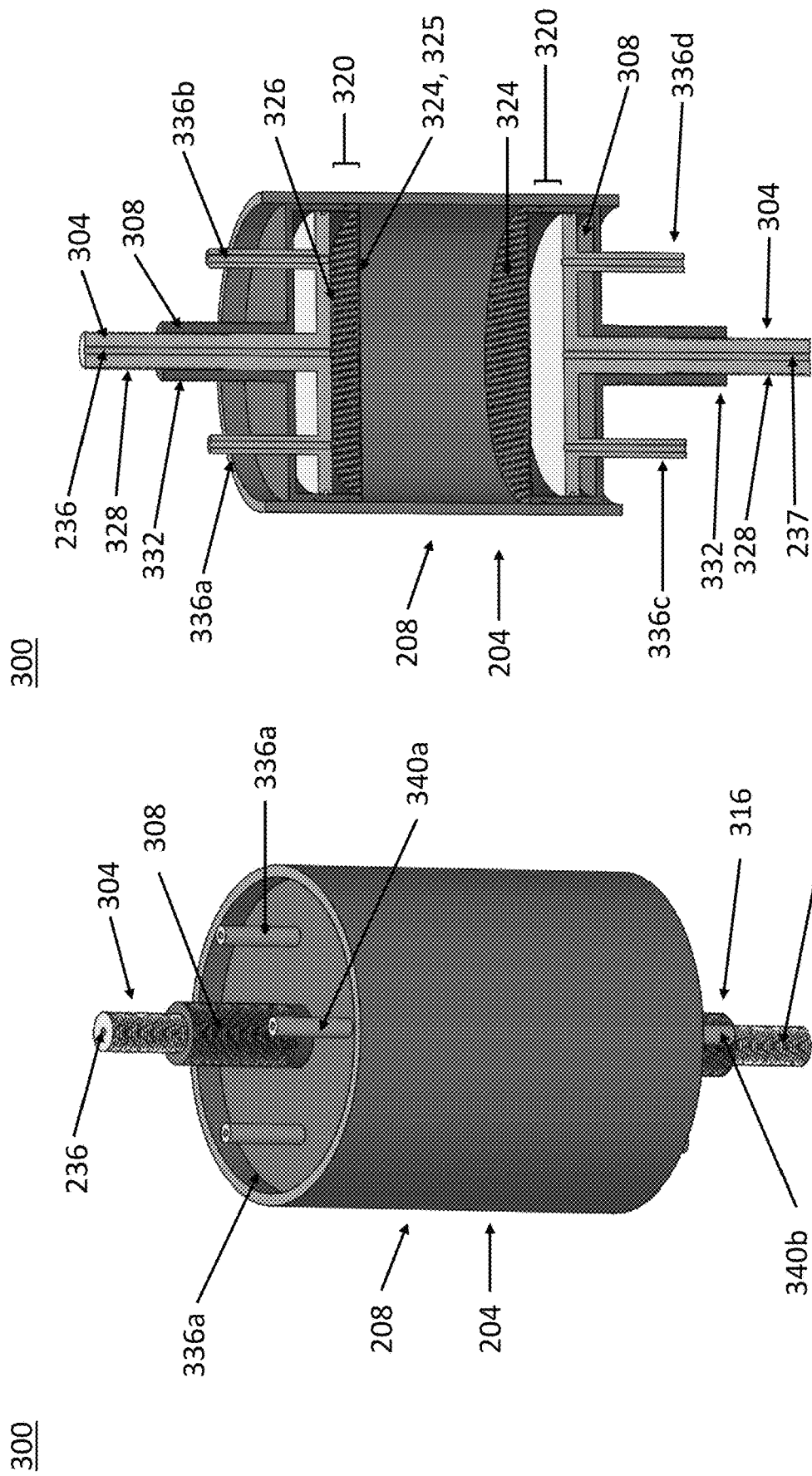

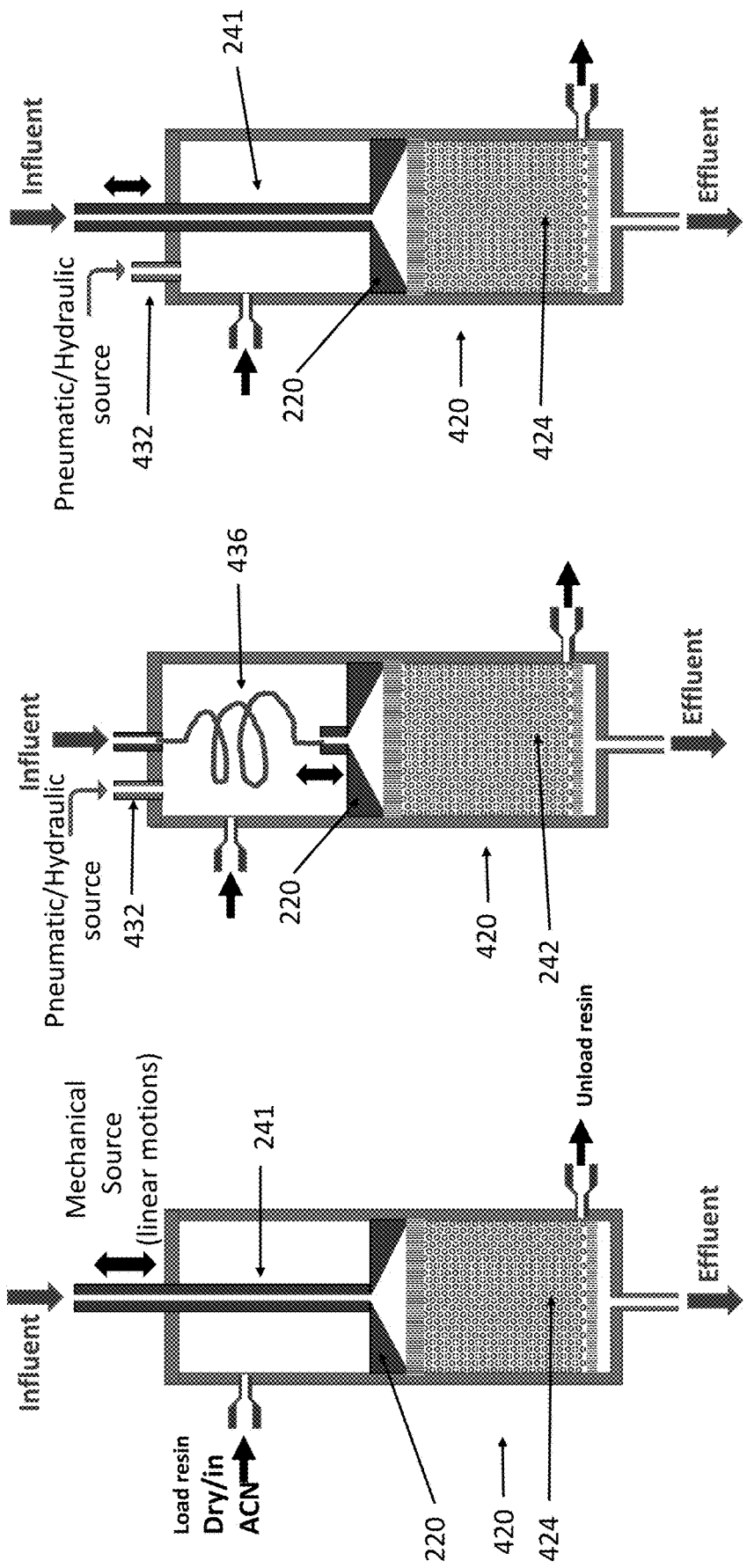

Integrated Degasser and Heat Exchanger

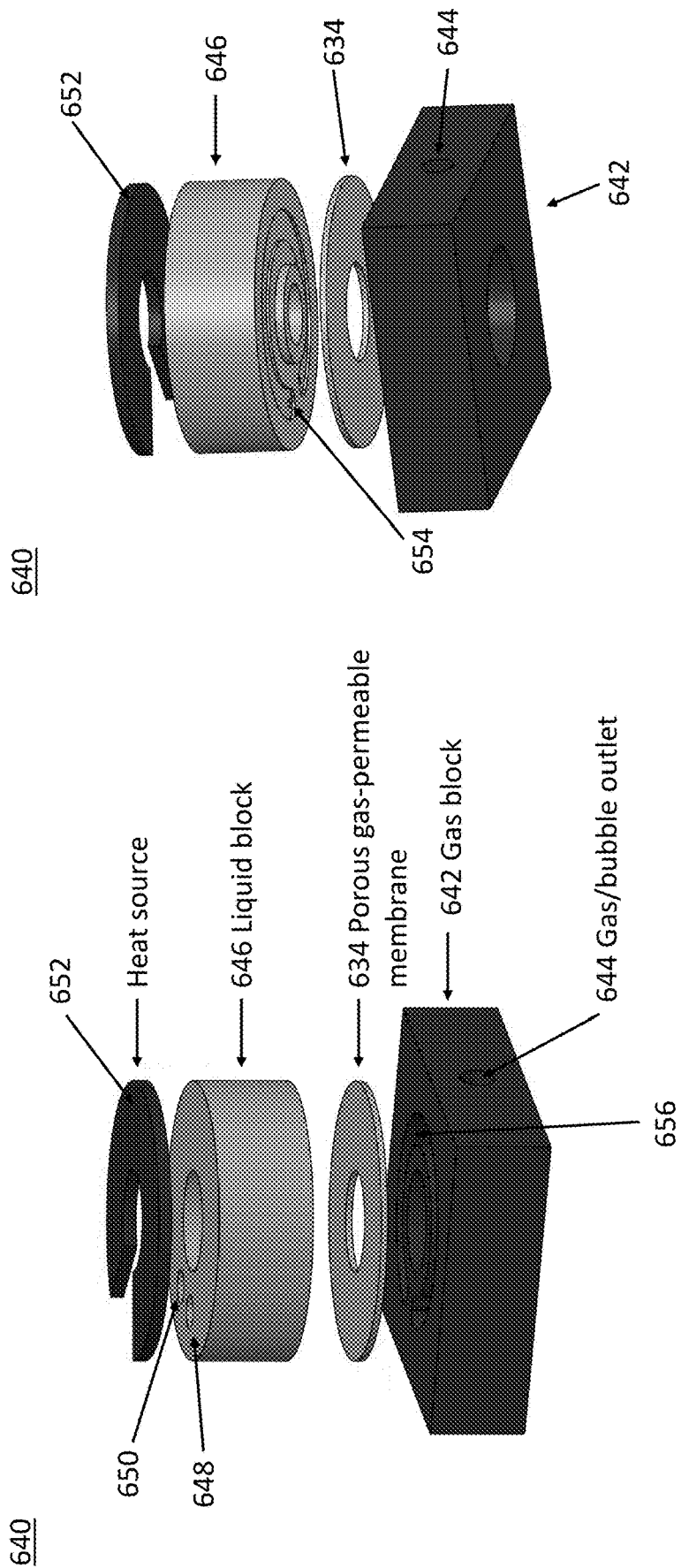

SYSTEMS AND METHOD FOR AUTOMATED OLIGONUCLEOTIDE SYNTHESIS

CROSS-REFERENCE TO RELATED APPLICATIONS

The present application claims the benefit of priority to U.S. Provisional Application No. 63/434,777, filed Dec. 22, 2022, and to U.S. Provisional Application No. 63/445,536, filed Feb. 14, 2023, the contents of each of which are incorporated herein by reference in their entirety.

BACKGROUND

Synthesis of oligonucleotides such as RNA from a solid support requires a series of steps in a synthesis cycle with one nucleotide added to the growing oligonucleotide chain every cycle, as shown in diagram 100 of FIG. 1. The cycle begins with deprotecting a protected base attached to a solid support through the removal of a trityl group by the addition of an acid such as dichloroacetic acid. Once deprotected, the oligonucleotide is coupled to an amidite corresponding to the base to be added to the growing RNA chain. The resultant oligonucleotide then undergoes oxidation or sulfonation to stabilize the RNA backbone, followed by a capping reaction where each oligonucleotide that does not receive an amidite during coupling receives instead an acetyl cap. Oligonucleotides that successfully add the amidite are then deprotected, and the cycles starts over again.

Small-scale synthesis of short oligonucleotides (e.g., 15 bases to 40 bases) are readily performed in an automated fashion via oligonucleotide synthesizers using commercially available columns, or reactors, containing solid supports specific for oligonucleotide synthesis, such as controlled pore glass (CPG) solid supports. However, there is a growing demand for large-scale synthesis of longer oligonucleotides, such as oligonucleotides for CRISPR protocols that are routinely over 80 bases long. Current synthesizers and columns are not optimized for large scale/long oligonucleotide preparations, which can lead to several problems during synthesis. For example, because step-wise efficiency in each cycle of synthesis is typically less than 100% the longer the oligonucleotide, the lower the overall efficiency, and the number of undesired oligomers (e.g., truncations, deletions, and depurinations) increases. The synthesizer and columns may not appropriately handle the larger quantities of materials, resulting in fouling or clogging of the fluid distributors, diffusers, and the solid support, which can also lead to high back pressures. High back pressures can lead to part failures, changes in reaction rates, incomplete synthesis, and under or over exposure of the solid support to reagents. Further, columns in large scale synthesis are susceptible to nonuniform packing of the solid support and/or resins inside the column, causing void formation and/or flow channeling. These columns are also prone to form nonuniform distribution of fluids and reagents throughout the solid support, leading to the solid supports and/or resins being exposed to reagents at different times and at different concentrations, resulting in reduced yields. Therefore, a device, system, or method of increasing the efficiency of large scale synthesis of long oligonucleotides over current devices, systems and methods is desired.

SUMMARY

A reactor system is disclosed. The reactor system includes a vessel configured to contain a solid support, the vessel including: a vessel wall defining a reaction chamber, the reaction chamber having a first end and a second end opposite the first end; a piston operatively arranged at the first end and configured to translate within the reaction chamber; a force measuring device coupled to the piston and configured to measure a load on the piston; a piston driver coupled to the piston; and a processor operably coupled to the force measuring device and the piston driver, the processor configured to: measure a load on the piston using the force measuring device, and adjust a position of the piston using the piston driver based on measuring the load on the piston. In various embodiments of the reactor system, the piston may include a piston head and a piston shaft, where the force measuring device may be coupled to the piston shaft.

Various embodiments of the reactor system may include an inlet disposed at the first end of the reaction chamber and configured to receive an influent; and/or an outlet disposed at the second end of the reaction chamber and configured to release an effluent. Some embodiments of the reactor system may further include a flow distribution unit coupled to the piston and disposed within the vessel adjacent the reaction chamber, wherein the flow distribution unit includes a plurality of flow distribution channels, wherein a first end of each of the plurality of flow distribution channels is fluidly coupled to the inlet, and wherein a second end of each of the plurality of flow distribution channels is fluidly coupled to the reaction chamber. In particular embodiments of the reactor system, the flow distribution unit may include a modular flow distribution unit including a distributor head coupled to a distributor cap with a filter disposed therebetween, wherein the plurality of flow distribution channels is disposed within the distributor head. In some embodiments of the reactor system the flow distribution unit may be an inlet flow distribution unit and the reactor system may further include an outlet flow distribution unit which includes a modular flow distribution unit coupled to the outlet.

Some embodiments of the reactor system may further include a pressure sensor operatively coupled to the processor and configured to measure a pressure within the vessel, and the processor may be further configured to obtain a measurement of the pressure within the vessel from the pressure sensor, and adjust the pressure within the vessel based on the measurement of the pressure including at least one of adjusting the position of the piston or actuating a pressure-control device including a valve.

Various embodiments of the reactor system may further include a solid support disposed within the reaction vessel, and a distance sensor operatively coupled to the processor and configured to measure a distance between the piston and the solid support, and the processor may be further configured to obtain a measurement of the distance between the piston and the solid support, and adjust the position of the piston based on the measurement of the distance. In some embodiments of the reactor system, information regarding the distance between the piston and the solid support may be obtained using information from the force measuring device coupled to the piston, which can be determined at least in part on whether the piston is or has been in contact with the solid support. In certain embodiments of the reactor system the solid support may be configured to support at least one of: oligonucleotide synthesis, pretreatment, cleavage, deprotection, or purification.

In certain embodiments of the reactor system, the piston may be a first piston and the reactor system may further include a second piston operatively arranged at the second end of the reaction chamber and configured to translate within the reaction chamber. In particular embodiments of the reactor system, the vessel may further include at least one of: a sampling port, a loading port configured to facilitate loading of the solid support into the reaction chamber, or an unloading port configured to facilitate unloading of the solid support out of the reaction chamber.

In various embodiments of the reactor system, the force measuring device may include at least one of a load cell or a strain gauge and the piston driver may drive the piston using at least one of mechanical, hydrodynamic, or pneumatic force. In certain embodiments of the reactor system, the load on the piston measured by the force measuring device may be proportional to a pressure within the reaction chamber.

Particular embodiments of the reactor system may further include a sensor coupled to the inlet, wherein the sensor may include at least one of a flow sensor, a pH sensor, a conductivity sensor, a thermal sensor, a Raman sensor, a mid-IR sensor, or a spectrometer including UV spectrometer. Some embodiments of the reactor system may further include a fluid conditioner fluidly coupled to the inlet, wherein the fluid conditioner may include at least one of a heat exchanger, a degasser, a de-bubbler, or a gas dryer.

In some embodiments of the reactor system, the piston may include a flow distribution plate including a plurality of pores. In various embodiments of the reactor system, the plurality of pores of the flow distribution plate may include different size openings, and the different size openings of the plurality of pores may be distributed in a radial pattern across the flow distribution plate.

In particular embodiments of the reactor system, the processor may be further configured to: collect a plurality of real-time data based on obtaining a plurality of measurements of the load on the piston using the force measuring device, wherein the plurality of real-time data may indicate at least one of a reaction chemistry or flow dynamics within the reaction chamber, and adjust the position of the piston using the piston driver based on collecting the plurality of real-time data to adjust at least one of a system or operational parameter in real time.

In some embodiments of the reactor system, the vessel may further include a piston head disposed at an end of the piston and a plurality of crossflow ports coupled to the piston head, where the plurality of crossflow ports may be configured to add or remove fluid from a space between the piston head and a solid support disposed within the reaction chamber.

In certain embodiments of the reactor system, the piston head may include an inner piston head and a porous outer piston head that is configured to be disposed adjacent a solid support disposed within the reaction chamber. In some embodiments of the reactor system, the plurality of crossflow ports may be configured to circulate fluid in a space between the inner piston head and the porous outer piston head to reduce or prevent fouling or clogging of the porous outer piston head. In particular embodiments of the reactor system, the porous outer piston head may be or include a filter screen. In various embodiments of the reactor system, the inner and outer piston heads may be adjustable relative to one another or may be fixed with the result that the space between the inner and outer pistons, sometimes referred to herein as head space, may be adjustable or may be fixed.

Some embodiments of the reactor system may further include an inlet disposed at the first end of the reaction chamber and configured to receive an influent. The vessel may further include an inner piston head disposed at an end of the piston, where the inner piston head may include a perforated inlet distributor, and a porous outer piston head configured to be disposed adjacent a solid support disposed within the reaction chamber. The inlet may be coupled to the perforated inlet distributor and the perforated inlet distributor may be configured to direct fluid from the inlet in a plurality of directions into a space between the inner piston head and the porous outer piston head.

In various embodiments of the reactor system, the vessel may further include an inner piston head disposed at an end of the piston and a porous outer piston head configured to be disposed adjacent a solid support disposed within the reaction chamber. The space between the inner piston head and the porous outer piston head may include a head space and a volume of the head space may be fixed or adjustable. In certain embodiments of the reactor system, the head space may include at least one of a filter, a porous material, a screen, or a reagent. In some embodiments which include fixed head space, the vessel may not include a porous outer piston. Instead, in certain embodiments the porous outer piston may be replaced by a filter screen and the fixed head space may be directly designed into the inner piston head itself. Therefore, in particular embodiments of the system, the vessel may further include an inner piston head disposed at an end of the piston and a filter screen configured to be disposed adjacent a solid support disposed within the reaction chamber, where the space between the inner piston head and the filter screen may include a head space and where a volume of the head space may be fixed.

In various embodiments of the reactor system, an outer wall of the vessel may be in contact with a heat exchanger which at least one of heats or cools the vessel. The heat exchanger may include at least one of fluid circulation, microwave heating, inductive heating, or Peltier heating/cooling. In certain embodiments of reactor system, an outer wall of the vessel may be in contact with an ultrasonic generator which is configured to agitate the vessel.

A method of operating a reactor is disclosed. The method may include providing a vessel configured to contain a solid support, wherein the vessel may include a vessel wall defining a reaction chamber, the reaction chamber having a first end and a second end opposite the first end, a piston operatively arranged at the first end and configured to translate within the reaction chamber, a force measuring device coupled to the piston and configured to measure a load on the piston, and a piston driver coupled to the piston, and a processor operably coupled to the force measuring device and the piston driver; measuring, using the processor, a load on the piston using the force measuring device; and adjusting, using the processor, a position of the piston using the piston driver based on measuring the load on the piston.

In some embodiments of the method, providing a vessel may further include providing an inlet disposed at the first end of the reaction chamber and configured to receive an influent, and providing an outlet disposed at the second end of the reaction chamber and configured to release an effluent; and the method may further include at least one of: delivering the influent to the reaction chamber via the inlet, or obtaining the effluent from the reaction chamber via the outlet.

In various embodiments of the method providing the vessel may further include providing the force measuring device including at least one of a load cell or a strain gauge, and providing the piston driver wherein the piston driver drives the piston using at least one of mechanical, hydrodynamic, or pneumatic force.

In particular embodiments of the method, providing the vessel may further include providing a pressure sensor coupled to the reaction chamber and the method may further include measuring a pressure within the reaction chamber using the pressure sensor. In some embodiments of the method, upon measuring an increase in pressure, adjusting the position of the piston may further include adjusting the position of the piston to increase a volume of the reaction chamber and reduce a pressure within the reaction chamber. In some embodiments of the method, upon measuring a decrease in pressure, adjusting the position of the piston may further include adjusting the position of the piston to decrease a volume of the reaction chamber and increase a pressure within the reaction chamber.

In various embodiments of the method, providing the vessel may further include providing a sensor coupled to the inlet, wherein the sensor may include at least one of a flow sensor, a pH sensor, a conductivity sensor, a thermal sensor, a Raman sensor, a mid-IR sensor, or a spectrometer; and delivering the influent to the reaction chamber may further include measuring a property of the influent using the sensor.

In some embodiments of the method, providing the vessel may further include providing a fluid conditioner coupled to the inlet, wherein the fluid conditioner may include at least one of a heat exchanger, a degasser, a de-bubbler, or a gas dryer; and wherein delivering the influent to the reaction chamber may further include adjusting a property of the influent using the fluid conditioner.

In certain embodiments of the method, providing the vessel may further include providing a flow distribution unit coupled to the piston and disposed within the vessel adjacent the reaction chamber, wherein the flow distribution unit is fluidly coupled to the inlet; and wherein delivering the influent to the reaction chamber may further include delivering the influent to the reaction chamber using the flow distribution unit. In various embodiments of the method, providing the flow distribution unit may further include providing the flow distribution unit, wherein the flow distribution unit may include a plurality of flow distribution channels, wherein a first end of each of the plurality of flow distribution channels is fluidly coupled to the inlet, and wherein a second end of each of the plurality of flow distribution channels is fluidly coupled to the reaction chamber; and wherein delivering the influent to the reaction chamber may further include delivering the influent to the reaction chamber using each of the plurality of flow distribution channels of the flow distribution unit.

A modular flow distribution unit is provided. The modular flow distribution unit may include a distributor head include a central channel at a first end; a distributor cap coupled to a second end of the distributor head opposite the first end; and a filter disposed between the distributor head and the distributor cap at the second end of the distributor head. In some embodiments of the modular flow distribution unit, the distributor head may include a plurality of flow distribution channels, wherein a first end of each of the plurality of flow distribution channels is fluidly coupled to the central channel at the first end of the distributor head, and wherein a second end of each of the plurality of flow distribution channels is fluidly coupled to the second end of the distributor head. In some embodiments of the modular flow distribution unit, the plurality of flow distribution channels may branch outward from a central outlet. In various embodiments of the modular flow distribution unit, the distributor head and the distributor cap may be made from chemical-resistant materials at least one of natural PEEK, stainless steel, or Teflon. In some embodiments of the modular flow distribution unit, the distributor head may further include at least one input port to provide for at least one of a cross flow or a sensor.

BRIEF DESCRIPTION OF THE DRAWINGS

The detailed description is described with reference to the accompanying figures. The use of the same reference numbers in different instances in the description and the figures may indicate similar or identical items. Various embodiments or examples of the present disclosure are disclosed in the following detailed description and the accompanying drawings. The drawings are not necessarily to scale. In general, operations of disclosed processes may be performed in an arbitrary order, unless otherwise provided in the claims.

FIG. 1 is a flow diagram of an oligomer synthesis cycle, in accordance with one or more embodiments of the disclosure.

FIG. 2A is a drawing illustrating a perspective view of a reactor, in accordance with one or more embodiments of the disclosure.

FIG. 2B is a drawing illustrating a cutaway side view of the reactor of FIG. 2A, in accordance with one or more embodiments of the disclosure.

FIGS. 6B-6F are drawings illustrating cutaway-side views of a reactor, in accordance with one or more embodiments of the disclosure.

FIGS. 16A-16D are drawings illustrating a degasser module, in accordance with one or more embodiments of the disclosure.

DETAILED DESCRIPTION

Figure 3:
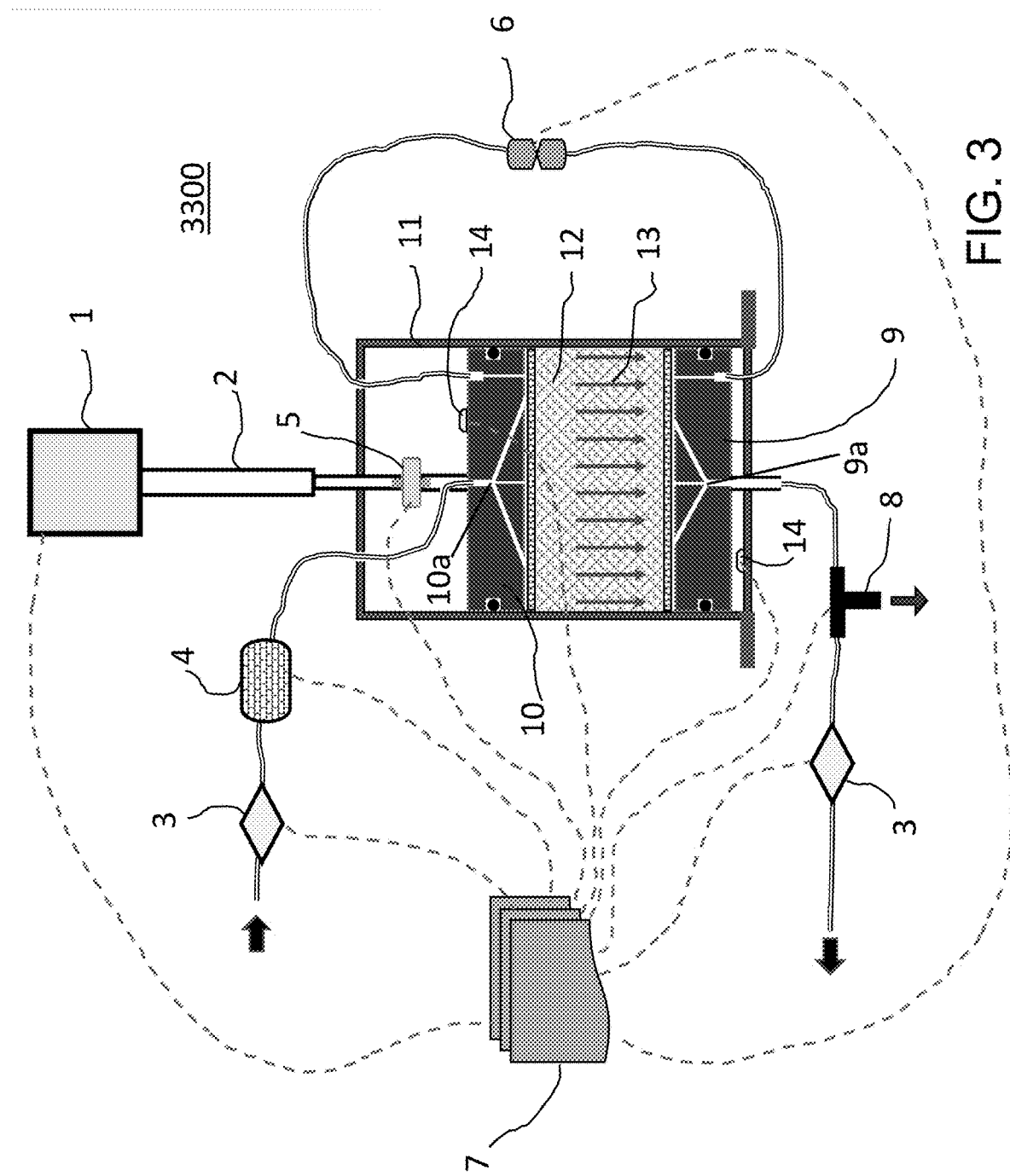
FIG. 3 provides a diagram of a reactor system in accordance with one or more embodiments of the disclosure.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "an embodiment", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Described herein are embodiments of a reactor, or column, for the synthesis of oligonucleotides, and of oligonucleotide synthesizer systems configured to use the reactor. The reactor includes a vessel configured to hold a solid support, such as a solid support for oligonucleotide synthesis. The reactor includes an inlet for receiving an influent, and an outlet for releasing an effluent. The reactor further includes a first end, and a first piston operatively arranged at the first end, configured to translate within the vessel. The first piston is configured such that the adjustment of the first piston within the vessel may improve the packing density and flow characteristics of the influent through the solid support. The reactor may also include a second end, and a second piston operatively arranged at the second end, configured to translate within the vessel. Similar to the first piston, the adjustment of the second piston may also improve the packing density and flow characteristics of the influent through the solid support. Systems and methods that include the reactor are also described.

A reactor (and the supports therein, such as solid supports) according to various embodiments may be used for the purification and/or synthesis and post-processing of products and may be used for the isolation of single chemical compounds from a mixture, such as isolation of a single oligonucleotide that is synthesized within the reactor or the isolation of plasmid DNA from a bacterial preparation, as well as steps of pretreatment, cleavage, deprotection, and/or purification. In this regard, the reactor may be similar to a column, such as a column used in column chromatography. In an embodiment, the reactor may be configured for oligonucleotide synthesis. For instance, the reactor may be couplable to an oligonucleotide synthesis system, where the reactor is the site of oligonucleotide synthesis. In another example, the reactor may be configured for peptide synthesis. In another example, the reactor may be used for purification of proteins or nucleic acids, such as the purification of affinity tagged proteins or plasmids from a solution containing cellular material (e.g., lysed cells). The reactor includes a vessel that further includes a vessel wall surrounding a hollow space (e.g., the vessel wall forming a hollow three dimensional shape, such as a hollow cylinder). The vessel houses the solid support or other matrix required for oligonucleotide synthesis or other synthesis/purification. The vessel may have a size, shape, or dimension of any type of open container, such as the shape of a hollow cylinder as shown in FIGS. 2A and 2B. Embodiments of the disclosed device may be made in a compact and/or enclosed housing that may be suitable for placement in a laboratory, e.g., on a benchtop.

The vessel includes a first end disposed at one end of the shape formed by the vessel wall (e.g., one end of the hollow cylinder). The reactor may further include a first piston operatively arranged at the first end. The first piston is configured to create a seal along the inner circumference of the vessel and translate back and forth along the length of the vessel. The reactor is configured such that first piston may be translated to a position relative to the solid support that may improve a flow characteristic of the reactor. Improved flow characteristics include but are not limited to lower influent pressure (e.g., lower back pressure), improved uniform flow across the solid support, increased flow, decreased void formation, and decreased head space (e.g., decreased space between the piston head of the first piston and the solid support). The first piston may also be used to push the influent through the solid support.

In some embodiments, the vessel further includes a second end disposed opposite of the first end. The reactor may include a second piston operatively arranged at the second end. Similar to the first piston, the second piston may be configured to create a seal along the inner circumference of the vessel and translate back and forth along the length of the vessel and may be translated to a position relative to the solid support that may improve flow characteristics of the reactor as mentioned above. The second piston may also be used to push and/or pull the influent and through the solid support.

The reactor further includes an inlet configured to receive an influent, and an outlet configured to release an effluent. However, the inlet may at times release an effluent, and the outlet may at time receive an influent, depending on the direction that fluid is being pumped through the reactor. The inlet and the outlet are operatively coupled to the first piston and second piston such that the fluid travels through a port located on or adjacent to the pistons. The inlet and/or the outlet may be disposed at a stem of the piston or may be disposed along a non-stem portion.

Figure 17:
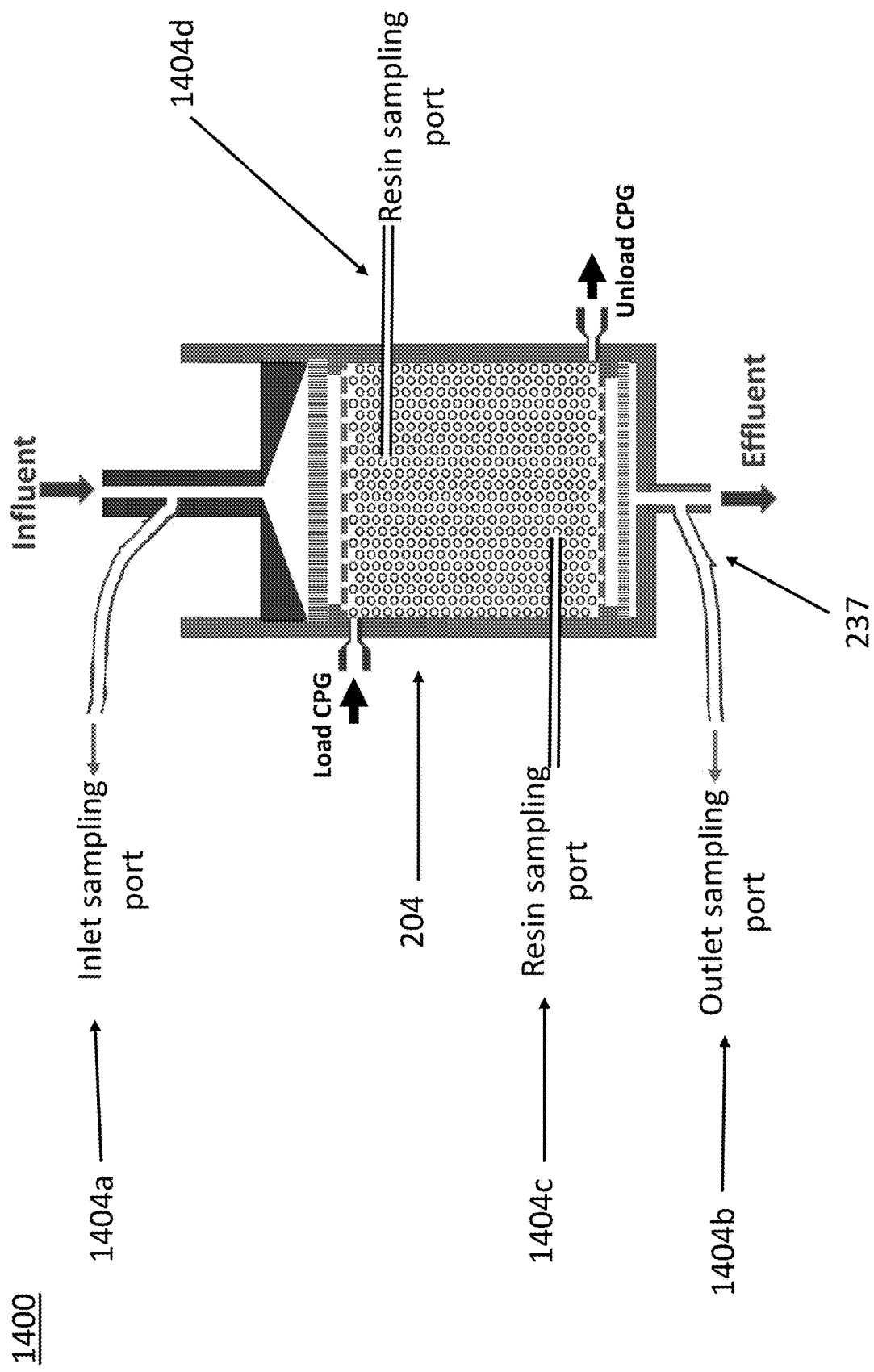
FIG. 17 is a drawing illustrating a cutaway side view of a reactor, in accordance with one or more embodiments of the disclosure.

In embodiments, the reactor further includes a loading port configured to facilitate loading of solid support into the vessel, and an unloading port configured to facilitate unloading of the solid support out of the vessel. For example, after synthesis and harvest of an oligonucleotide from the reactor, the solid support may be removed from the vessel via the unloading port, and fresh solid support may be inserted into the vessel via the loading port. The loading and unloading of the solid support may be performed manually. For example, the solid support may be injected and removed as a slurry using a hand-held syringe. In another example, the solid support may be transferred in and out of the vessel using pumps. The solid support may be of any type of material or matrix capable of supporting oligonucleotide synthesis including but not limited to controlled pore glass (CPG) and polystyrene. In other embodiments, the reactor further includes in-process sampling ports (FIG. 17). That is, samples of the solid support may be collected manually or automatically from the column at any step of synthesis. In other embodiments, the reactor further includes washing ports. These ports may be used to manually or automatically wash the reactor before and/or after each use.

It should be noted that reactor may be configured to contain any type of stationary phase and is not limited to containing a solid support. The reactor may be configured for any type of column or column bed technology including but not limited to solid phase, liquid phase, batch, continuous flow, packed bed, and fluidized bed technologies. Although the term "solid support" is used within this document, it should be understood that the term "solid support" may be used interchangeably with any stationary phase element from any technology, such as the technologies listed above.

FIGS. 2A-2B are diagrams illustrating a reactor 300, in accordance with one or more embodiments of the disclosure. The reactor 300 may include one or more, or all, components of reactor 300, and vice versa. The reactor 300 includes a top inner piston 304, and a top outer piston 308, and may further include a bottom inner piston 312 and a bottom outer piston 316. One or more of the outer pistons 308, 316 act to adjustably contain the solid support, while one or more inner pistons 304, 312 adjust the volume of a head space 320 between a porous outer piston head 324 (also referred to as a distribution plate 325) of the outer piston 308, 316 and an inner piston head 326 of the inner piston 304, 312. The inner piston 304, 312 may be configured such that an inner piston stem 328 of the inner pistons 304, 312 fits within the outer stem 332 of the outer piston 308, 316, allowing the inner piston stem 328 to translate independently of the outer piston stem 332. The inner piston stem 328 and outer piston stem may be operatively coupled (e.g., via a screw thread mechanism or other type of mechanism) so that the head space 320 may be adjusted by manual or automatic means. The inlet 236 and outlet 237 may be disposed within the inner piston stem 328 of the top inner piston 304 and bottom inner piston 312, respectively.

Figure 5B:
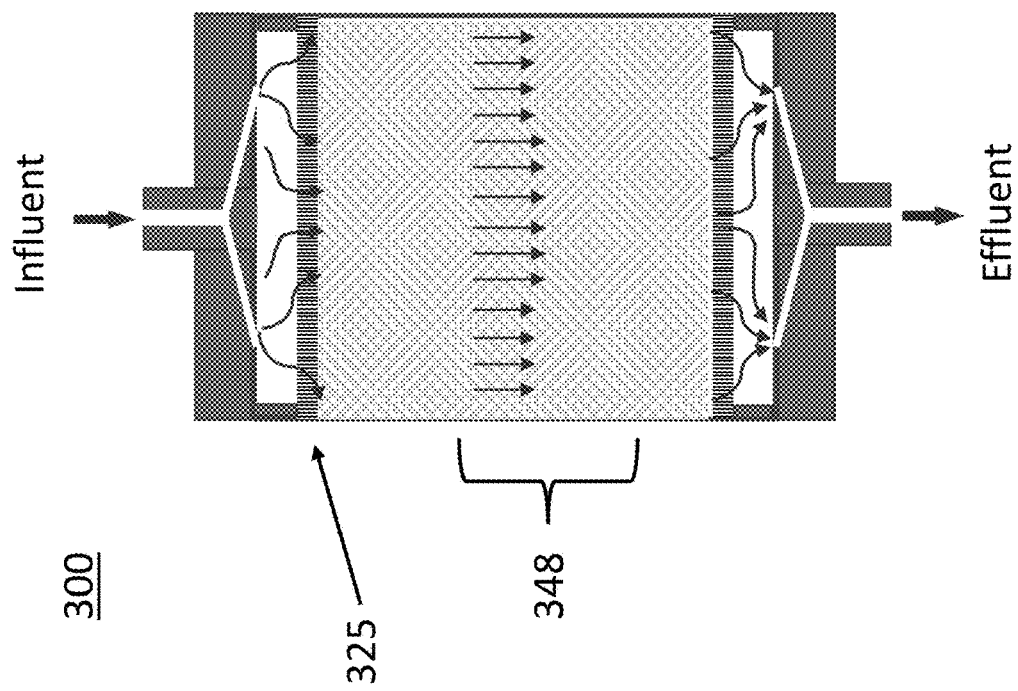
FIGS. 5A-5B are drawings illustrating cutaway-side views of a reactor, in accordance with one or more embodiments of the disclosure.
Figure 5A:
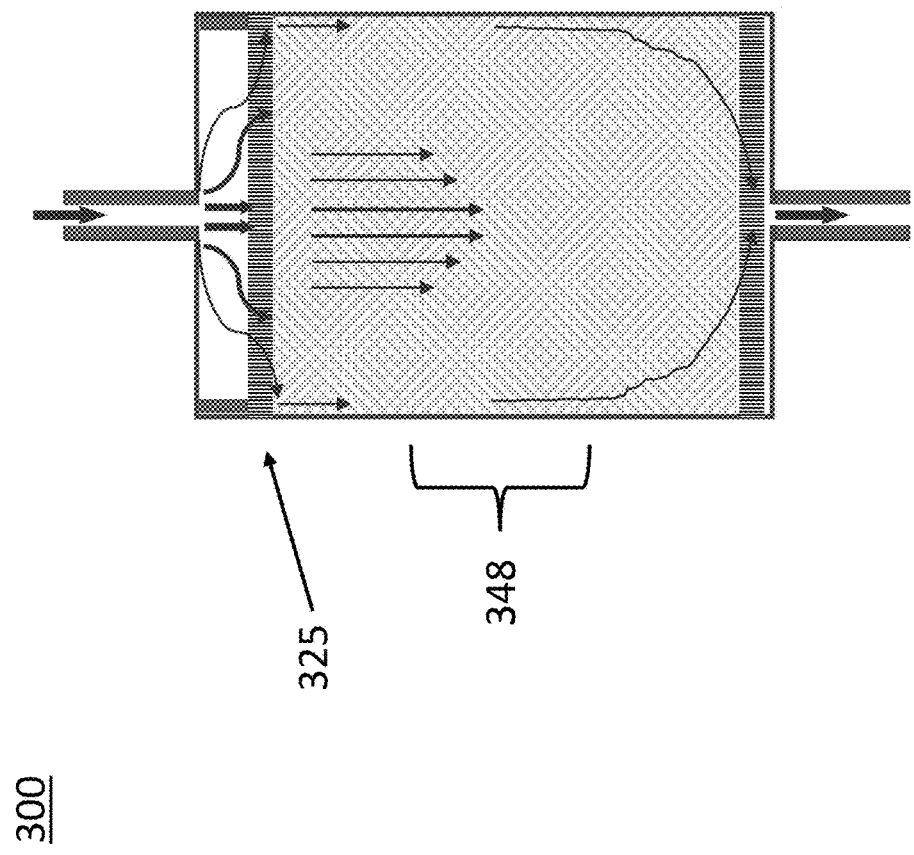

In embodiments, the reactor 300 includes two or more crossflow ports 336a-d configured to move fluid in and out between the inner piston head 326 and the outer piston head 324 or solid support. Fluid entering and exiting the crossflow ports 336a-d wash and/or rinse a volume inside the vessel 204, preventing or actively treating clogging and/or fouling within the reactor 300. The reactor 300 may also include one or more vents 340a-b configured to allow the transfer of gas into, or out of, the reactor 300. For example, an inert gas may be introduced into the reactor 300 via a vent 340a (or via inlet 236 and/or outlet 237) in an effort to uniformly push liquid/reagent through the solid support. Gas driven flow, also known as pressure-driven flow, can result in improved and consistent flow dynamics within the reactor 300, as shown in FIGS. 5A-5B. For example, in conventional volumetric flow-rate driven flow with a single influent port at the center, influent is often unable to fully distribute itself along the length of the distribution plate 325, as shown in FIG. 5A, with a higher concentration of reagent flowing through the middle of the reactor 300, as indicated by the arrows 348. In pressure-driven flow, the influent enters into an open space within or adjacent to a first piston 220 (FIG. 6) and is able to equilibrate within the available space at the top of the reactor 300. After equilibration, gas (e.g., nitrogen gas) is directed 325 into the reactor 300, and the pressure of the gas forces the influent through the reactor 300 in an equilibrated and constant fashion 348 (FIG. 5B). As shown in FIG. 5B, the addition of a modular flow distribution unit (see further discussion below) on the top and/or bottom further helps to evenly distribute fluid in the column.

FIG. 3 provides a diagram of a reactor system 3300 in accordance with one or more embodiments of the disclosure. The system 3300 includes a piston driver 1 which may be a mechanically, hydrodynamically, and/or pneumatically-driven system to drive the piston up and/or down. The piston driver 1 is coupled to and driven by a linear shaft 2. The system 3300 may include one or more in-line sensor 3 which may be in-line with the input and/or output fluid lines and which may include one or more of a flow sensor, a pH sensor, a conductivity sensor, a thermal sensor, a Raman sensor, and/or a mid-IR sensor. The system 3300 may also include one or more in-line fluid conditioner 4 which may be in-line with the input and/or output fluid lines and which may include one or more of a heat exchanger, a degasser, a de-bubbler, and/or a gas dryer.

In various embodiments, the system 3300 may further include a force measuring device 5 in series with the piston 2, where the force measuring device 5 may include one or more of a load cell and/or a strain gauge. The system 3300 may also include one or more chamber sensor 6 coupled to the top and/or bottom of the chamber (e.g., via connections embedded in the piston(s) or upper/lower wall(s) of the chamber) which may include one or more of a differential pressure sensor, a pressure sensor, a strain gauge, a pH sensor, a conductivity sensor, a thermal sensor, an optical sensor, a Raman sensor, and/or a mid-IR sensor.

In certain embodiments, the system 3300 may include a control system 7 which monitors the various components of the system 3300, e.g., in a closed-loop manner. The control system 7 may be coupled (e.g., in a wired and/or wireless manner) to one or more of piston driver 1, in-line sensor 3, fluid conditioner 4, force measuring device 5, chamber sensor 6, pressure relief/control valve 8, and/or leak detector/limit switch sensor 14 (FIG. 3). In some embodiments, the system 3300 may include one or more valve 8 such as a pressure relief valve and/or control valve, for example connected in-line to the input and/or output fluid lines.

In some embodiments, the control system 7 (including, e.g., a processor) may be operably coupled to various components such as the force measuring device 5 and/or the piston driver 1 (or other components) and may be configured to measure a load on the piston 2 using the force measuring device 5, and adjust a position of the piston 2 using the piston driver 1 based on measuring the load on the piston 2. In other embodiments, the control system 7 may be configured to collect a plurality of real-time data based on obtaining a plurality of measurements (e.g., measurements of the load on the piston 2 or any other measurements using various devices), with the result that the plurality of real-time data is indicative of conditions within the reaction chamber during a reaction, for example indicative of at least one of a reaction chemistry or flow dynamics within the reaction chamber. The control system 7 may then be configured to adjust the position of the piston 2 using the piston driver 1 based on collecting the plurality of real-time data to adjust at least one of a system or an operational parameter in real time.

In various embodiments, the system 3300 may include a synthesis column including a reaction chamber defined on the bottom by a modular bottom flow distribution unit 9 and on the top by a modular top flow distribution unit 10, where either or both of the units 9, 10 may be reusable. Each unit 9, 10 may include one or more flow distribution channels 9a, 10a to evenly distribute and/or collect the fluid moving through the reaction chamber. A first end of each of the flow distribution channels 9a, 10a is fluidly coupled to a fluid inlet or outlet and a second end of each of the flow distribution channels 9a, 10a is fluidly coupled to the reaction chamber. The synthesis column includes an outer housing 11 which may be made of rigid and non-reactive materials such as glass and/or stainless steel. The flow distribution units 9, 10 form a tight fit within the outer housing 11 in order to minimize or prevent leakage of reaction materials from the reaction chamber.

The reaction chamber may include one or more leak detector/limit switch sensor 14 associated with and/or adjacent to the units 9, 10 to sense fluid leaks and/or to detect upper or lower limits of movement of the units 9, 10. The reaction chamber may include a solid state support 12 disposed therein, where the support 12 may include controlled pore glass (CPG) and/or polymeric resins. In particular embodiments, the system 3300 is configured to evenly distribute fluid throughout the reaction chamber to create a uniform flow distribution 13 across the column diameter.

In various embodiments, the system 3300 is configured to provide various improvements over known systems. In some embodiments, the system 3300 is configured to provide automated initial packing and to continuously maintain the resin/solid support packing density throughout the entire synthesis using in-line load cells. In other embodiments, the system 3300 is configured to provide uniform flow distribution across the entire diameter of the column, e.g., using the disclosed innovative flow distribution units along with cleanable and reusable filters. In still other embodiments, the system 3300 is configured to continuously monitor and dynamically respond to the real-time conditions inside the column.

In particular embodiments, the primary source of information about the condition inside the column may come from the force measuring device 5 (e.g., a load cell), which provides information about force exerted on the piston 2, which may also be confirmed by measurements of differential pressure across the resin/solid support (obtained for example using chamber sensor 6). In some embodiments, the system 3300 may be configured to dynamically adjust the height of the column (e.g., by using the piston driver 1) to accommodate both swellable and non-swellable resin/solid supports. Making these dynamic adjustments improves performance at least by avoiding backpressure, which is a common problem in synthesis columns (particularly when synthesizing longer oligonucleotides), for example by using pressure relief/control valve 8 and/or by dynamically adjusting the height of the column, which may be controlled by control system 7. Further improvements in performance may also be realized using efficient and on-demand heating of reagents by using the in-line fluid conditioner 4 which may include a heat exchanger, which helps to avoid formation of high temperature gradients across the diameter of the column.

In various embodiments of the system 3300, the column has a symmetrical design meaning that the influent and effluent to and from the column can be swapped as well as instruments before and after the column. In certain embodiments, either one or both of the top and bottom flow distribution units 9, 10 can move dynamically, where the flow distribution units 9, 10 provide uniform flow distribution across the whole diameter of column.

Although in various embodiments disclosed herein the reactor is shown as being in a fixed position while one or both pistons are shown as being movable, in some embodiments a piston may be held in a fixed position and the reactor may be moved relative to the piston to make adjustments to the reaction volume.

Figure 4:
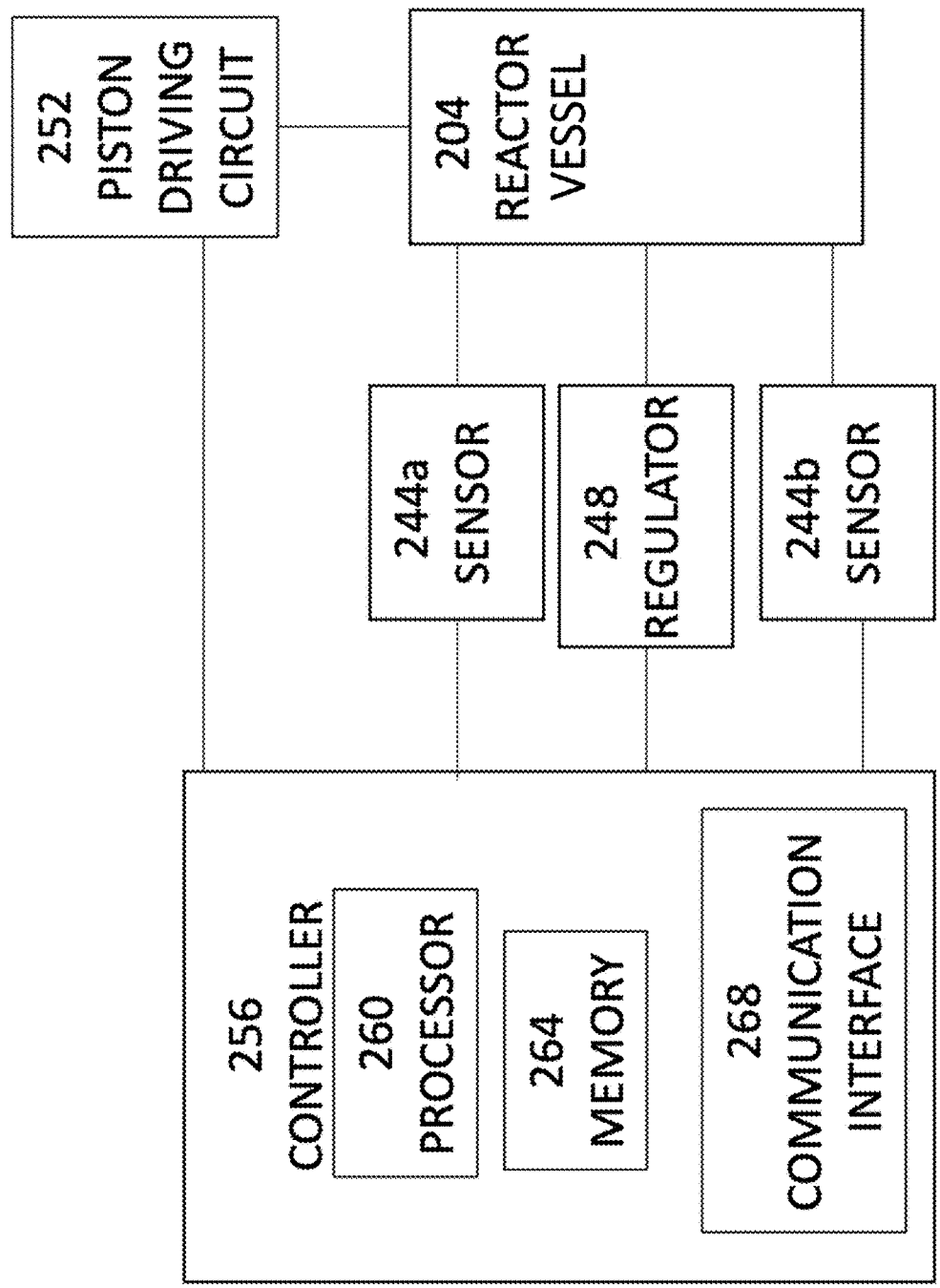
FIG. 4 is a block diagram illustrating a reactor system, in accordance with one or more embodiments of the disclosure.

FIG. 4 is a block diagram illustrating a reactor system 242 in accordance with one or more embodiments of the disclosure. The reactor system 242 may be used for the synthesis and/or purification of oligonucleotides and/or peptides/proteins. For example, the reactor system 242 may be configured as an oligonucleotide synthesis system. The reactor system 242 includes one or more sensors 244a-b operatively coupled to a reactor vessel 204 and configured to sense one or more characteristics of the reactor vessel 204 or influent within the reactor vessel 204. For example, the sensors 244a-b may be configured to sense or detect an influent pressure, an effluent pressure, pressure within the reactor vessel 204, piston force (e.g., biasing force), conductance, pH, distance between the piston 220, 232 and the solid support, absorbance and/or temperature. The sensors 244a-b may also be configured to sense or detect characteristics of the fluid before the fluid enters the reactor vessel 204 or after the fluid leaves the reactor vessel 204 including but not limited to pressure, temperature, and absorbance. The sensors 244a-b may be disposed within or adjacent to the reactor vessel 204. The reactor system 242 further includes one or more regulators 248 operatively coupled to the reactor vessel 204 and configured to regulate influent entering the reactor vessel 204. For example, the one or more regulators 248 may include pumps or pump controllers to regulate fluid flow. In another example, the one or more regulators 248 may include one or more valves configured to switch the influent entering the reactor vessel 204.

In embodiments, the reactor system 242 includes a piston driving circuit 252 operatively coupled to the reactor vessel 204 and configured to control the movement of the one or more pistons 220, 232. The piston driving circuit 252 may be operatively coupled to the one or more sensors 244a-b and/or regulators 248 such that the piston driving circuit 252 operates based on information (e.g., feedback) received from the sensors 244a-b. For example, the reactor system 242 may further include a controller 256 operatively coupled to the piston driving circuit 252 that provides processing functionality to the sensors 244a-b, the regulators 248, the piston driving circuit 252, and/or other components of the reactor system 242. The controller 256 includes processors 260, memory 264, and a communication interface 268.

The controller 256 may include one or more processors 260 (e.g., micro-controllers, circuitry, field programmable gate array (FPGA), programmable logic controllers (PLCs), modular fieldbus, central processing units (CPU), application-specific integrated circuit (ASIC), phidgets, or other processing systems), and resident or external memory 264 for storing data, executable code, and other information. The controller 256, via the one or more processors 260, may execute one or more software programs embodied in a non-transitory computer readable medium (e.g., memory 264) that implement techniques described herein. The controller 256 is not limited by the materials from which it is formed or by the processing mechanisms employed therein and, as such, can be implemented via semiconductor(s) and/or transistors (e.g., using electronic integrated circuit (IC) components), and so forth.

The memory 264 can be an example of tangible, computer-readable storage medium that provides storage functionality to store various data and/or program code associated with operation of the controller 256, such as software programs and/or code segments, or other data to instruct the controller 256, and possibly other components operatively coupled to the controller 256 to perform the functionality described herein. Thus, the memory 264 can store data, such as a program of instructions, and so forth (e.g., the instructions causing the one or more processors to implement the techniques described herein). It should be noted that while a single memory 264 is described, a wide variety of types and combinations of memory 264 (e.g., tangible, non-transitory memory) can be employed. The memory 264 may be integral within the controller 256, may include stand-alone memory, or may be a combination of both. Some examples of the memory 264 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 268 may be operatively configured to communicate with components of the controller 256. For example, the communication interface 268 can be configured to retrieve data from the controller 256 or other components, transmit data for storage in the memory 264, retrieve data from storage in the memory 264, and so forth. The communication interface 268 can also be communicatively coupled with the controller 256 to facilitate data transfer between components of the controller 256. The controller 256 may also include and/or connect to one or more input/output (I/O) devices (e.g., a graphical user interface or GUI). In embodiments, the communication interface 268 includes or is coupled to a transmitter, receiver, transceiver, physical connection interface, or any combination thereof.

Figure 6A:
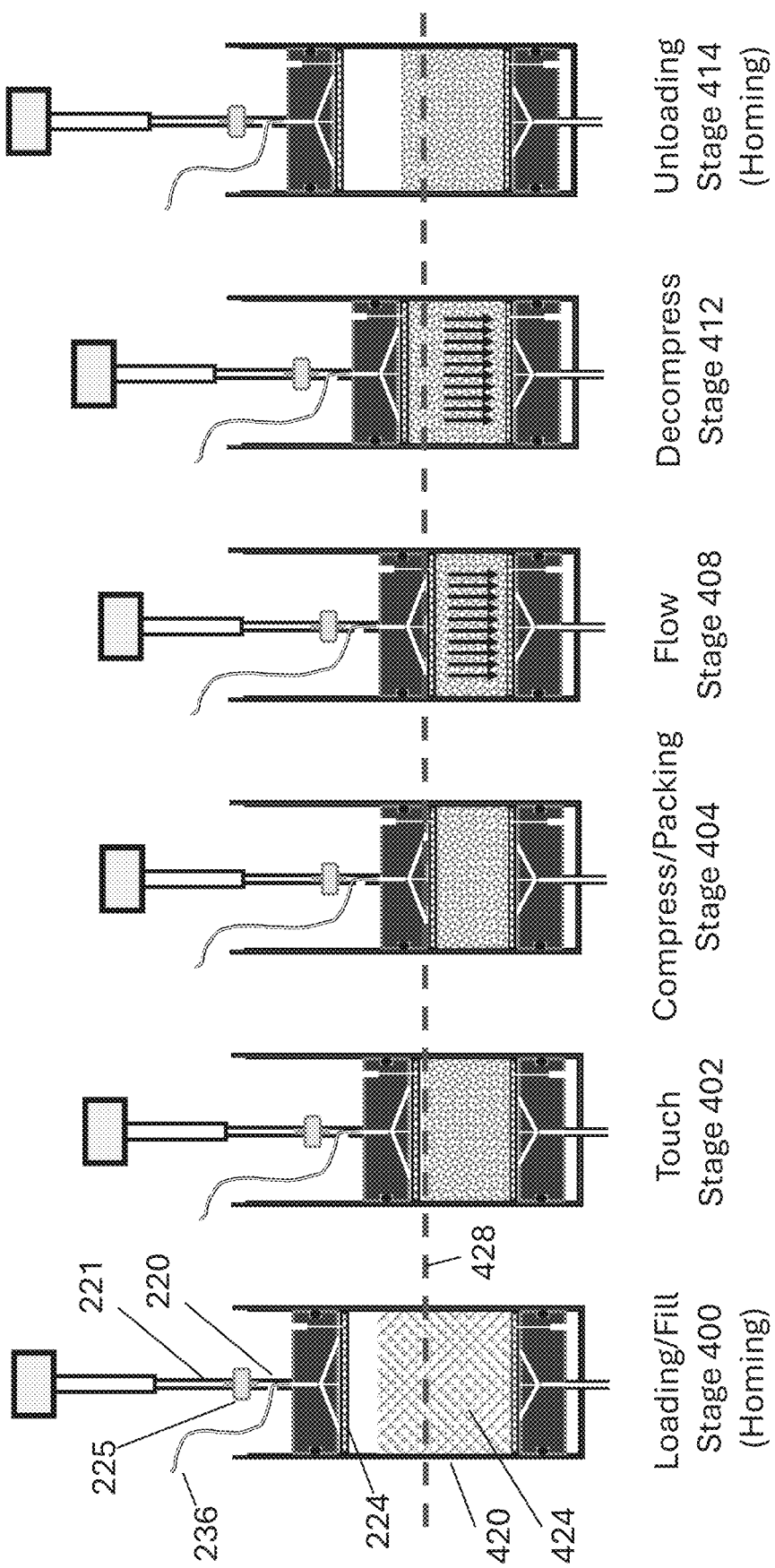
FIG. 6A is a drawing illustrating cutaway-side views of a reactor, in accordance with one or more embodiments of the disclosure.

FIG. 6A is a drawing illustrating various stages of operation of a reactor 420, where each stage of operation is facilitated by setting a specific load setpoint and bandwidth (e.g., measured by a force measuring device 225 such as a load cell associated with the piston 220) for that particular step or stage. The stages include one or more of: a loading/fill stage 400, a touch stage 402, a compress/packing stage 404, a flow stage 408, a decompress stage 412, and/or an unloading stage 414 (homing) of the reactor 420, in accordance with one or more embodiments of the disclosure. Reactor 420 is shown having a top piston 220 which includes a piston shaft 221, a built-in inlet 236, a force measuring device 225 (e.g., a load cell) coupled to the piston shaft 221, and a porous piston head 224, which acts as a diffuser (e.g., a distributor plate or frit), although in various embodiments reactor 420 may also include a second/lower piston. At fill stage 400, a solid support 424, such as resin, is added to the reactor 420 (e.g., via a loading port and an unloading port) so that the loaded solid support 424 reaches a fill level 428; at this stage, the load cell reading is very low, e.g., almost 0 N or otherwise a value much lower than that of set for other stages such as the touching stage. In general, the force measuring device may have a range of at least 0 to 20 kN or more with each target force level at various stages being in a range of +/−10% of the target value.

Once filled, the reactor 420 advances to the touch stage 402. At the touch stage 402, the piston is commanded to move downward until the force measuring device 225/load cell reaches a force value set in the program for the touch stage 402, e.g., a force maximum for completion of the touch stage 402 (e.g., 300 N). Next, the reactor 420 may progress to the compress stage 404, wherein one or more pistons 220 press upon the solid support 424, where the progress and successful completion of each stage may be monitored and determined by comparison of the output of the force measuring device 225 with the specific load setpoint and bandwidth. At the compress/packing stage 404, the piston 220 is commanded to further move down into the chamber until the force measuring device 225/load cell reaches a force value set in the program for the compress/packing stage (e.g., 500 N). This extra compression (beyond the force applied at the touch stage 402) helps to uniformly pack the solid support 424 and minimize any void formation during the long flow stage 408. Thus, compressing the solid support 424 provides benefits to the reactor 420 including but not limited to reducing voids/channels in the solid support 424 and reducing head space between the piston head 224 and the solid support 424. Compression may also increase the packing density of the solid support 424, which may increase the efficiency with which the solid support 424 binds/interacts with flow components.

After compression, the reactor 420 may advance to flow stage 408, where influent is added to the reactor 420. The main synthesis stage, which includes several cycles and several steps in each cycle, starts at the flow stage 408. At the flow stage 408, the load on the piston 220 is continuously measured and the load values are communicated to the same control system that is used to control the piston actuator. As a result, the piston 220 is dynamically adjusted to maintain packing of the solid support 424 throughout the synthesis process. That is, the load remains within a defined range that is set at the compress/packing stage 404 (e.g., 500 N).

After the flow stage 408, the reactor 300 may enter a decompress stage 412, where the one or more pistons 220 are moved so as to increase the volume of the reactor 420 that contains the solid support 424. Decompression also may reduce back pressure caused by the reduction in voids or flow path between the support particles as, for example, the length of oligomer increases.

During the entire course of synthesis, the load on the piston 220 varies at each step of a cycle and also between cycles. This load variation can be used not only to understand the real time synthesis chemistry and conditions inside the column/reactor, but it can also be used as feedback to logically adjust the piston's position (e.g., at the decompress stage 412) in real time in order to control the hydrodynamics and uniform flow distribution, and hence the reaction chemistry, while also maintaining the solid support 424 packing inside the reactor 420. For example, as the length of the oligomer increases, the load on the piston 220 will increase, and thus the piston 220 will be commanded to move up to maintain the hydrodynamics across the solid support 424.

Once the synthesis has been completed, the piston automatically moves up where the compression load on the piston reaches zero at the unloading stage 414. At this stage, there may also be a limit switch sensor that can be triggered when the piston 220 reaches the defined unloading position. In various embodiments, each stage 400, 402, 404, 408, 412, and 414 may be performed in any order as needed.

Figures 6E, 6F:
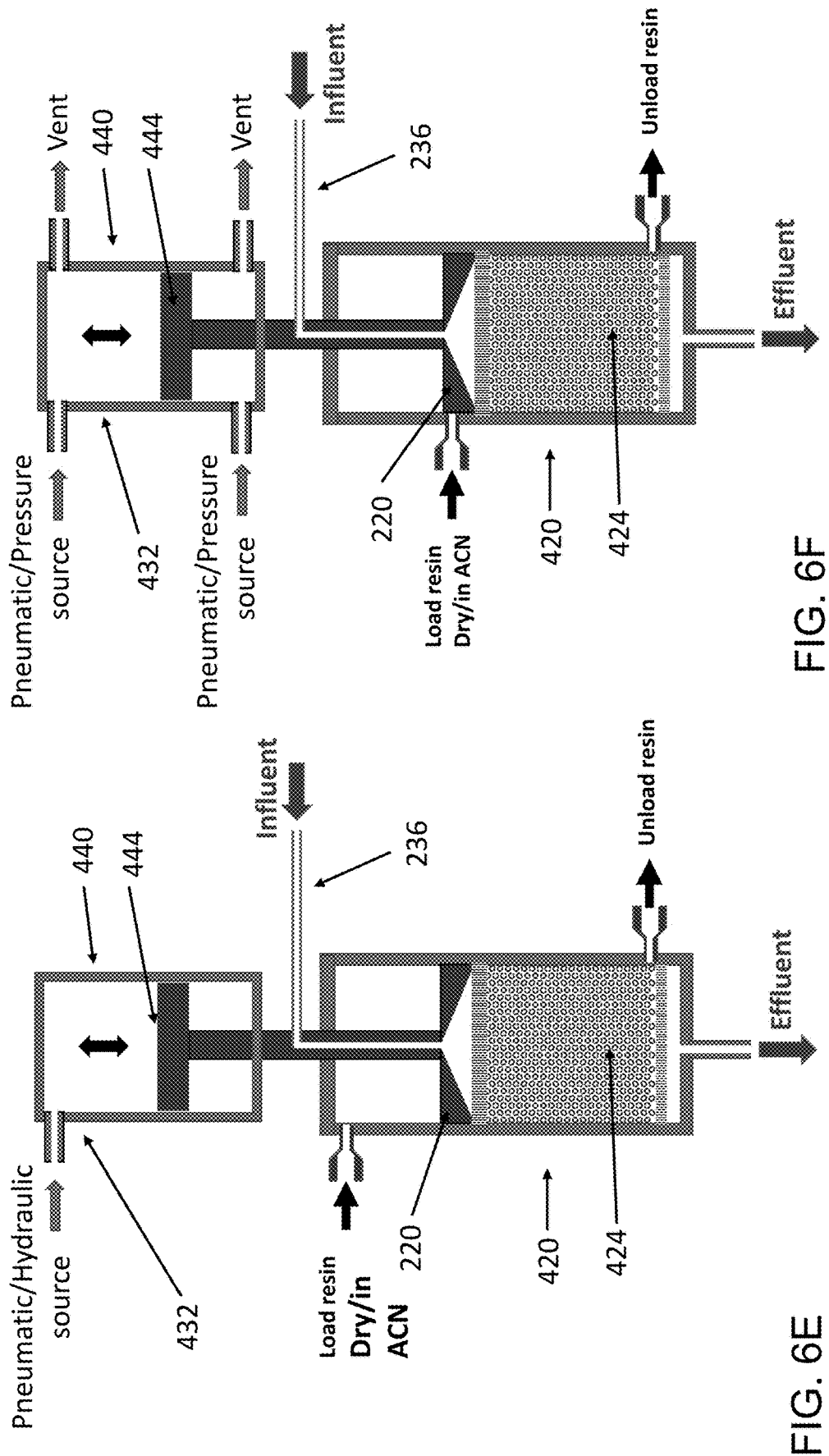

The actuation or translation of the piston 220 may be carried out by one of several biasing mechanisms, as shown in FIGS. 6B-6E; although a single, upper piston is illustrated here, in various embodiments these mechanisms could also be used on a lower piston. For example, the piston 220 may be biased via a mechanical source such as a linear actuator, as shown in FIG. 6B. In another example, the piston 220 may be biased through pneumatic or hydraulic pressure source (via pressure port 432), as shown in FIGS. 6C-6D. The structure of the piston 220 may be decided, in part, by the biasing mechanism. For example, while a piston 220 with a contiguously rigid stem 241 can be used for reactors 420 utilizing either linearly actuated or pneumatic/hydraulic mechanisms (e.g., FIGS. 6B, 6D), a piston 220 biased via pneumatic or hydraulic mechanisms may be configured with a non-rigid stem 436, such as a flexible tube that permits influent to enter the reactor 420. In some embodiments, the reactor 420 includes a pressure chamber 440 that contains a biasing end 444 of the piston 220 (FIG. 6E). Upon the addition of fluid into the pressure chamber 440, the incoming fluid biases the piston 220 at the biasing end 444, resulting in a translation of the piston 220 and a compression of the solid support 424. In this configuration, the inlet 236 may be positioned at a site other than the top of the stem of the piston 220. FIG. 6F shows a pneumatically/hydraulically-powered actuation system that may be used to move the piston 220 either up or down within the column. The system includes a pneumatic/pressure source and vent ports both above and below the piston end plate to provide on-demand movement of the piston either upward or downward. In various embodiments, the actuator may be configured as a lead screw actuator that includes a motor, a gear box, a lead screw, and a leadscrew nut. In other embodiments, the reactor 420 and/or reactor system 242 may include other types of actuators including but not limited to belt-drive and rack-and-pinion actuators. While FIGS. 6B-6D show a single piston, these mechanisms can also be applied to double dynamic pistons (e.g., FIG. 2).

In certain embodiments, the piston 220 may further include a spacer between the fluid distribution plate and diffuser. The spacer creates a space between the diffuser and the fluid distribution plate, which may improve uniform flow distribution in the reactor 420 and may reduce the accumulation of by-products. The reactor 420 may also include a second fluid distribution plate, a second diffuser, a second spacer, and a second piston associated with the lower end of the chamber.

In some embodiments a reactor may have a gas entry port on the effluent side of the reactor (e.g., on the bottom of the chamber), and a gas exit port on the influent side of the reactor (e.g., on the top of the chamber). Using the gas entry and exit port the reactor minimizes incomplete wash-out of reagents between synthesis steps/cycles via flushing the solid support with an inert or nonreactive gas (e.g., helium or nitrogen) through the gas entry port and the gas exit port. In this manner, a reactor system using the reactor may be configured as a hybrid-synthesis system with on-demand transitions between a packed bed and a gas-stirred fluidized bed, or between flow-through and batch beds/columns.

Figure 24:
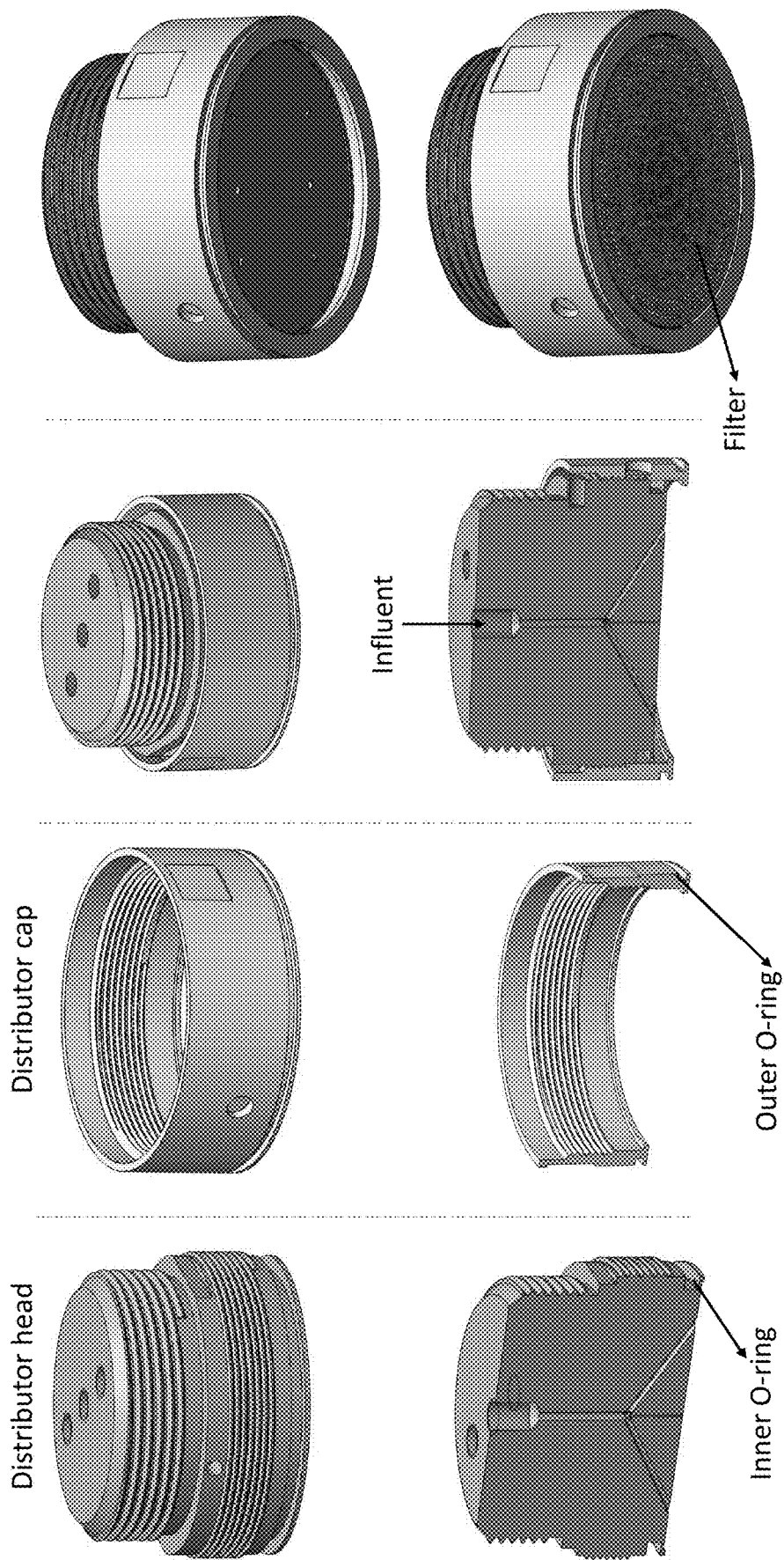
FIGS. 24-29 show constructions of a modular flow distributor in accordance with one or more embodiments of the disclosure.
Figure 25:
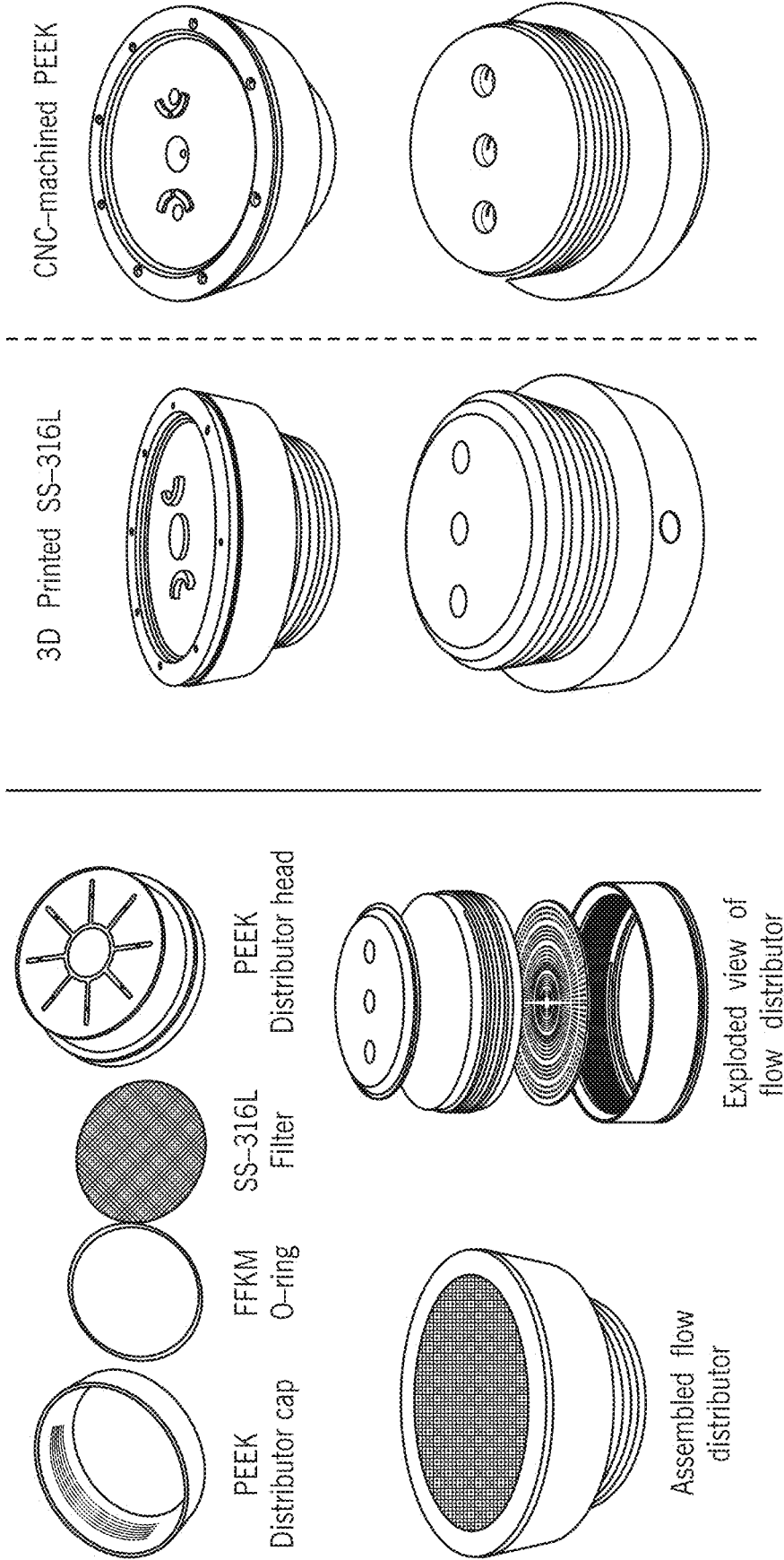
Figure 26:
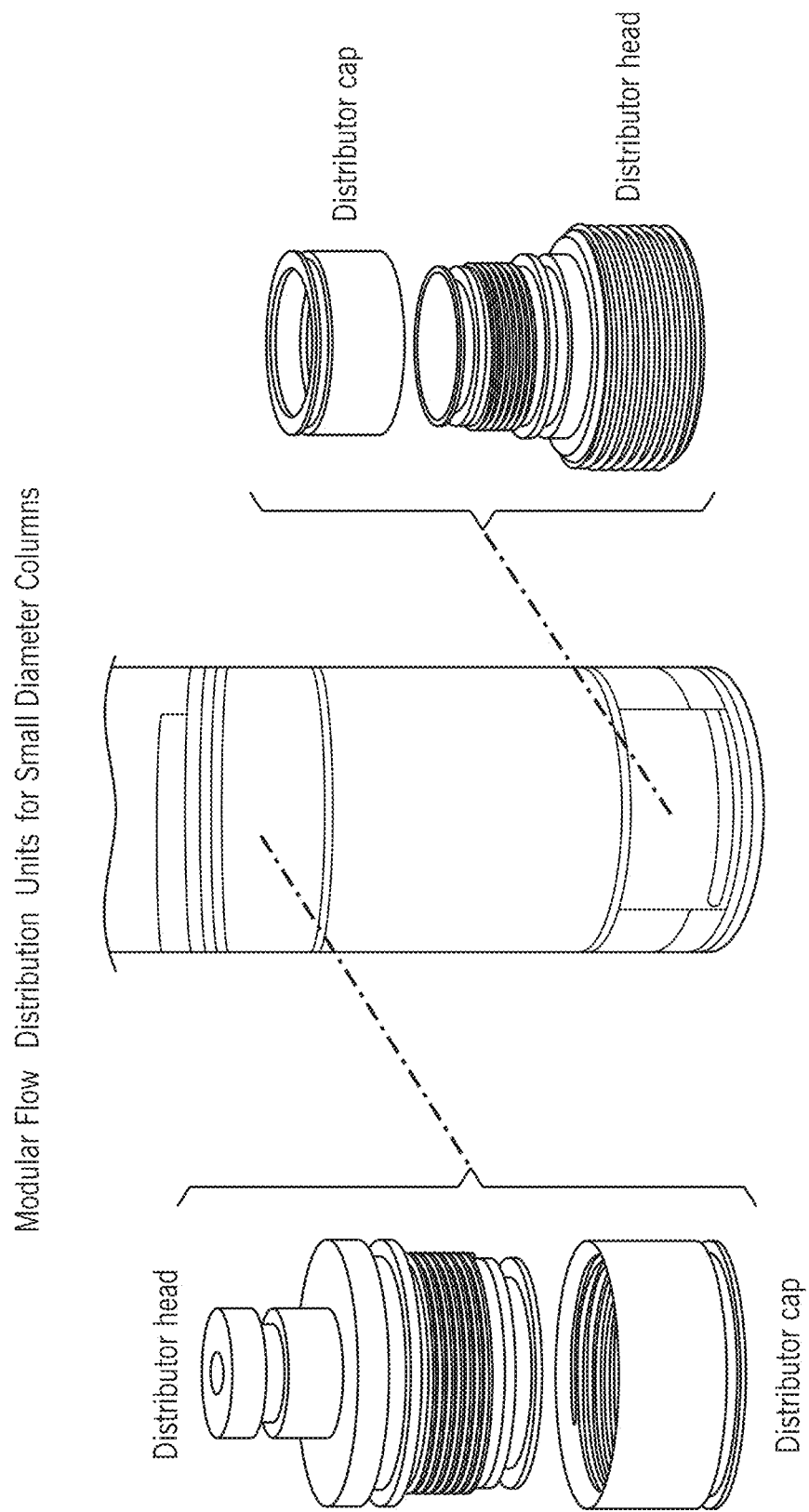

In some embodiments, the piston may include a modular piston head assembly containing a diffuser that can be disassembled for cleaning and/or changing of the diffuser, as shown in FIGS. 24-26. In accordance with one or more embodiments of the disclosure, the modular piston head assembly fits within the vessel. The diffuser fits within the modular piston head assembly where it acts to enhance flow distribution of influent through the solid support.

Figures 7A, 7B:
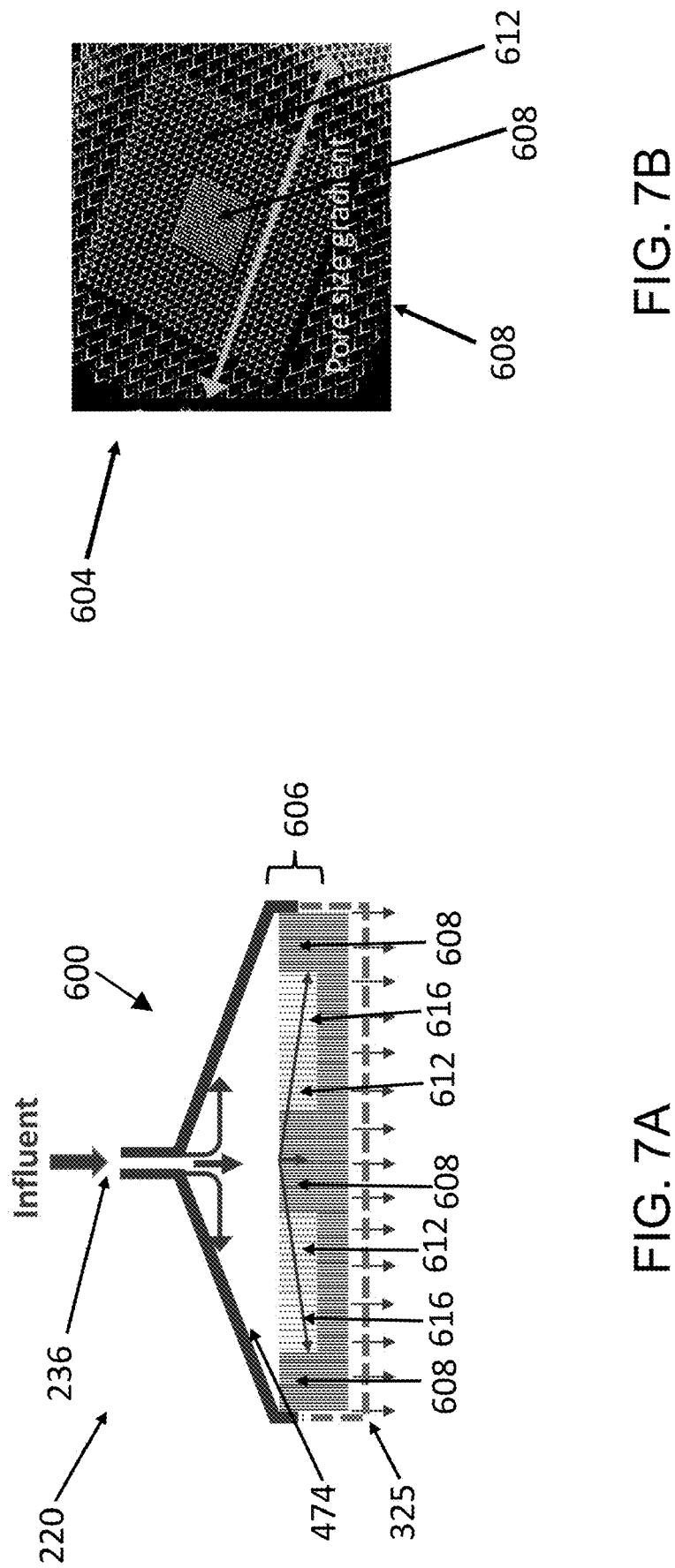
FIGS. 7A-7D show drawings illustrating use of a flow distributor with a reactor, in accordance with one or more embodiments of the disclosure.
Figure 7D:
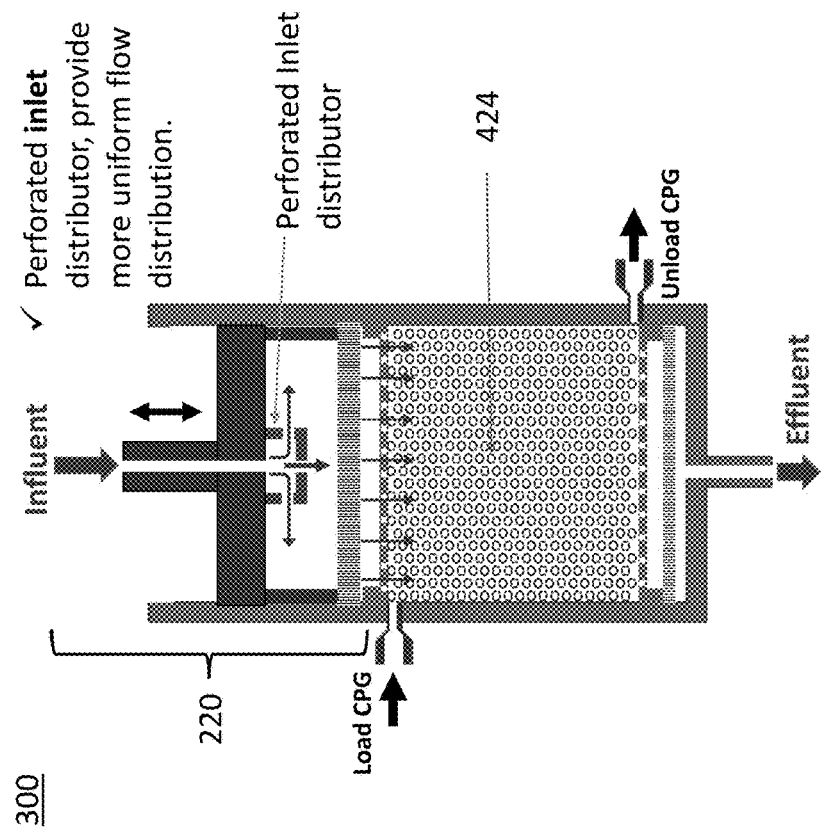

In some embodiments, the reactor may include a flow distributor 600 within the upper piston 220, as shown in FIGS. 7A-7D, in accordance with one or more embodiments of the disclosure. The flow distributor 600 is intended to improve homologous distribution of influent over the whole diameter of the solid support 424. For example, the flow distributor 600 may be configured to generate an axial flow of influent entering the reactor 300. The flow distributor 600 may also be configured to generate other types of flow including but not limited to radial flow, laminar flow, or a hybrid flow that combines two or more of axial flow, radial flow, and laminar flow. In some embodiments, the reactor 300 may include a perforated inlet distributor 604 configured to generate uniform flow distribution as the influent moves through the reactor 300, as shown in FIG. 7D.

FIG. 7A shows a diagram of a flow distributor 600, where arrows represent flow paths through the distributor. In some embodiments, the flow distributor 600 may include a grid for regulating flow, where the grid includes a radially asymmetric distribution of pore sizes having smaller pore sizes at the center (where flow velocity is higher) and where the pore size increases radially (as flow velocity is lower away from center) (see FIGS. 7A, 7B). FIG. 7B shows a micrograph of a 3D printed mesh that can be used as part of a flow distributor such as in FIG. 7A.

Figure 7C:
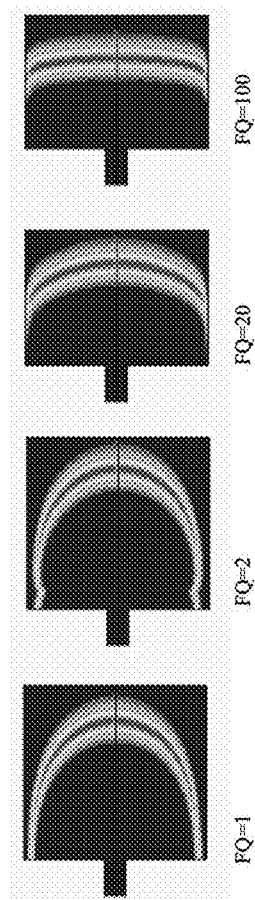

FIG. 7C shows a diagram of flow through a flow distributor (where the central axis of the chamber is oriented horizontally), with the front of flowing material being represented as an intense (red) band. The four examples of the flow presented in FIG. 7C represent flow patterns at different flow quotients, or FQ, where FQ=(radial flow/axial flow), and where the first panel (left to right) is FQ=1, the second panel is FQ=2, the third panel is FQ=20, and the fourth panel is FQ=100. As demonstrated by the diagrams of FIG. 7C, increasing radial flow relative to axial flow leads to a more uniform flow front and thus more evenly distributed flow of material through the column.

In some embodiments, the upper piston 220 within the reactor 300 may include a nonuniform distributor 606 disposed between the distribution plate 325 and the inside surface 474 of the first piston 220 (FIG. 7A). The nonuniform distributor 606 may include a nonuniform distribution of pores, or nonuniform distributions of pore sizes, that increase the uniformity of influent as it passes through the solid support 424. For example, the nonuniform distributor 604 may include narrow pore regions 608 at the center of the diameter of the reactor 300 to prevent an overabundance of influent from the central inlet 236 passing through the center of the diameter of the reactor 300 (FIG. 7A, 7B). In another example, the nonuniform distributor 604 may include narrow pore regions 608 near the perimeter of the vessel wall 208 to prevent channeling of influent between the vessel wall 208 and the solid support 424. The nonuniform distributor 604 may include pore regions of multiple pore sizes (e.g., medium pore regions 612 and wide pore regions 616, FIG. 7A). For example, the nonuniform distributor 604 may include 2, 3, 4, 5, 10, or 20 or more pore regions of different pore sizes. In another example, the nonuniform distributor 604 may include a pore region having a gradient of pore sizes. An image of the surface nonuniform distributor 604 is shown in FIG. 7B.

In embodiments, the first piston may include a diffuser stack that includes diffusers of different pore sizes or pore densities. The integration of a diffuser stack with diffusers of large to small pore sizes minimizes diffuser/distributor fouling/clogging by capturing large particles at top layer as well as enhancing uniform flow distribution. The diffusers may be configured with any size of pore. For example, a diffuser with the smallest pore size may have a pore size of approximately 20 μm. The diffuser stack may include any number of diffusers including but not limited to 2, 3, 4, 5, or 10 or more diffusers.

In embodiments, the reactor or reactor system may include a diffuser housing that houses one or more diffusers and/or a diffuser stack. The diffuser housing may be coupled to the inlet via a first line. The diffuser housing may act as a pre-filter or guard column and may include multiple diffuser layers from large pore size to small pore size. The diffuser housing may act to minimize diffuser fouling and clogging and may enhance uniform flow distribution. The modular nature of the diffuser housing allows the diffuser housing to be cleaned or replaced independent of the reactor. The diffuser housing may further include crossflow ports that can be used for rinsing/cleaning.

Figure 8:
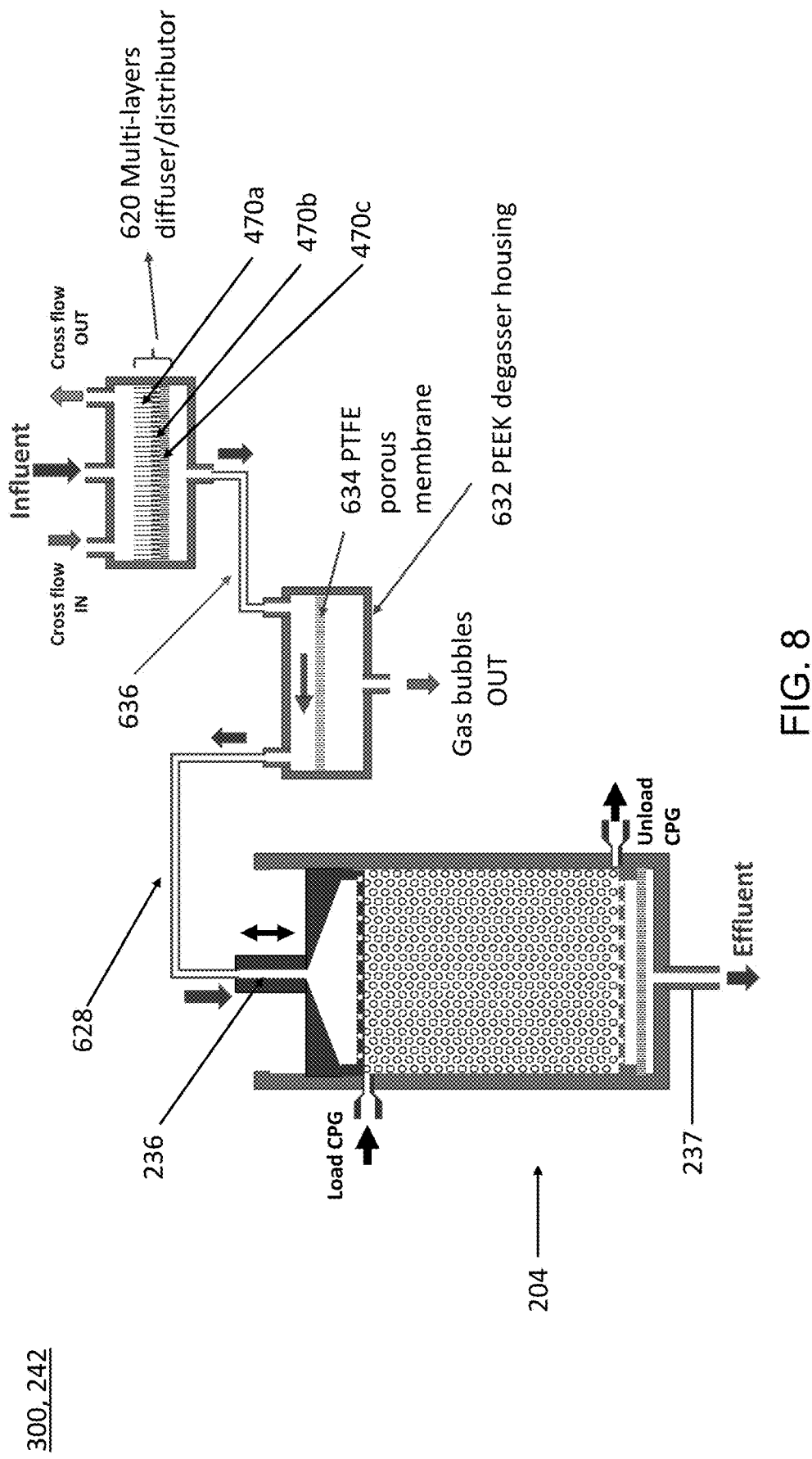
FIG. 8 is a drawing illustrating a cutaway side view of a reactor operatively coupled to a diffuser housing and a degasser housing, in accordance with one or more embodiments of the disclosure.

In embodiments, the reactor 300 or reactor system 242 includes a degasser housing 632 fluidly coupled to the vessel 204 (FIG. 8). The degasser housing 632 functions as an in-line degasser, removing gas bubbles through the action of a porous membrane within the degasser housing 632. The degasser housing 632 may be integrated before the inlet 236 and/or after the outlet 237 relative to fluid flow. Degassing of the fluid before it is disposed within the reactor 300 or reactor system 242 prevents gas bubble formation in pump heads or the sensors 244a-b (e.g., such as in an ultraviolet cell). The degasser housing 632 may be fluidly coupled to the diffuser housing 620 via a second line 636.

Figure 9A:
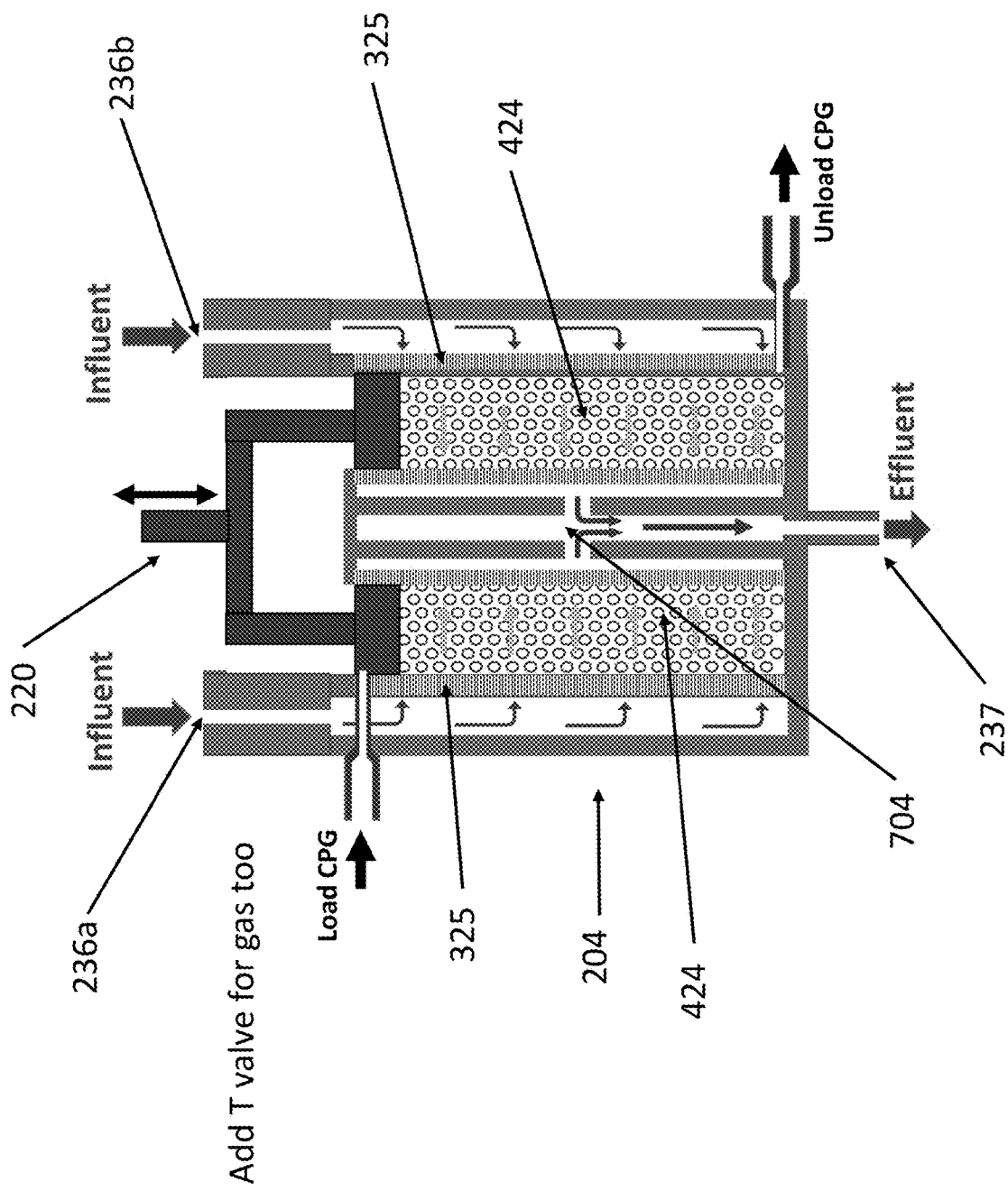
FIGS. 9A-9D are drawings illustrating cutaway side views of a reactor, in accordance with one or more embodiments of the disclosure.

FIG. 9A shows the configuration of a radial flow column (e.g., a concentric column) according to various embodiments. A radial flow column provides more homogeneous distribution of the fluid over the whole diameter of the packed bed at higher flow rates and lower pressure drop compared to axial flow columns. FIG. 9A is a drawing illustrating a side view of a cross-section of a reactor 700 that includes inlets 236 that run along the length of the vessel 204. The inlets 236a-b are separated from the solid support 424 by one or more distribution plates 325. The inlets 236, solid support 424, and distribution plates 325 may be arranged as concentric circles. In this manner, influent may then enter into an outer "ring" of the reactor 700, then pass through a distribution plate 325, resembling a hollow cylinder, to the solid support 424. The influent then moves through the solid support 424 to an outlet chamber 704 and is released via the outlet 237. The concentric column-based reactor 700 may provide more homogenous distribution of fluid over the whole diameter of the solid support 424 (e.g., packed column) at higher flow rates and lower pressure drops compared to axial flow columns.

Figure 9B:
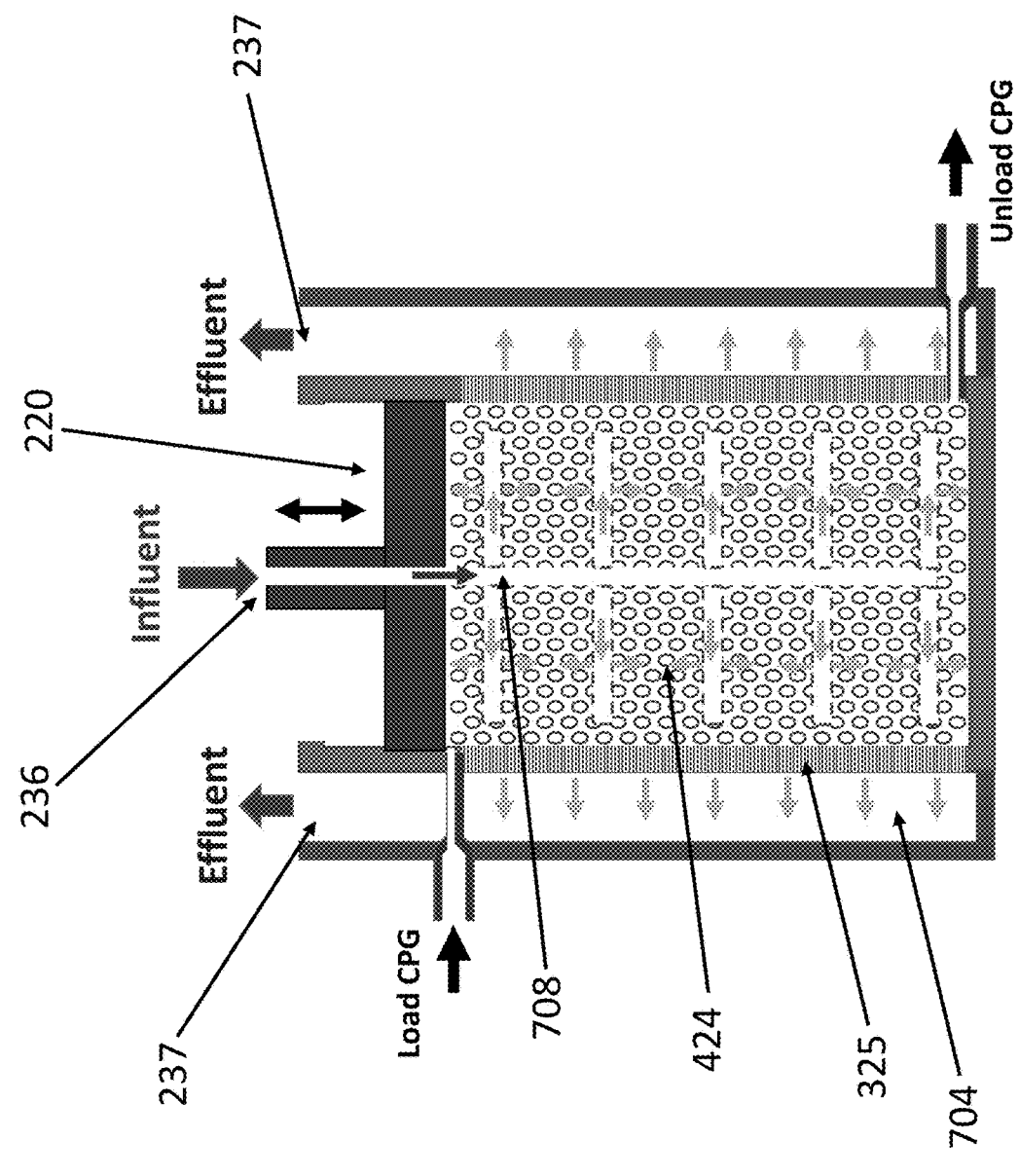

In some embodiments, the reactor 700 includes a single inlet 236, such the inlet 236 at the stem of the first piston 220, as shown in FIG. 9B. Inlet 236 is fluidly coupled to a system of fluid paths 708 (e.g., a branch-like flow distributor) within the solid support 424. Fluid entering the fluid paths 708 then enters into the solid support 424. The fluid then exits the solid support 424 by passing through the redistribution plate 325 and into the outlet chamber 704. The fluid then leaves the reactor 700 at the outlet 237. The redistribution plate 325 and the outlet chamber 704 surround the fluid paths 708 and the solid support 424 as concentric rings. In this manner, the reactor 700 may provide a combined axial and radial flow, providing homogeneous distribution of fluid over the whole diameter of the solid support 424. The configuration of FIG. 9B provides more homogeneous distribution of the fluid over the whole diameter of the packed bed in a combined axial and radial flow configuration (e.g., branch-like flow distributor).

Figure 9C:
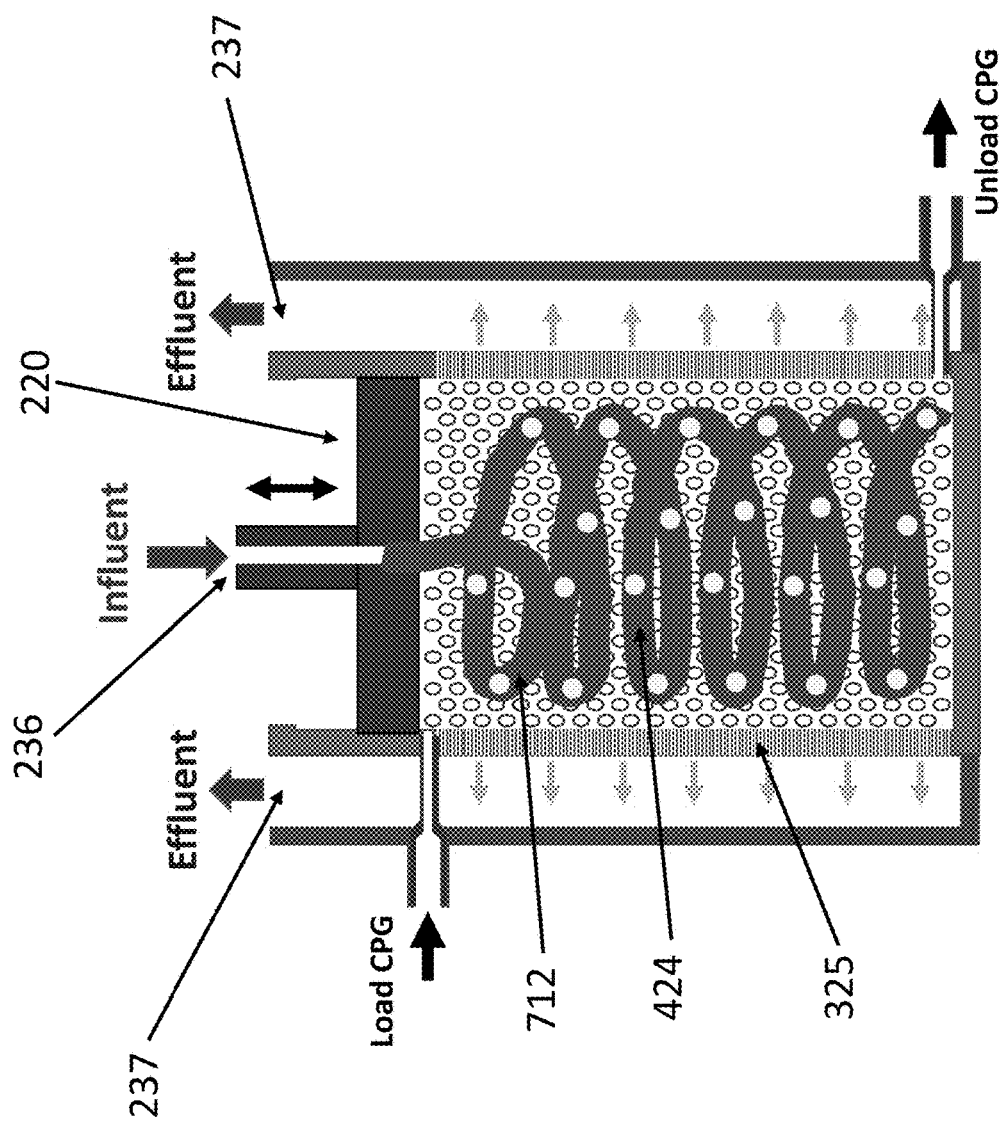

In some embodiments, the fluid paths 708 may be configured as an elongated and/or spiraled tube 712 having multiple apertures for the transfer of influent into the solid support 424 (e.g., analogous to a "soaker hose" for watering plants), as shown in FIG. 9C. The configuration of FIG. 9C provides more homogeneous distribution of the fluid over the whole volume of the packed bed using the spiral/spring-shaped perforated pipe. As a result, different layers of the solid support bed experience similar concentration of the reagents at the same time.

Figure 9D:
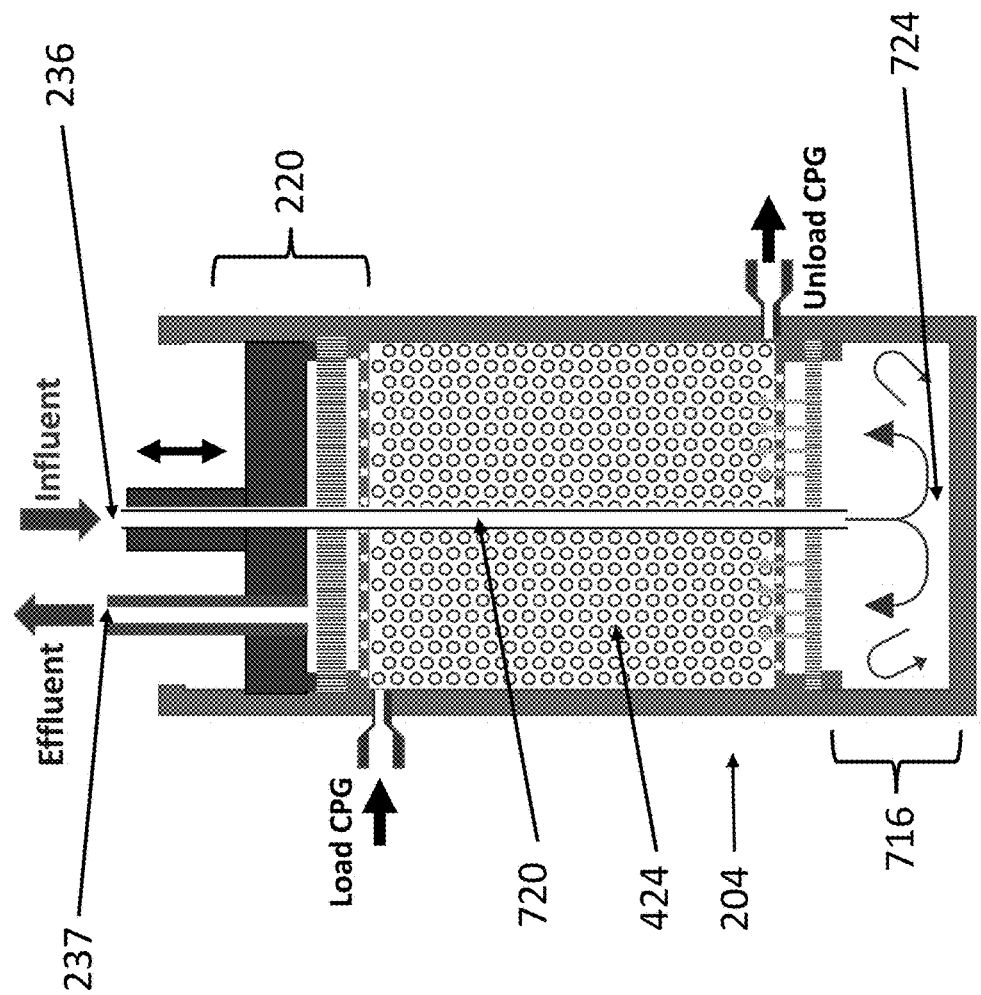

In some embodiments, the reactor 700 includes a convective flow chamber 716, as shown in FIG. 9D. For example, a convection chamber 700 may be disposed at an end of the vessel 204 opposite the inlet 236. Influent entering the inlet 236 travels through an inlet line 720 fluidly coupled to the inlet 236 and the convection chamber 716. Upon entering the convection chamber 716 the influent is mixed via convection. The mixing enhances flow distribution and minimizes reagent channeling (e.g., preferential flow) by jetting the influent to the bottom surface 724 of the vessel 204, which introduces more turbulent flow to the solid support 424 from bottom to top. The mixed influent then passes through the solid support 424 and out of the outlet 237. The convection flow generated from the flow of fluid through the convection chamber 716 maximizes the wetted surface to volume ratio of the solid support 424 and minimizes drops in pressure. The convection chamber 716 also improves the contact surface of the solid support 424/resin, enhances mixing, mass transfer, and reactor efficiency. The configuration of FIG. 9D may help facilitate convective flow and maximize the wetted surface-to-volume ratio and minimize pressure drop. This configuration may also improve the CPGs/resin contact area and enhance mixing, mass transfer, and/or efficiency. Finally, the configuration may also enhance flow distribution and minimize reagents' channeling (preferential flow) by jetting the influent to the bottom surface of the column, which introduces more turbulent flow to the packed bed from its bottom to top.

Figure 10A:
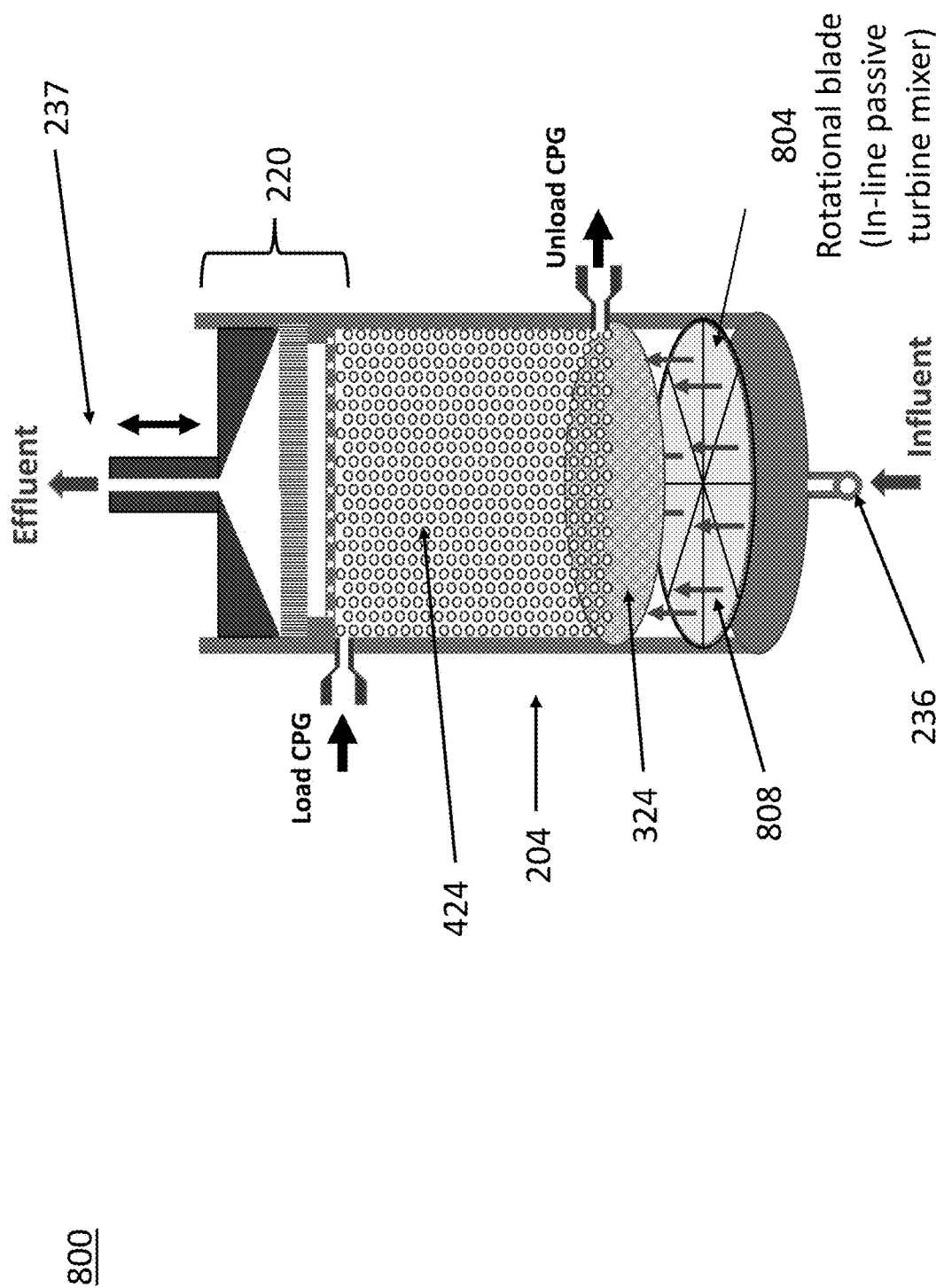
FIGS. 10A-10B are drawings illustrating cutaway-side views of a reactor, in accordance with one or more embodiments of the disclosure.
Figure 10B:
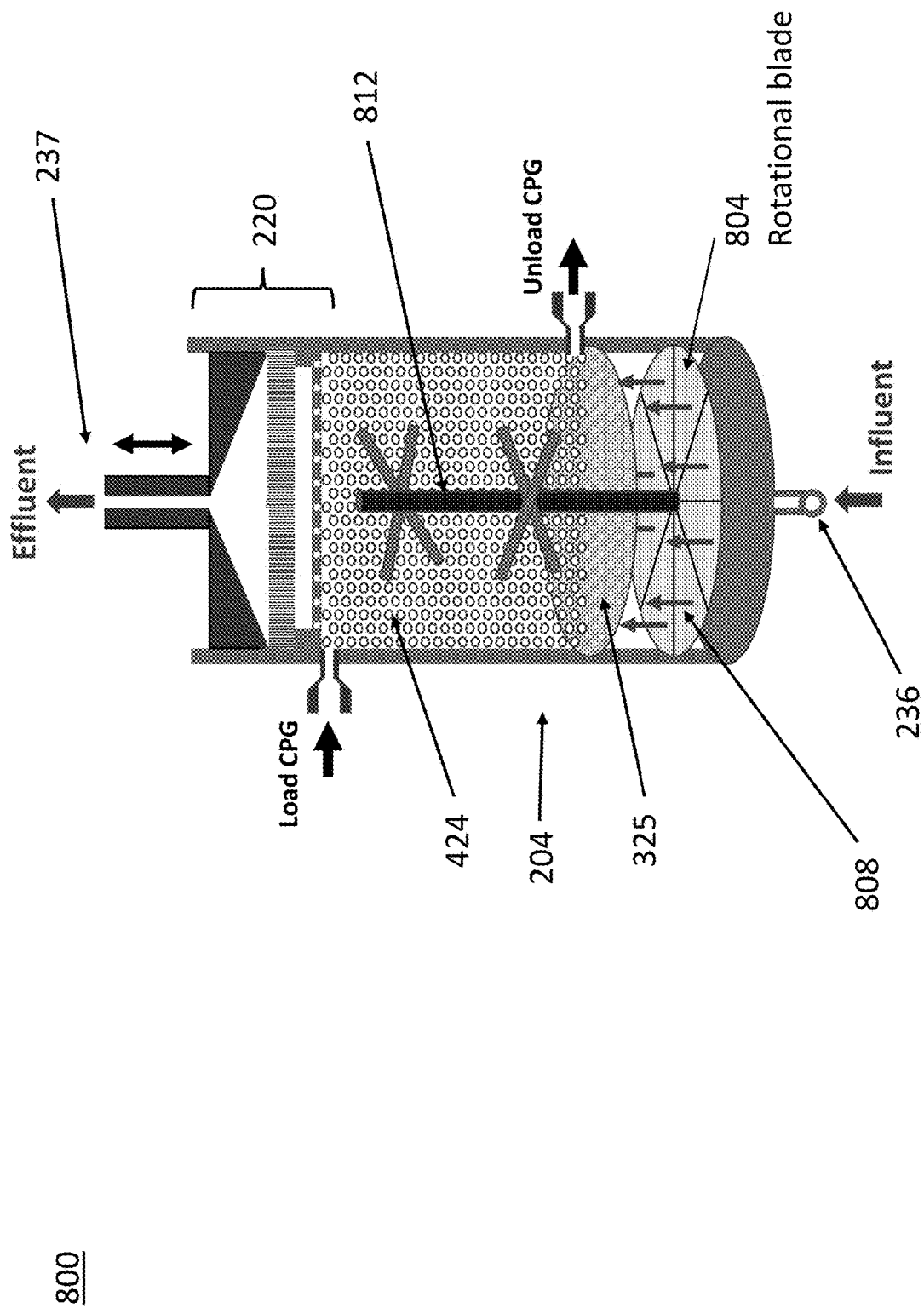

FIG. 10A is a side cutaway view of a reactor 800 that includes a rotational blade, or in-line mixer, 804, in accordance with one or more embodiments of the disclosure. The in-line mixer 804 mixes incoming influent coming in from the inlet 236, improving the distribution of the influent through the solid support 424. The in-line mixer 804 may include movable elements, such as a fan blade 808, which introduces rotational flow to the solid support 424. The in-line mixer 804 may be passively rotated, with rotation caused by the movement of fluid through the reactor 800, or active, with rotation of the fan blade 808 powered by a small motor. In embodiments, the reactor 800 may further include one or more paddles 812 that rotate within the reactor 800, mixing the solid support 424 as fluid transfers through the solid support 424 as shown in FIG. 10B. The paddles 812 may be coupled to the in-line mixer 804. The paddles 812 may rotate passively due to fluid flow, or actively via a small motor. The embodiments of FIGS. 10A and 10B facilitate convective flow and/or mixing of components, for example by maximizing the wetted surface-to-volume ratio and minimizing pressure drop, and/or improve the CPGs' contact area, thereby enhancing one or more of mixing, mass transfer, and/or efficiency. In addition, the embodiment of FIG. 10A enhances flow distribution and minimizes the reagents' channeling as well as diffuser/distributor plate's surface fouling by placing a rotating blade under the diffuser/distributor plate, which introduces a rotational flow to the packed bed. Further, the embodiment of FIG. 10B provides hybrid synthesis systems, namely an on-demand transition between packed bed and mechanically-stirred fluidized bed. Finally, the embodiment of FIG. 10B enhances flow distribution and mixing and minimizes reagents' channeling as well as diffuser/distributor plate's surface fouling by placing rotating blades inside the column, leading to agitation and repositioning of the packed resin/CPG.

Figures 11A, 11B:
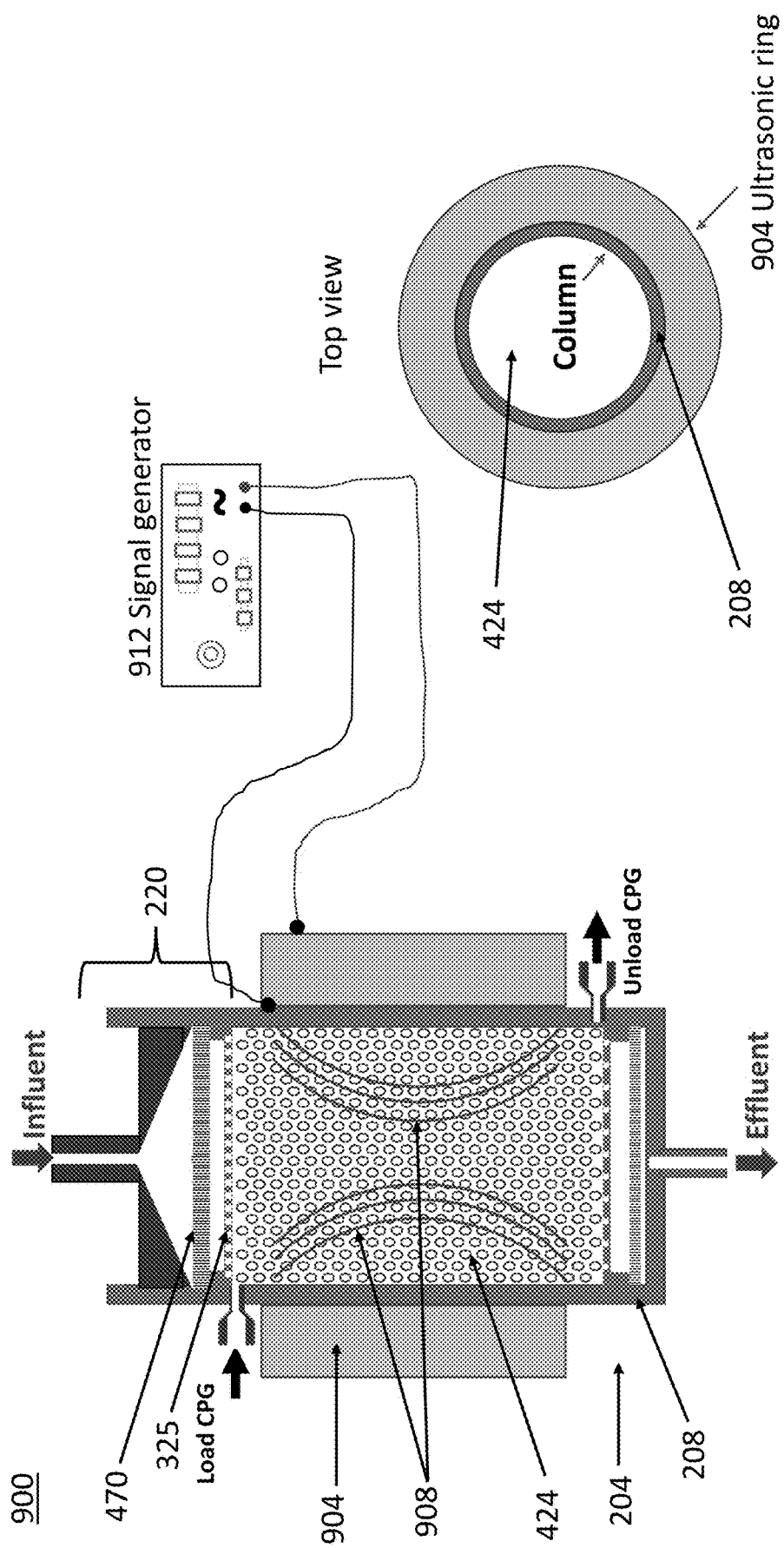
FIG. 11A is a drawing illustrating a cutaway side view of a reactor operatively coupled to a signal generator, in accordance with one or more embodiments of the disclosure.
FIG. 11B is a drawing illustrating a plan view of a reactor, in accordance with one or more embodiments of the disclosure.

FIG. 11A is a drawing illustrating a side cutaway view of a reactor 900 that includes an ultrasonic ring 904 enclosed around a section of the reactor vessel wall 208, in accordance with one or more embodiments of the disclosure. The ultrasonic ring 904 emits an ultrasonic pulse towards the reactor 900, which introduces agitation to the reactor 900 in the form of mechanical waves 908. The ultrasonic ring 904 may be controlled by a signal generator 912, which may itself be controlled by the controller 256. The mechanical waves 908 enhance mixing within the vessel 204. A top plan view of the reactor 900 is shown in FIG. 11B. In some embodiments, the diffuser 470, diffusion plate 325, first piston 220, or other component of the reactor 900 contains piezoelectric materials, such as polyvinylidene fluoride (PVDF) that vibrate when acted upon by the signal generator 912. Beyond mixing, the vibrations may also prevent deposition of foulant on the surfaces of the reactor components. The embodiment of FIGS. 11A and 11B demonstrates how ultrasound-assisted synthesis may enhance the reactions and mixing, and hence enhance the overall process of synthesis, via introducing agitation (mechanical waves) to the column.

Figure 12:
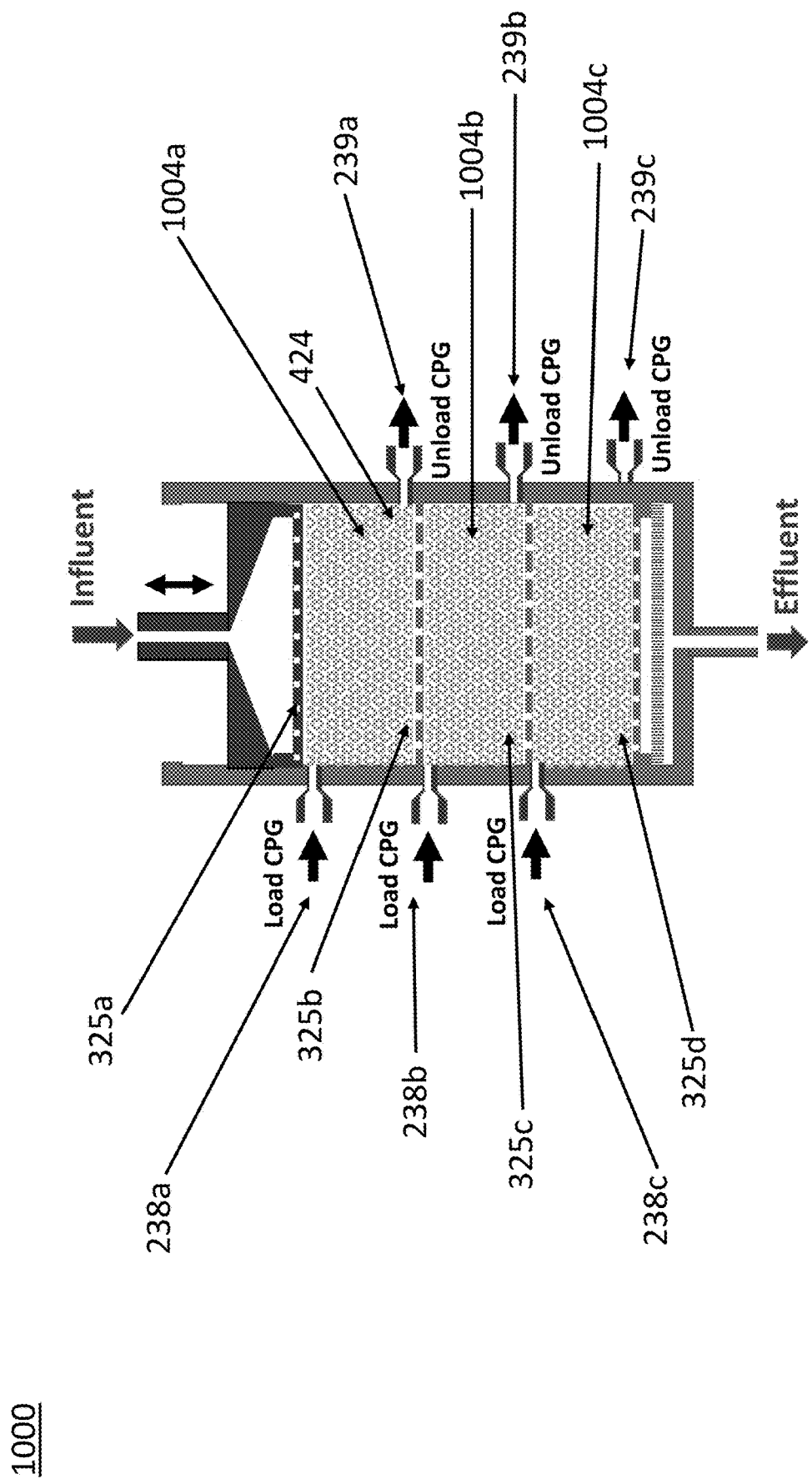
FIG. 12 is a drawing illustrating a cutaway side view of a reactor, in accordance with one or more embodiments of the disclosure.

FIG. 12 is a drawing illustrating a side cutaway view of a reactor 1000 that includes multiple distribution plates 325 a-d that define multiple sections 1004a-c packed with solid support 424. The solid support 424 may enter each section 1004a-c with respective loading ports 238a-c and unloading ports 239a-c. The embodiment of FIG. 12 thus provides a multilayer bed/column which helps to minimize the flow channeling (preferential flow) which may occur in tall and large diameter beds.

In some embodiments a reactor may be configured with a vessel having a high reactor width (e.g., or diameter) to reactor length ratio (with the solid support also having a high width to length ratio), providing a high aspect ratio of the width to the length/height of the reactor compared to other reactor embodiments disclosed herein. The reactor may include one or more distributor plates, flow distributors, or diffusers disposed within the vessel or top piston. The reactor may include any reactor width to reactor length aspect ratio including but not limited to a 1:1, 2:1, 3:1, 4:1, 5:1, 10:1, 15:1, 20:1 or higher ratios, or approximate ratios therein. For example, the reactor may be configured with a width of 15 cm and a length of 1 cm (e.g., a 15:1 ratio). The high reactor width to reactor length (W:H) reactors generally operate with a lower pressure drop when fluid flows axially across the packed bed than low W:H reactors. The reactor may also include inlets and gas entry ports that are combined or separated, as well as outlets and gas exit ports that are combined or separated. For example, the reactor may include a combined outlet and gas exit port controlled by one or more valves that control movement of effluent out of the reactor and the transfer of gas in and/or out of the reactor. The reactor may include different combinations of distributor plates, diffusers, and flow distributors, and may also include a more complex combined gas exit valve and outlet.

In some embodiments, the reactor is configured such that the influent may fill a transient reagent chamber embedded within the piston and bounded by distributor plates, diffusers, or flow distributors. For example, gas may enter through a central gas entry port, with influent entering through an adjacent inlet. Gas may exit through an adjacent vent, while the effluent exits on the opposite side of the solid support. In this manner, pressure entering the transient reagent chamber is uniformly applied from the top of the reactor and uniformly pushes the influent through the solid support with a low pressure drop. In some cases, influent may initially fill the transient reagent chamber located below the solid support. In this configuration, one or both of the pistons may have a relatively flat piston head (e.g., the piston not enclosing the transient reagent chamber or the other piston not enclosing the transient reagent chamber). In this manner, pressure entering the transient reagent chamber is uniformly applied from the bottom of the reactor and uniformly pushes up the influent through the solid support with a low pressure drop. In this configuration, the volume of the solid support may be fixed between the surrounding flow distributors or diffusers. In some embodiments where the reactor has a second piston, the second piston may also have a relatively flat piston head.

In some embodiments, the transient reagent chamber is located within the second piston. For example, influent may enter the transient reagent chamber from the bottom of the reactor. The solid support is then exposed to influent only when pressure from incoming gas is uniformly applied to uniformly push the influent through the solid support. In some embodiments, the reactor includes two transient reagent chambers, one on each side of the reactor. The two transient chambers may be encompassed within, or be adjacent to, the first piston and/or second piston. For example, influent may first fill one or the other transient reagent chambers then gas may be uniformly applied from either end of the reactor to uniformly push the reagent through the solid support.

Figure 13:
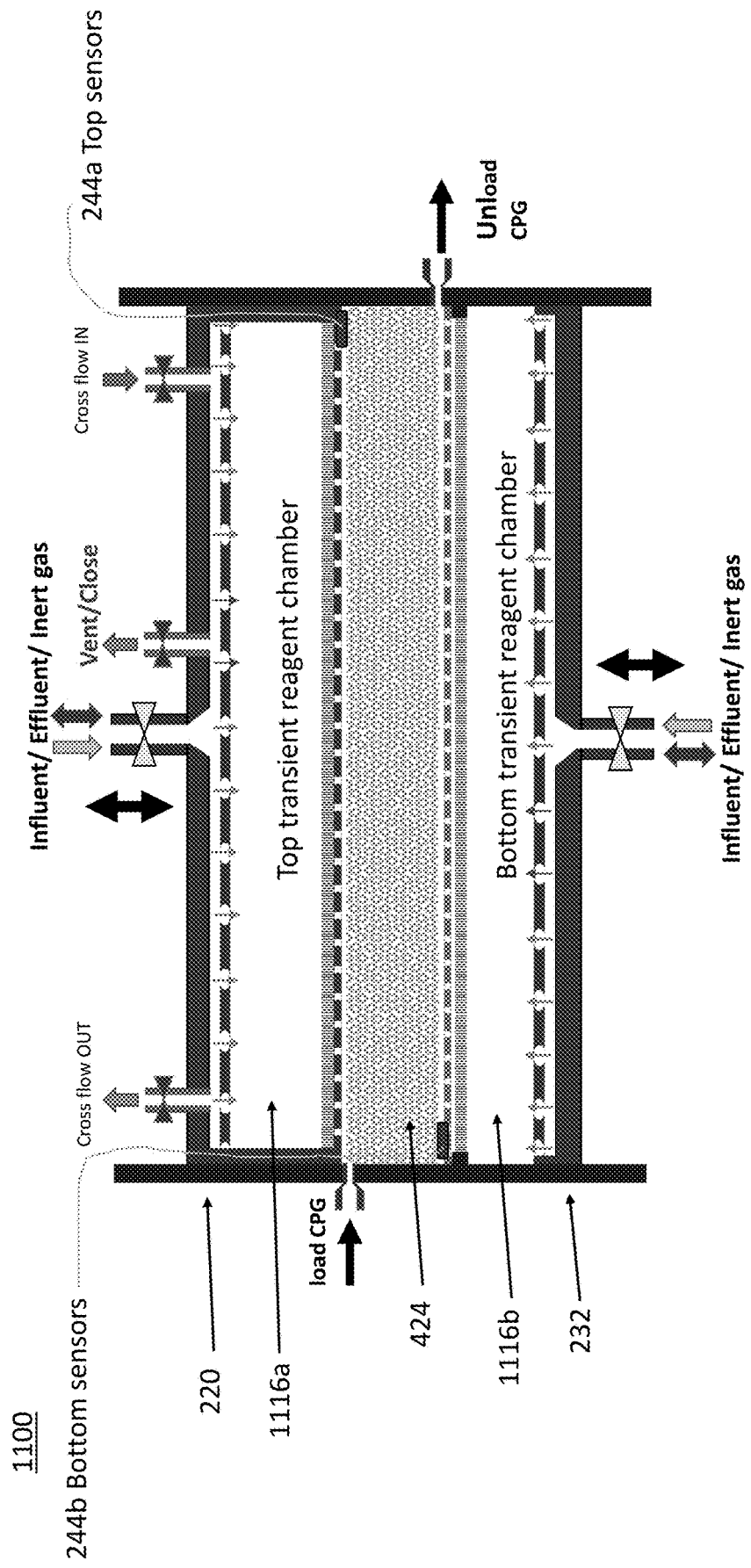
FIG. 13 is a drawing illustrating a cutaway side view of a reactor, in accordance with one or more embodiments of the disclosure.

In some embodiments, reactor 1100 includes one or more sensors 244 (e.g., a top sensor 244a and a bottom sensor 244b) that detect and/or measure one or more characteristics of the reactor 1100, such as pressure within the vessel 204 or load applied to the pistons, as shown in FIG. 13. Influent enters top or bottom transient reagent chambers 1116a-b, and either the top piston 220 or the bottom piston 232 moves, or inert gas enters, the top or bottom transient reagent chambers 1116a-b to uniformly push the influent through the solid support 424. The sensors 244 may be located anywhere within, or adjacent to, the reactor 1100. The sensors 244a-b may further include any type of sensor including but not limited to temperature sensors, pH sensors, conductivity sensors, load cells, strain gauges, and/or UV sensors. In the embodiment of FIG. 13, the reagents may first fill the top/bottom transient reagent chambers, after which either the bottom dynamic flat (without embedded transient chamber) piston moves upward, or inert gas is added to the transient chamber embedded in the top piston to uniformly push the reagent through the resin with a lower pressure drop. Although the embodiment of FIG. 13 shows one particular example of where the pressure sensors may be located, in other embodiments one or more sensors could be placed in other locations and in addition to a pressure sensor the sensors could include one or more of sensors for temperature, pH, conductivity, UV, etc., which may also be integrated with the column.

Figures 14A, 14B:
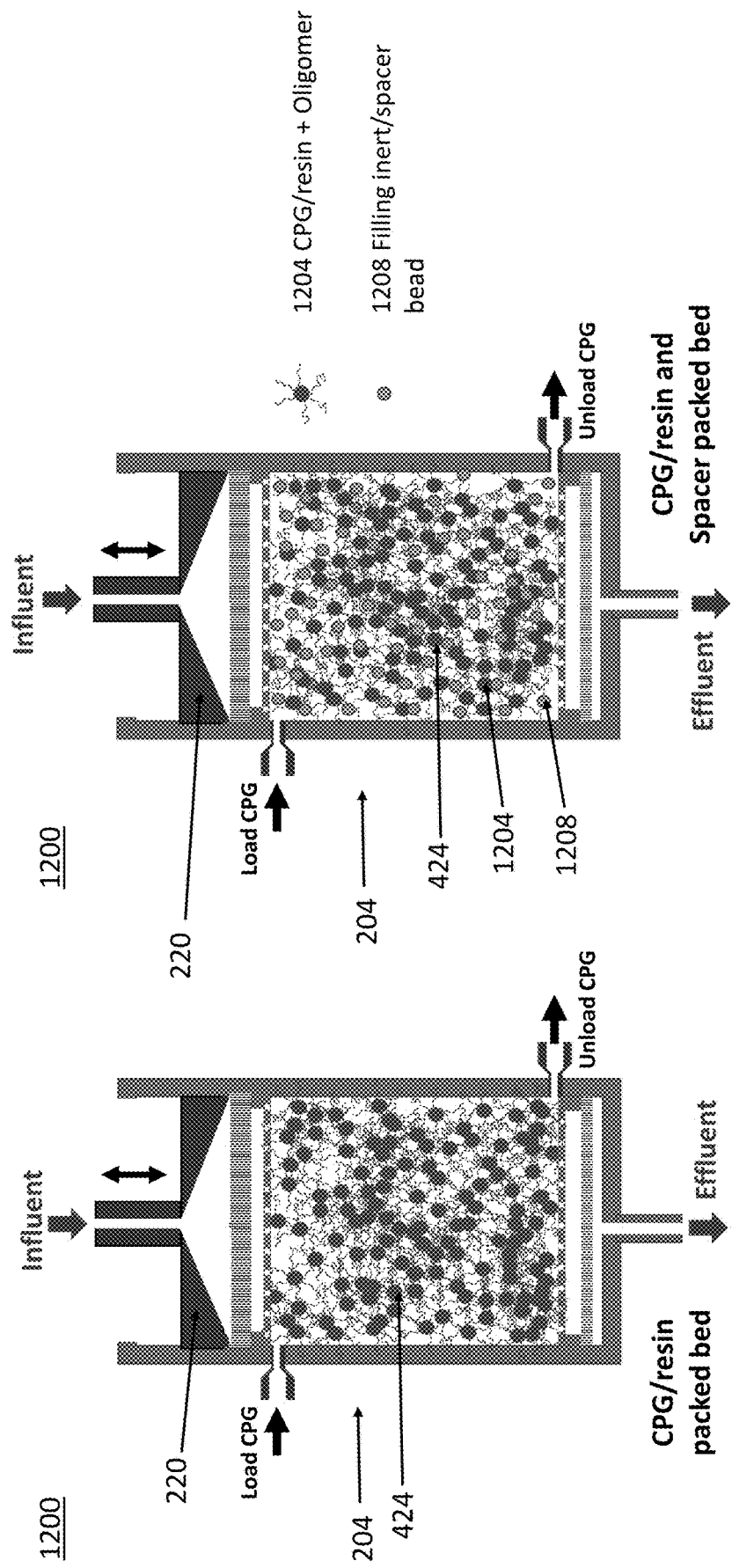
FIGS. 14A-14B are drawings illustrating cutaway side views of a reactor, in accordance with one or more embodiments of the disclosure.

FIGS. 14A-14B are drawings illustrating a side cutaway view of a reactor 1200 containing a solid support 424 that itself includes a plurality of solid support units 1204 (e.g., CPG/resin+oligomer). The solid support units 1204 may include any type of solid support material including but not limited CPG or resin. The solid support units 1204 may include, be crosslinked to, or otherwise be coupled to, a linked substituent including but not limited to an oligomer, such as an oligonucleotide. The solid support 424 may further include a support spacer 1208 (FIG. 14B), an inert component that does not bind to influent components, but rather introduces extra space or voids within the solid support 424. For example, for a solid support 424 containing solid support units 1204 that include a linked oligomer, the support spacer 1208 may increase the ability of the oligomer to extend outward from the solid support unit (e.g., increasing the functional length of oligomer). This support spacer 1208 improves the functional length of the oligomer with minimal pressure elevation within the column. The support spacer 1208 may take on any physical form, such as a spherical or other shaped bead or an elongated shape such as a grain shape. The support spacer 1208 may include any type of material including but not limited to glass and quartz microbeads, polystyrene, and CPG. For example, the support spacer 1208 may include dry polystyrene or polystyrene pre-swelled in a solvent such as toluene. In the embodiment of FIG. 14B, the addition of inert filling/spacer materials introduces extra space/void to permit the oligomer to increase in length with minimum pressure elevation within the column. Other solid supports including dry polystyrene (PS) or pre-swelled PS in a solvent (e.g., toluene) can also be used as resins.

Figure 15A:
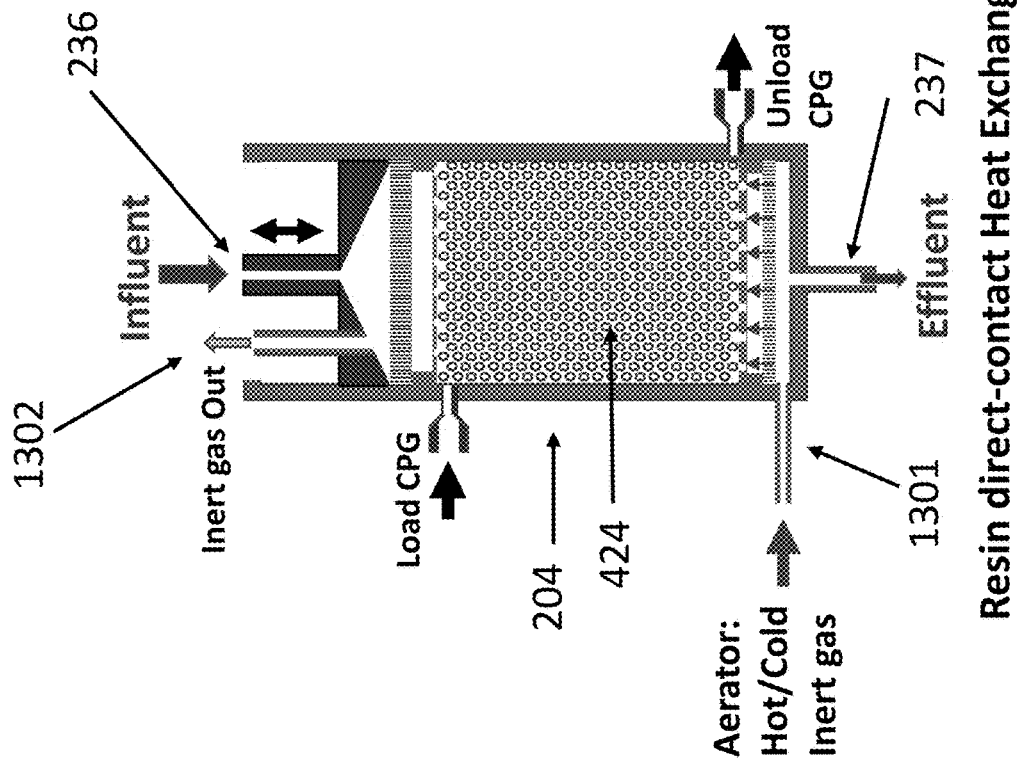
FIG. 15A is a drawing illustrating a cutaway side view of a reactor, in accordance with one or more embodiments of the disclosure.
Figure 15B:
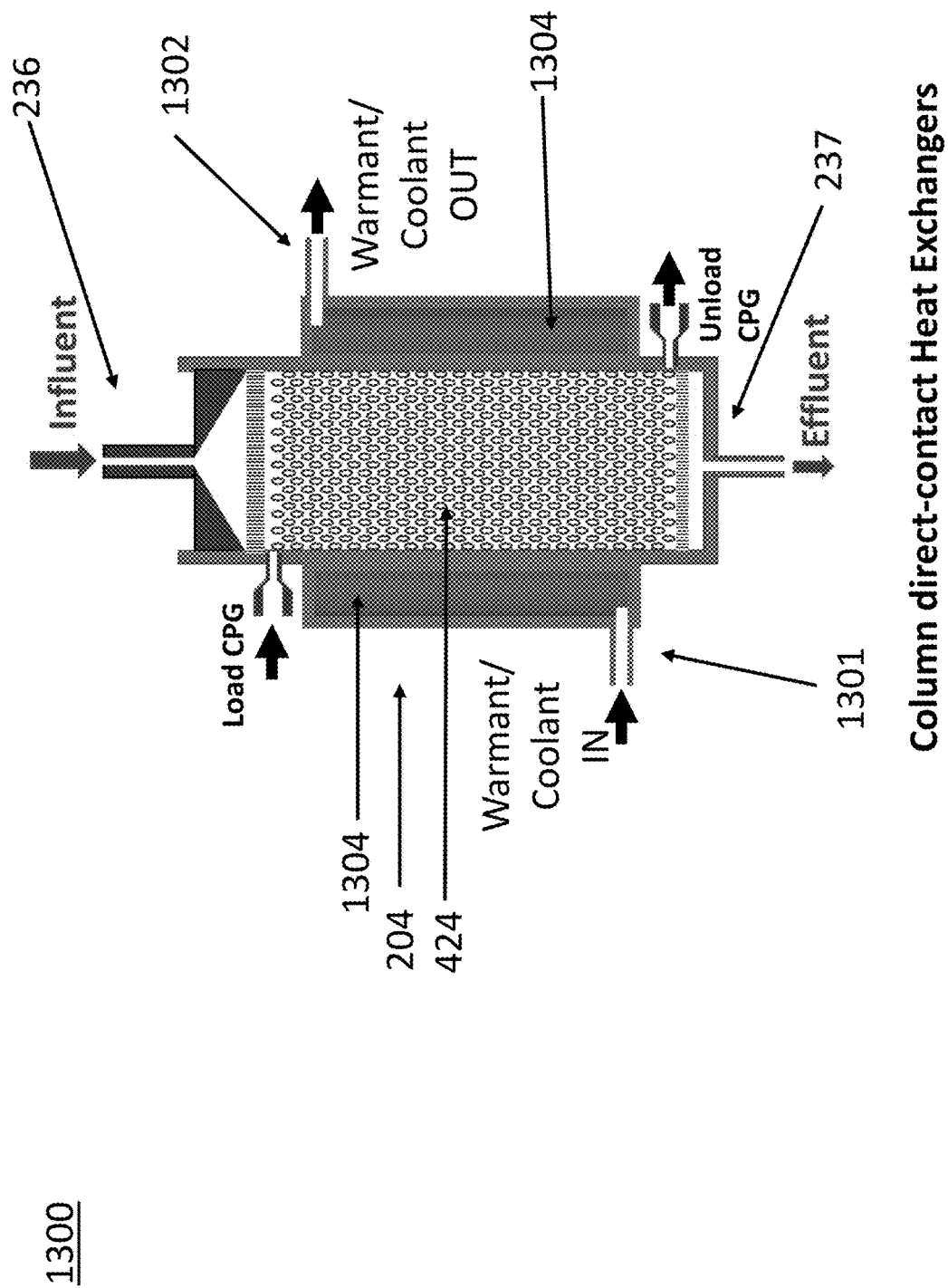
FIGS. 15B-15D are drawings illustrating cutaway side views of a reactor operatively coupled to a heat exchanger, in accordance with one or more embodiments of the disclosure.
Figure 15C:
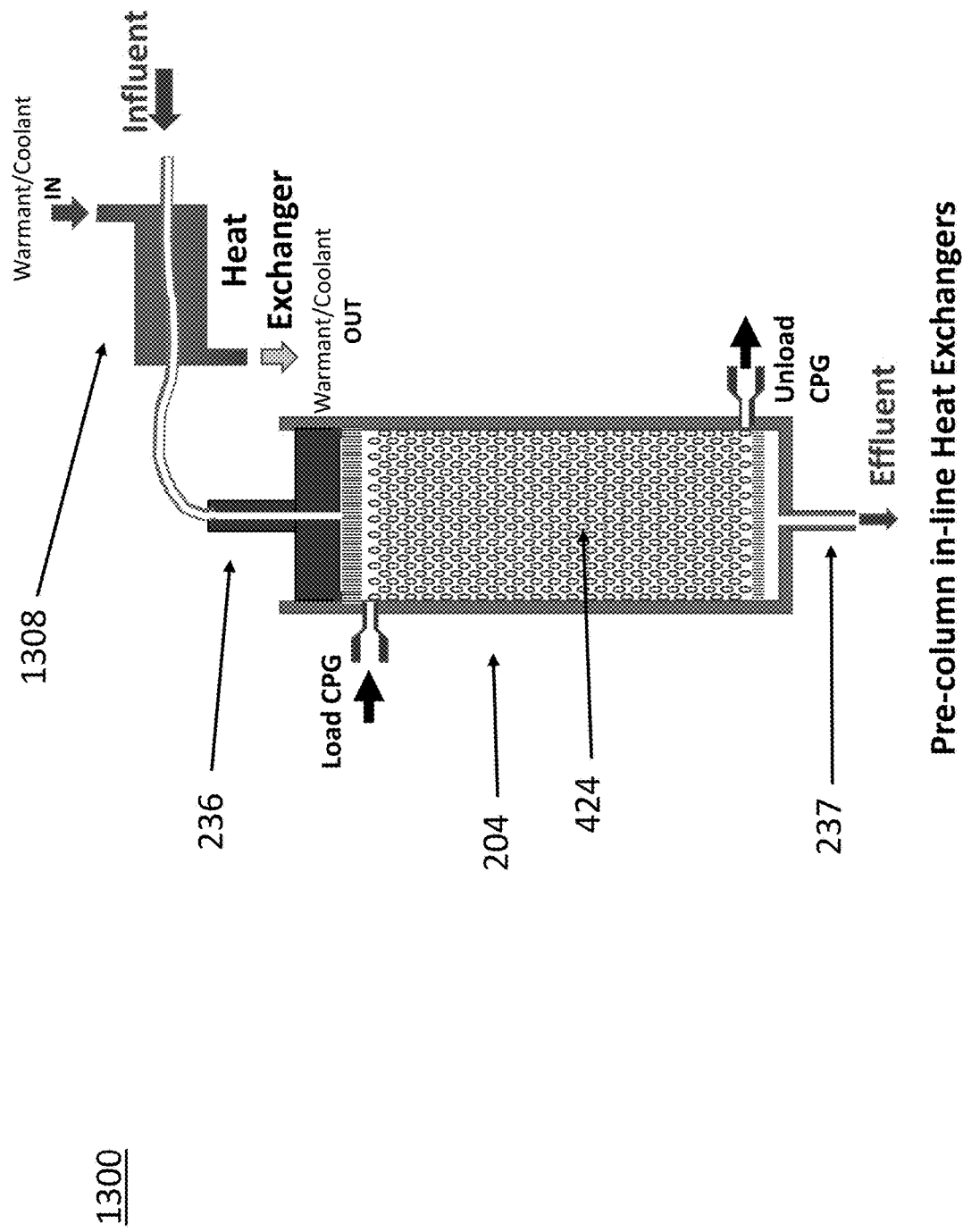
Figure 15D:
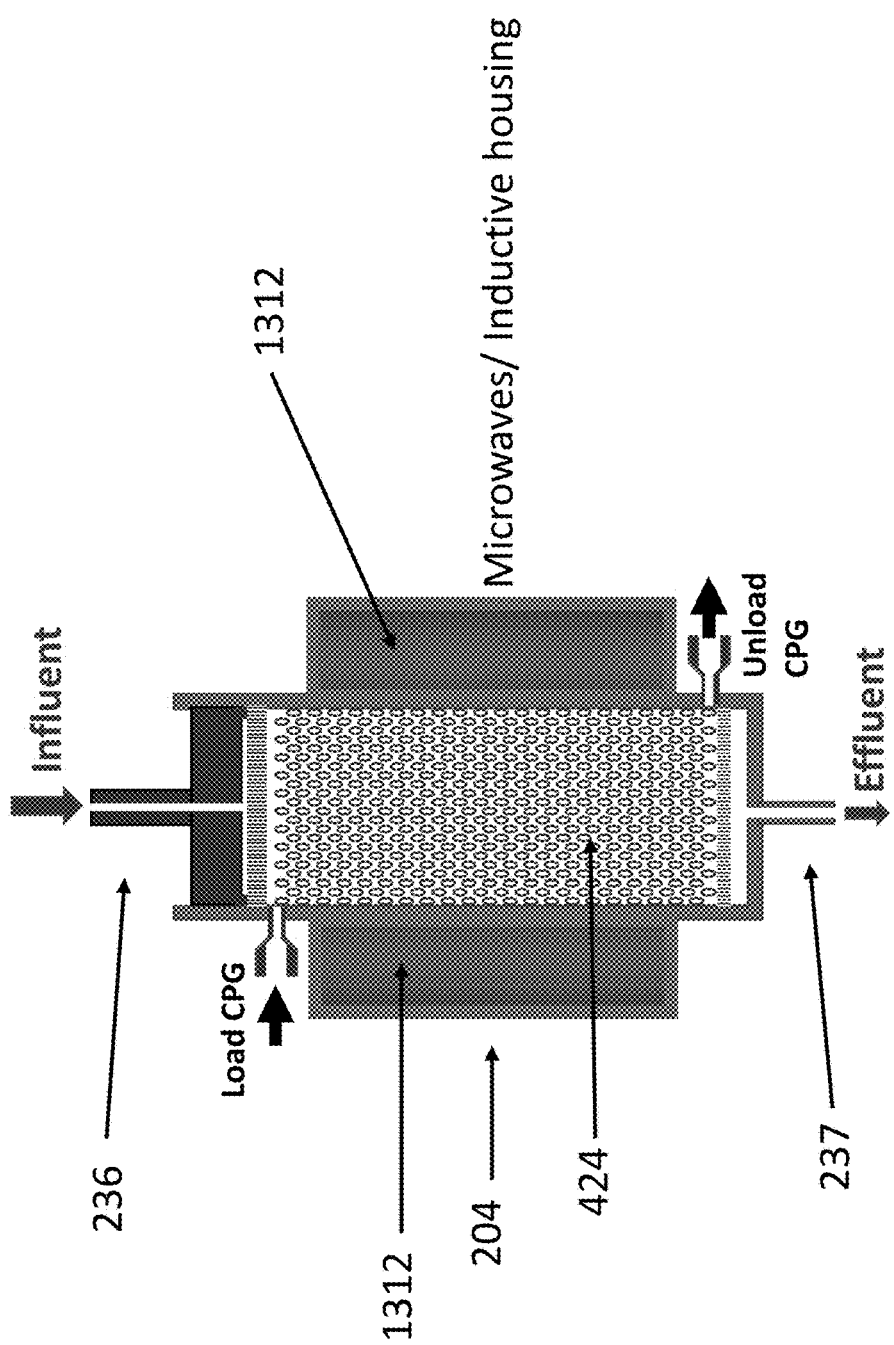

In some embodiments, the vessel 204 and/or the influent may be heated or cooled to control (e.g., increase or decrease) chemical reaction rates, as shown in reactor 1300 of FIGS. 15A-15D, according to one or more embodiments of the disclosure. For example, the reactor 1300 in FIG. 15A is shown having a fluid entry port 1301 that allows cooled or heated fluid or inert gases to enter the vessel, which raises or lowers the temperature of the solid support 424 within the vessel. The fluid may then exit the vessel 204 via the fluid exit port 1302 or other opening. In another embodiment, the reactor 1300 may include a jacket 1304 that warms or cools the vessel 204, as shown in FIG. 15B. For example, the jacket 1304 may receive warmed or cooled fluid via the fluid entry port 1301, which warm the vessel 204 during the transit of the fluid through the fluid exit port 1302. In some embodiments, the reactor 1300 includes a heat exchanger 1308 that increases or decreases the temperature of the influent before the influent enters the vessel 204, as shown in FIG. 15C. In some embodiments, the reactor 1300 includes a heat exchange housing 1312 that heats and/or cools the vessel 204 directly (e.g., without circulating fluid or influent) as shown in FIG. 15D. The heat exchange housing 1312 may use any type of heating and/or cooling technology including but not limited to microwave heating, inductive heating, and Peltier heating/cooling. In general, a heat exchanger may be integrated into the system in cases where pre-heating or cooling of the reagents is required to increase the chemical reaction rates, hence reducing total synthesis time. A heat exchanger may be integrated into the system to provide heat using microwaves, radiative, or inductive mechanisms of heat transfer (e.g., an element may be placed inside the column which can be actuated externally), and heat exchangers may also be used to readily create a uniform temperature across the column.

Figure 16B:
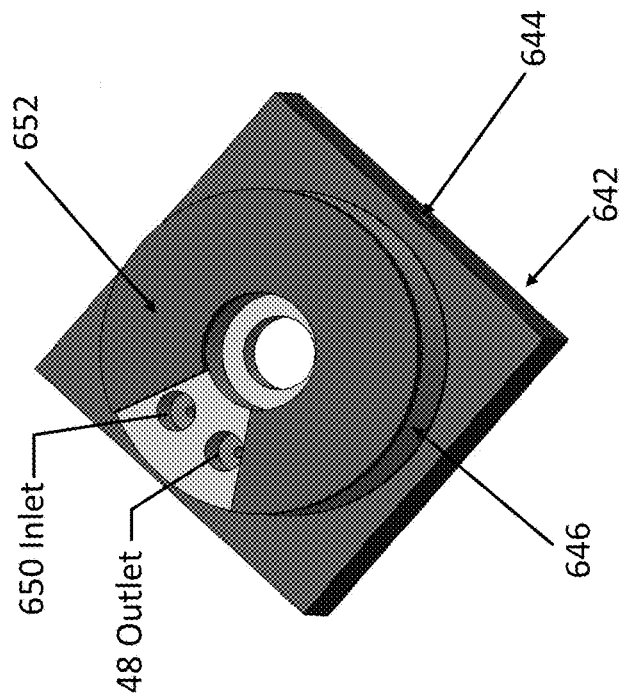
Figure 16A:
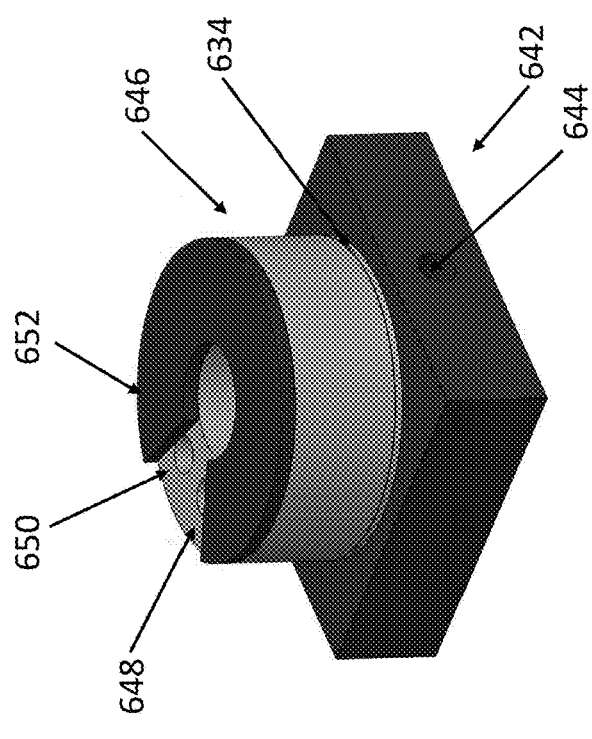

FIGS. 16A and 16B are perspective and near-plan views of a degasser module 640, respectively, in accordance with one or more embodiments of the disclosure. The degasser module 640, which may degas as well as heat incoming fluids (e.g., instead of or in addition to the fluid warming mechanisms disclosed in FIG. 15), may be disposed within the degasser housing 632 or may itself include a housing element. The degasser module further includes a gas block 642 that houses a gas/bubble outlet 644 that allows gas to escape the degasser module 640. The degasser module 640 further includes a gas-permeable porous membrane 634 and a liquid block 646 that includes a degasser inlet 648 and a degasser outlet 650 as well as internal channels that allow liquid to be exposed to the gas-permeable porous membrane 634. The degasser module 640 may further include a heater element 652 that may be controlled by a programmable heat source. FIGS. 16C and 16D are exploded views of the degasser module viewed from different angles. The exploded view in FIG. 16D exposes the fluid channel interface 654 which permits fluid from within the fluid block 646 to contact the gas-permeable porous membrane 634. The exploded view in FIG. 16C exposes the gas channel interface 656 that permits gas to pass into the gas block 642 from the gas-permeable porous membrane 634. In embodiments of the device of FIGS. 16A-16D, reagents (with or without bubbles) enter the device via the inlet port. While passing through the device and above the porous gas-permeable membrane, bubbles are removed from the reagents. The temperature of the reagents can also be controlled via the programmable heat source while passing through the integrated device.

FIG. 17 is a drawing illustrating a side cutaway view of a reactor 1400 having a multitude of sampling ports 1404a-d (in-process sampling ports), in accordance with one or more embodiments of the disclosure. Each sampling port allows a user to obtain a sample of influent, effluent, solid support (e.g., resin) or other reactor component for quality assessment. The reactor 1400 may have any number of any type of sampling port 1404a-d. For example, the reactor 1400 may include an inlet sampling port 1404a for sampling influent. In another example, the reactor 1400 may include an outlet sampling port 1404b for sampling effluent. In yet another example, the reactor 1400 may include one or more resin sampling ports 1404c-d to determine the quality of the resin, or the binding of materials to the resin. The embodiment of FIG. 17 may facilitate in-line and in-column quality control (QC) sampling, where resin and/or fluid sampling may be performed at different stages of a synthesis process for QC or other purposes.

Figure 18B:
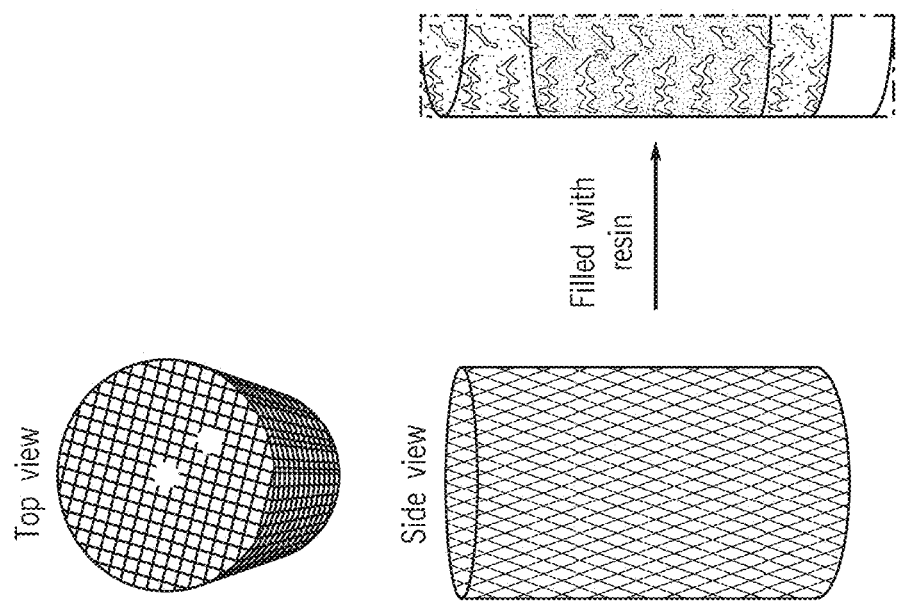
FIGS. 18A-18B are drawings illustrating cutaway side views of a reactor and a resin-filled scaffold/frame placed within the reactor, in accordance with one or more embodiments of the disclosure.
Figure 18A:
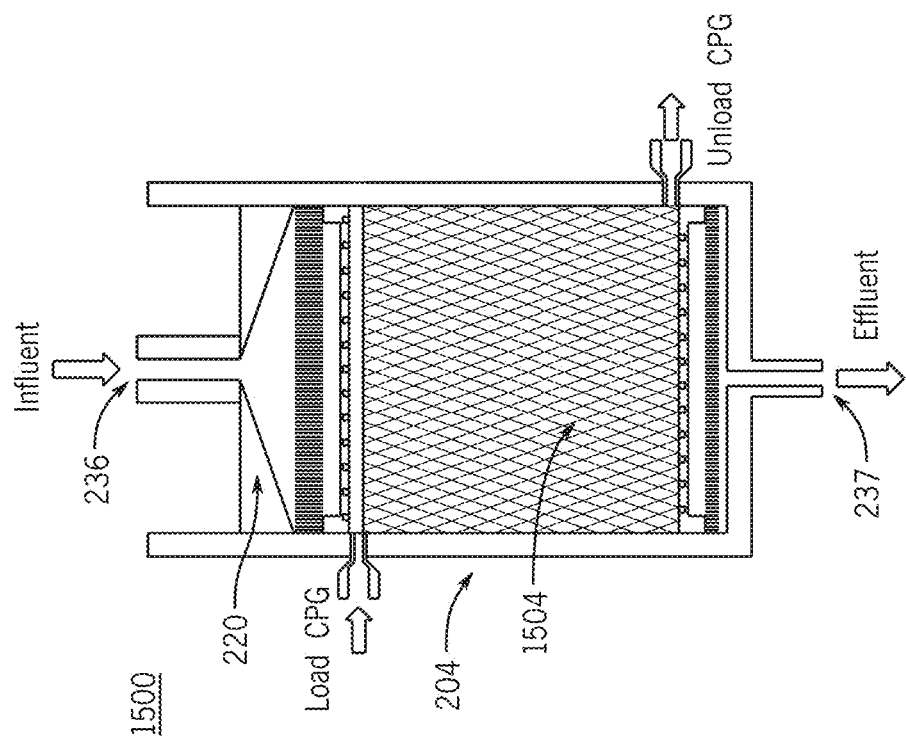

FIG. 18A is a drawing illustrating a side cutaway view of a reactor 1500 having a structured support 1504 within the vessel 204, in accordance with one or more embodiments of the disclosure. FIG. 18B shows a photograph of the structured support from the top and side and a diagram of the side view of the support filled with resin. The structured support 1504 features a scaffold or framing with pockets that are filled with resins or other solid support materials. Reactors 1500 that include the structured support 1504 may have lower pressure drops, higher flow rates, and enhanced flow distribution as compared to vessels 204 that do not contain structured supports 1504. The structured support may also effectively allow synthesis reactions to occur within the reactor 1500 using relatively small volumes of reagents (e.g., influent and/or solid support). The structured support 1504 may bind, or not bind, components within the influent. The structured support 1504 may be configured as a self-supporting structure, such as a cylinder that can be inserted into the vessel 204, or as a structure that is applied as a multitude of layers into the vessel 204. In various embodiments, structured packed resins may include flexible structured scaffolds/frames that are filled with resins which may be used inside the column. Using a structured support provides one or more of: a lower pressure drop, higher flow rates, and/or enhanced flow distribution. The empty spaces inside the scaffolds may be filled with functionalized resins that are confined in a microenvironment for effective reactions while using much lower volumes of reagents.

Figure 19A:
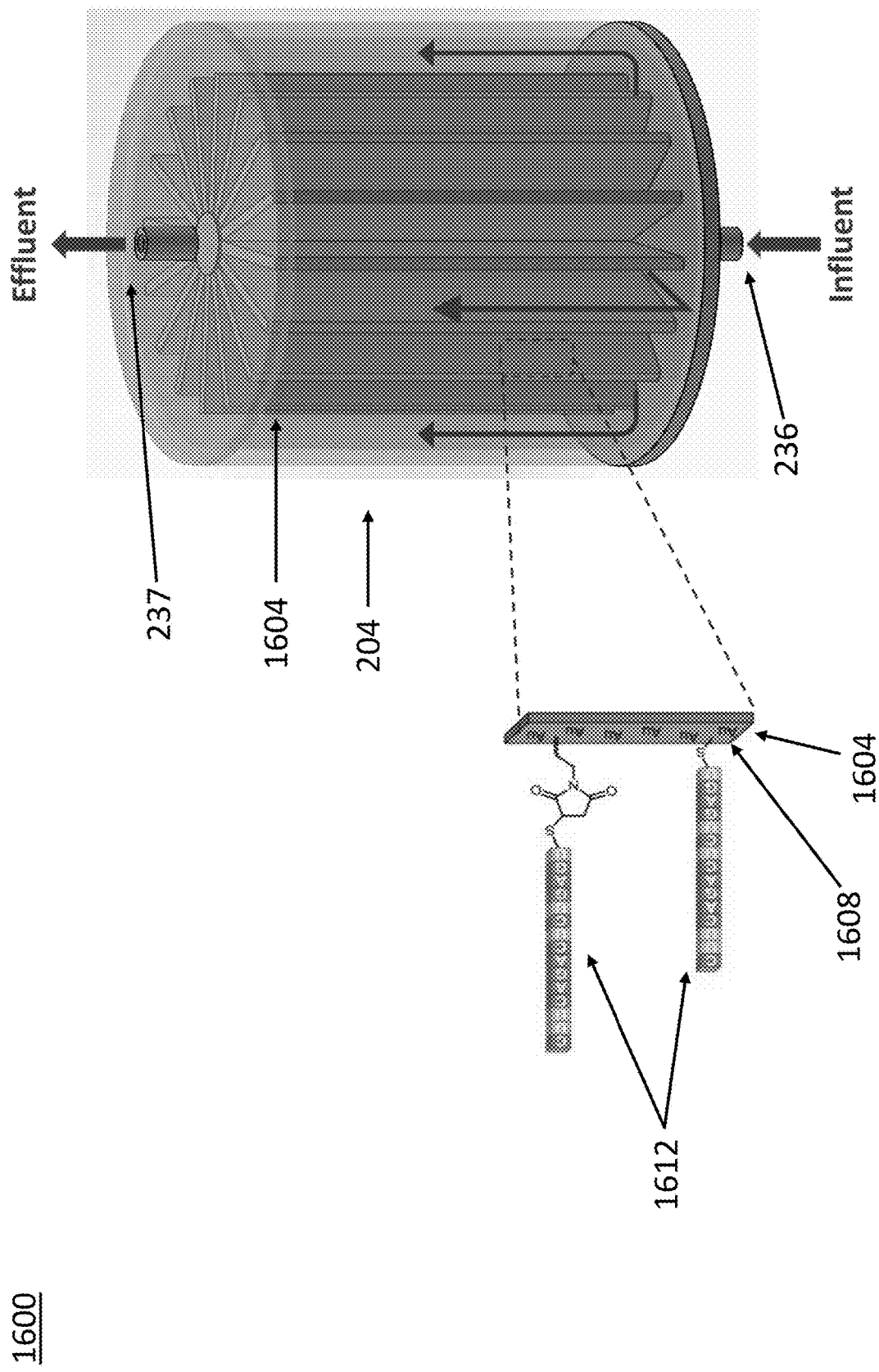
FIGS. 19A-19B are a perspective and partially transparent views of a reactor, in accordance with one or more embodiments of the disclosure.
Figure 19B:
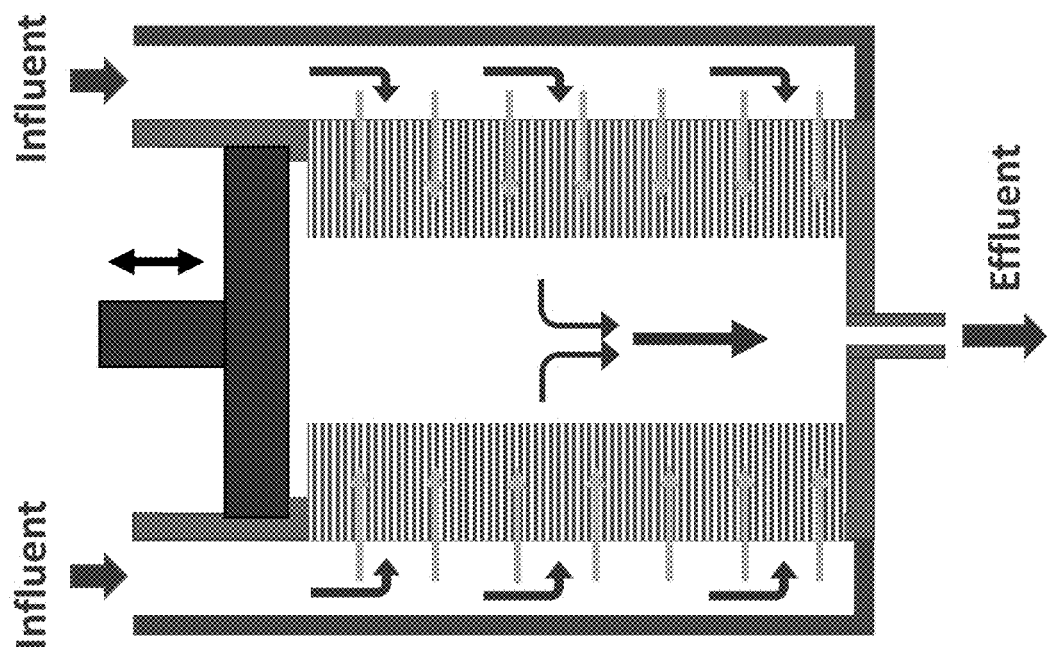

FIG. 19A is a perspective and partially transparent view of reactor 1600, in accordance with one or more embodiments of the disclosure. The reactor 1600 includes a resin-free vessel 204 that includes an array or stack of plates 1604 (e.g., flat plates) or hollow tubes with functionalized surfaces 1608 containing linkers, or other chemical moieties. The plates 1604 or tubes may be placed in a radial (e.g., as shown in FIG. 19A) or an axial/parallel configuration within the vessel 204 (FIG. 19B). Oligomers 1612 may then be synthesized directly from the surface 1608 of the plates 1604 as influent flows pass via convection. The plates 1604 or tubes may also include filaments or polymer brushes to provide a surface 1608 for synthesizing the oligomers 1612. The reactor 1600 may have lower pressure drop and greater flow characteristics than other vessel designs.

In some embodiments, configurations such as those shown in FIGS. 19A and 19B provide for a convection-dominated flow by providing a resin free oligo synthesizer system; in contrast, resin-based oligo synthesizers are based on diffusion-dominated flow. An array or stack of flat plates (e.g., as shown in FIGS. 19A, 19B) or hollow tubes with functionalized surfaces (which include monolayers and/or linkers attached to the surfaces) may be positioned in an axial (parallel, FIG. 19B) or radial (shown in FIG. 19A) configuration inside the synthesizing column. In the configurations of FIGS. 19A and 19B, oligomers will grow directly on the surfaces of the flat plates, as opposed to growing inside resin pores when CPG or other (porous) resins are used. In configurations such as FIGS. 19A and 19B, polymer brushes may also be used instead of or in addition to monolayers to boost the yield of synthesis. Multiplex synthesis is facilitated using these column designs in part due to the columns' low pressure drop and similar flow characteristics among columns.

In various embodiments a reactor may include a resin-free vessel which itself includes a porous membrane with functionalized groups attached to the surface of the membrane. The porous membrane may be configured as a flat plate or as a series of hollow tubes. Influent is then driven by a pressure difference across the porous membrane or by a specific flow rate. In this manner, the influent, and influent components, are transported by convection of the influent through the pores of the porous membrane. Multiplex synthesis is possible through reactor due to the low pressure drop and flow characteristics of the reactor.

It should be understood that any of the reactors disclosed herein may include one or more, or all, components of any other reactor, and vice-versa. Any of the disclosed reactor systems may utilize any reactor, and the reactor may be of any size and made of any material including but not limited to glass, plastic, or stainless steel. The reactor may have any number of components described herein. For example, a reactor shown with a single first piston 220 may also include a second piston 232, and a reactor shown with both a first piston 220 and a second piston 232 may be implemented within the reactor system 242 with only the single first piston 220, or the single second piston 232.

Figure 20:
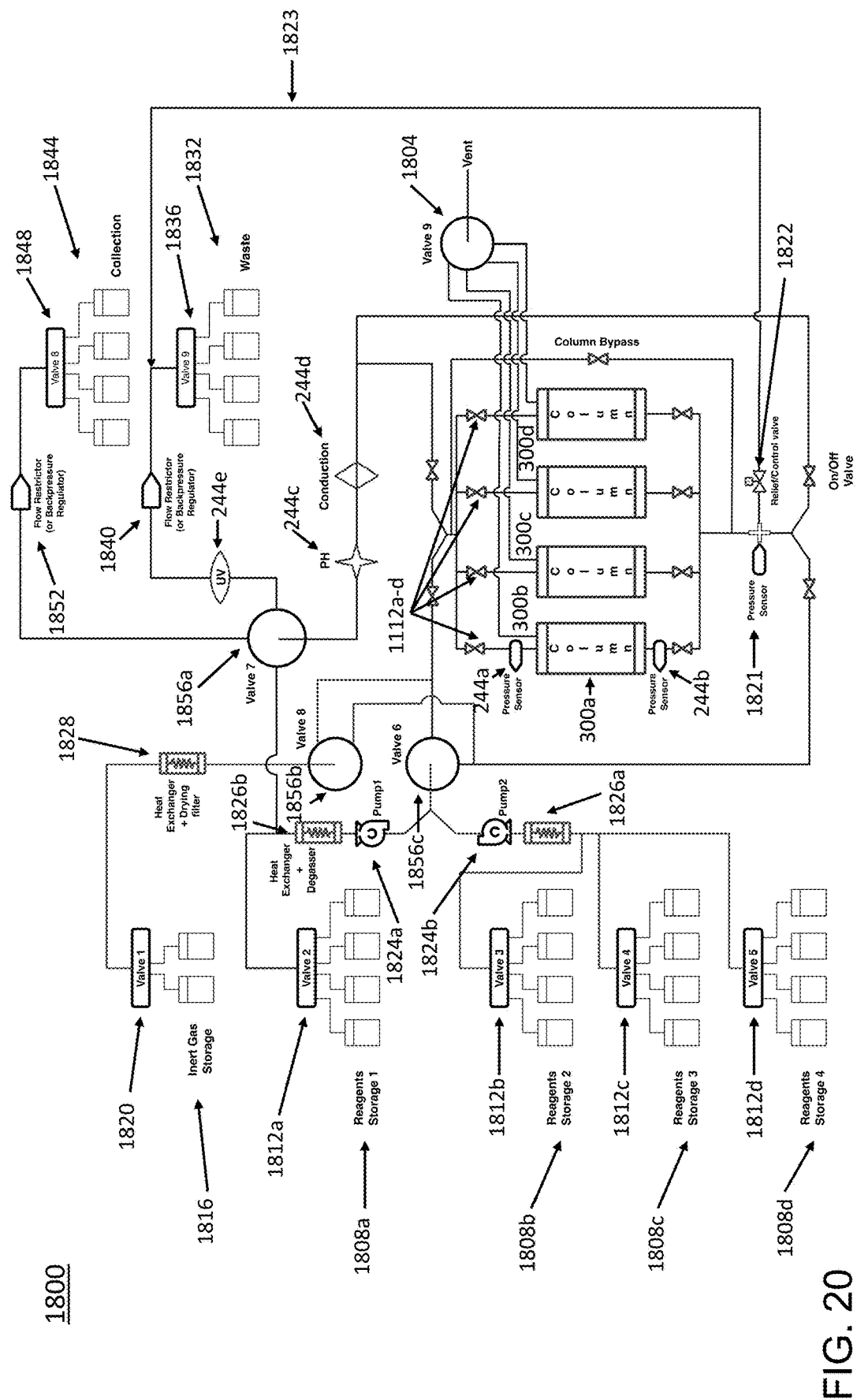
FIGS. 20-22 are flow schemes for polymer synthesis that include at least one reactor, in accordance with one or more embodiments of the disclosure.
Figure 21:
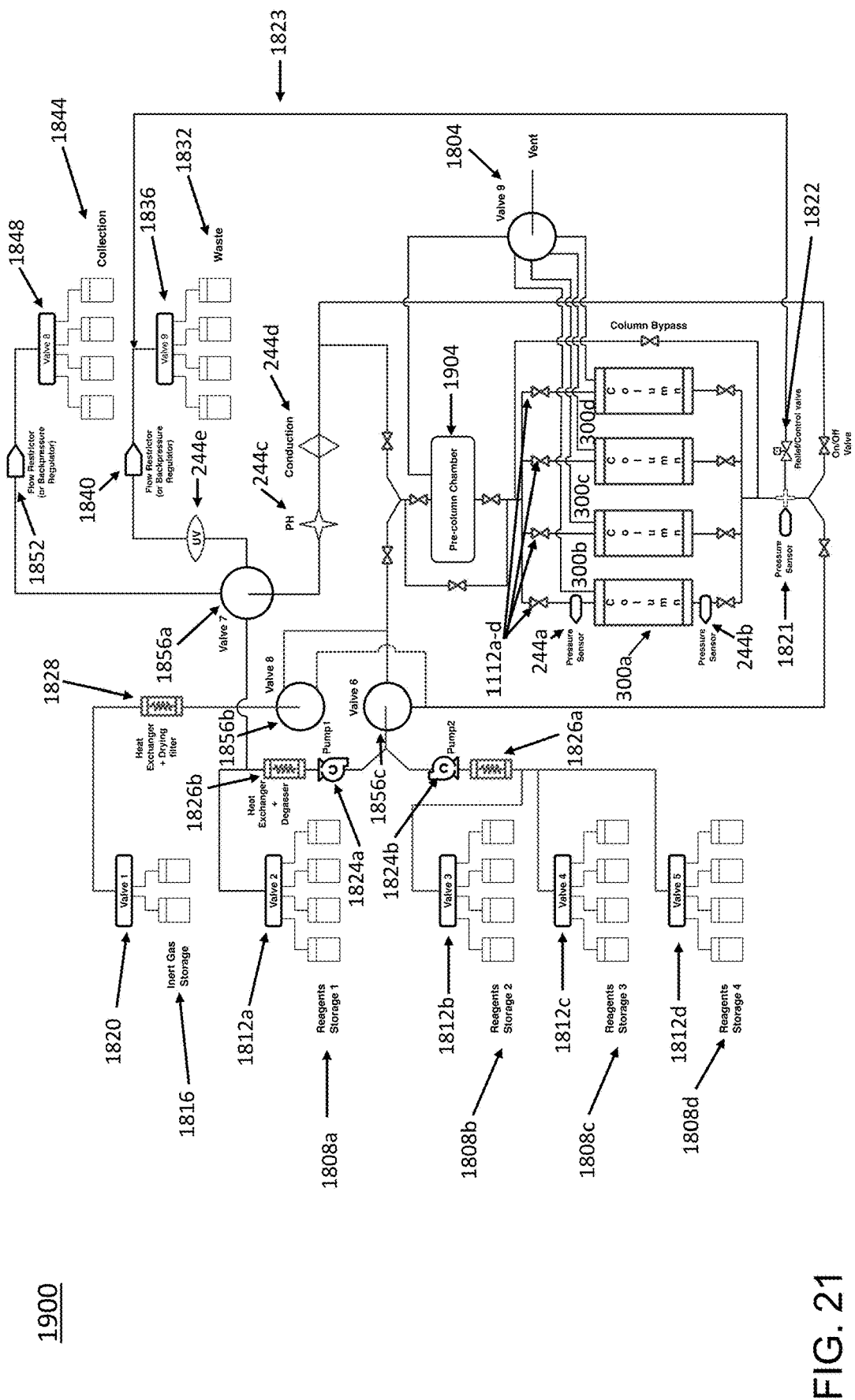
Figure 22:
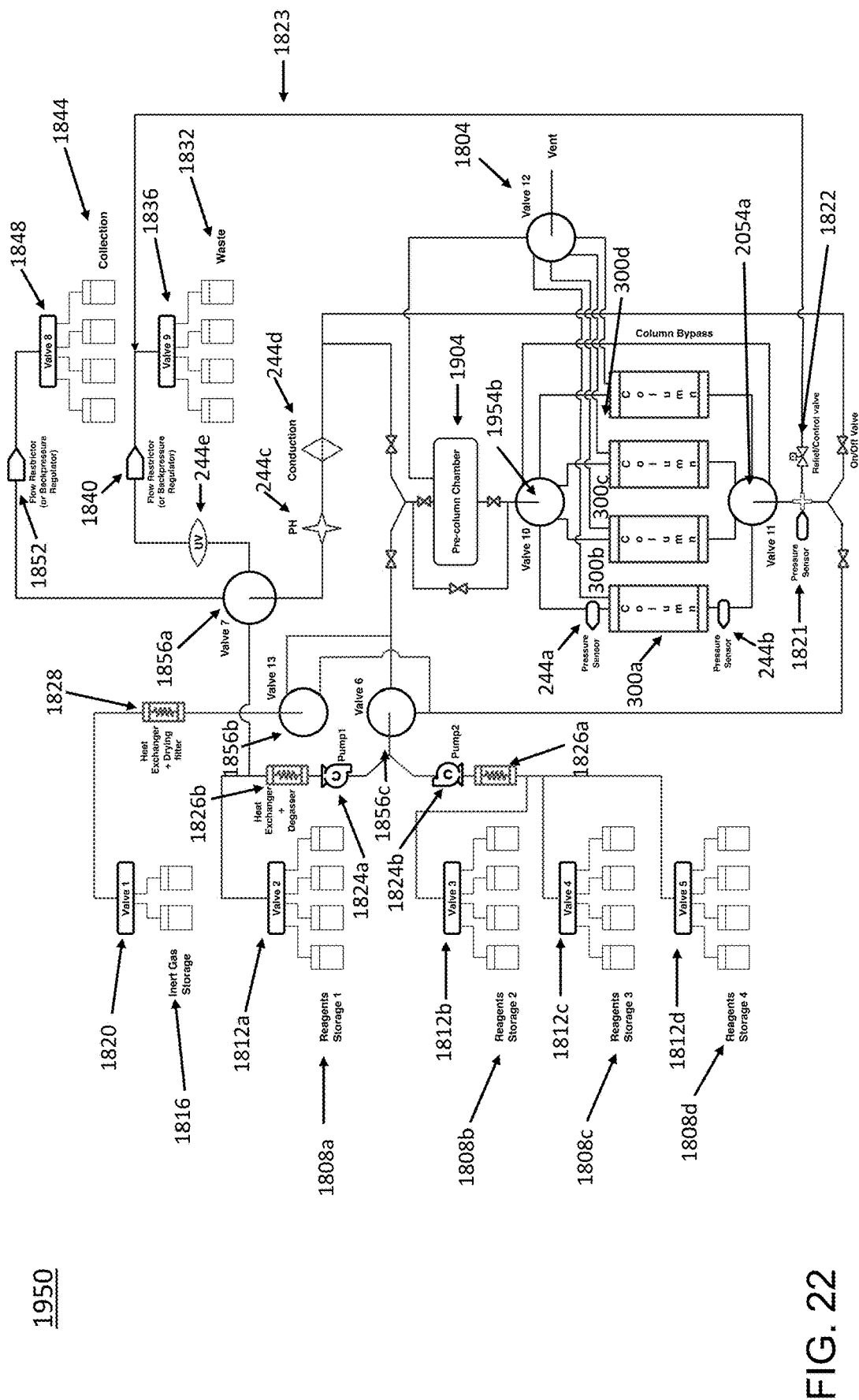

FIGS. 20-22 are flow schemes 1800, 1900, 1950 for synthesis that include the reactor 300, in accordance with one or more embodiments of the disclosure. The flow schemes 1800, 1900, 1950 may include, or be included within, any reactor system 242. The flow schemes 1800, 1900, 1950 may also utilize any reactor or number of reactors disclosed herein. The flow schemes 1800, 1900, 1950 may include additional componentry and different flow paths to achieve polymer synthesis using the reactors.

Flow scheme 1800 includes reactors 200a-d that include, are adjacent to, or are in-line with, one or more sensors 244a-b (e.g., pressure sensors). Other sensors 244c-e may be included within the flow scheme 1800 and/or interconnected to the reactors 200a-d including but not limited to a pH sensor 244c, a conduction sensor 244d, and a UV sensor 244e. The flow scheme 1800 includes a master vent 1804 coupled to reactor vents 340. The flow scheme 1800 includes a plurality of valves 1112a-d that control the flow of gas and fluids (e.g., influent, effluent). The flow scheme 1800 further includes a series of reagent storage units 1808a-d that store reagents (e.g., nucleotide solutions, wash solutions, reaction solutions) that are coupled to the rest of the flow scheme 1800 via unit valves 1812a-d. The flow scheme 1800 may also include gas storage units 1816 coupled to the rest of the flow scheme 1800 via a gas valve 1820.

The flow scheme 1800 may further include one or more pumps 1824a-b that drive fluids through the flow scheme 1800. The flow scheme may further include fluid control units 1826*a-b*. The fluid control units 1826*a-b* may control the temperature of the fluid (e.g., via a heat exchanger) or may degas the fluid via a degasser. The flow scheme 1800 may also include a gas control unit 1828 that controls the temperature of the gas (e.g., via a heat exchanger) or may remove moisture from the gas via a drying filter or other drying device.

The flow scheme 1800 may further include a waste unit 1832 controlled via a waste valve 1836 and a waste flow restrictor/back pressure regulator 1840. The flow scheme may further include a collection unit 1844 for collecting finished product that is controlled via a collection valve 1848 and a collection flow restrictor/back pressure regulator 1852. The flow scheme may further include a series of unit valves 1856*a-c* that control fluid movement between the waste unit 1832, the collection unit 1844, the reagent units 1812*a-d*, and the gas storage unit 1816. The flow schemes 1800, 1900, and 1950 may each also include an optional pressure sensor 1821, relief/control valve 1822, and relief/control line 1823 that directs fluid toward the waste unit 1832 if the flow schemes 1800, 1900, 1950 are exposed to high pressure or other aberrant circumstances.

Flow scheme 1800 is designed to run at least four reactors 200 in parallel. Furthermore, the flow scheme may include additional valves 1112*a-d* and in-line sensors 244, making it possible for the flow scheme 1800 to run all reactors 200 in parallel and independent of each other (e.g., as a multiplexed reactor set). Reagents and other fluids may be delivered to the reactors 200*a-d* from the top or bottom of the reactor 300*a-d*. The flow scheme 1800 may also include other sensors 244, such as temperature sensors.

Flow scheme 1900, which is similar to flow scheme 1800, further includes a pre-reactor chamber 1904 placed above or below the reactors 200*a-d*. The pre-reactor chamber 1904 may be pre-filled with reagents via the one or more pumps 1824*a-b*. The pre-reactor chamber 1904 may also be pressured by inert gas from the gas storage unit 1816 that pushes reagents into the reactors 200*a-d* at faster flow rates. Flow scheme 1950, which is similar to flow scheme 1900, includes rotary/switch/selector valves 2054*a-b* in place of the on/off valves 1112*a-d* that are seen on either side of the reactors 200*a-d* in flow schemes 1800, 1900.

Figure 23:
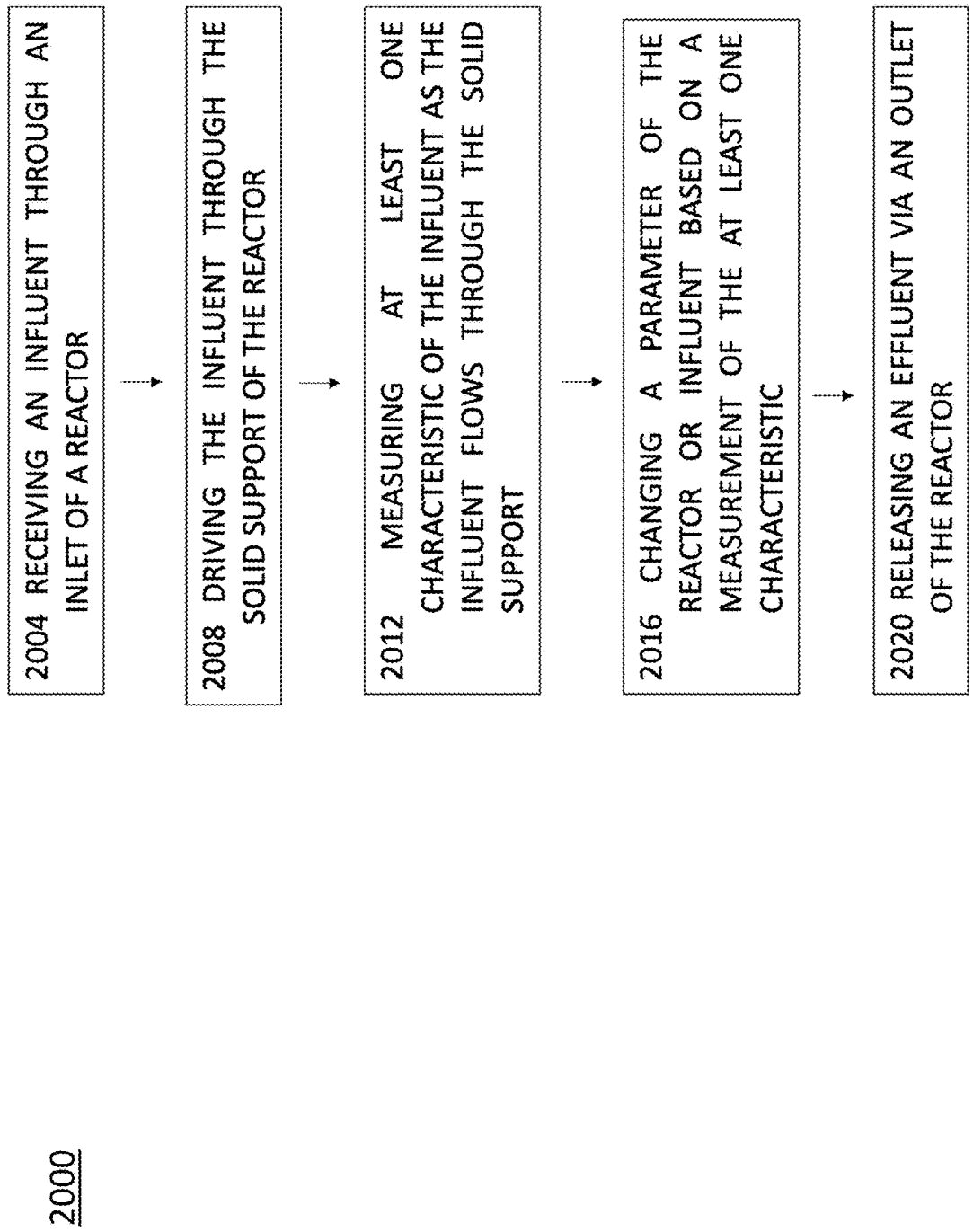
FIG. 23 is a flowchart illustrating a method for transferring an influent through a reactor, in accordance with one or more embodiments of the disclosure.

FIG. 23 is a flow diagram illustrating a method 2000 for transferring influent through a reactor, in accordance with one or more embodiments of the disclosure. The transfer of influent through a reactor may include but not be limited to the addition of a wash solution through a solid support 424, the addition of reagents to the solid support 424 during synthesis of an oligomer, or the addition of reagents to the solid support during the cleaving and/or purification of a compound from a mixture.

In embodiments, the method 2000 includes a step 2004 of receiving an influent through an inlet 236 of a reactor 300. For example, the influent may be transferred through the inlet 236 via one or more pumps 1824 operatively coupled to the inlet 236 via tubing.

In embodiments, the method 2000 includes a step 2008 of driving the influent through the solid support 424 of the reactor 300. The reactor may include any method or technology to drive, bias, or force, the influent through the solid support 424 including but not limited to: translating a first piston 220 to push or bias the influent into the solid support; using pressurized inert gas to push the influent into the solid support 424; or forcing the influent through the solid support 424 via pumps operating at specific flow rates or flow pressures.

In embodiments, the method 2000 includes a step 2012 of measuring at least one characteristic of the influent as the influent flows through the solid support 424 and/or at least one characteristic of the effluent as the effluent leaves the reactor 300 and/or at least one characteristic of the flow inside the reactor 300. The at least one characteristic may include but not be limited to one or more load readings, one or more pressure readings, one or more UV readings, one or more temperature readings, one or more pH readings, one or more conductivity readings, one or more influent flow readings, or any other type of influent characteristic.

In embodiments, the method 2000 includes a step 2016 of changing a parameter of the reactor 300 or influent and/or effluent based on a measurement of the at least one characteristic. For example, the reactor 300 may change one or more parameters including but not limited to a first piston position, a second piston position, the temperature of the reactor 300 (e.g., via heat exchangers 1308), the vibration of the reactor 300 (e.g., via signal generators 912), influent pump speed, influent pressure limits, or paddle speed (e.g., via paddles 812). The method 2000 further includes a step 2020 of releasing the effluent via the outlet 237 of the reactor 300.

FIG. 24 shows that in certain embodiments the modular flow distributor can include three main parts: distributor head, distributor cap, and filter. These parts can be made of different chemical resistant materials including, but not limited to, natural PEEK, stainless steel, and Teflon. The distributor head may include inlet/input ports for influent, cross flows, and/or sensors, and may also include branched outlets to more uniformly distribute the influent on and through the filter. Although the cross-sectional views in FIG. 24 show two branched outlets extending from the central outlet, in various embodiments any number of branches may extend outward (e.g., the assembled view in the upper right panel shows six openings in the face of the distributor head corresponding to six branches extending outward from the central outlet). FIG. 24 also shows a slot in the distributor head for an inner O-ring and a slot in the distributor cap for an outer O-ring. Although only one O-ring slot is shown in the distributor head and the distributor cap in FIG. 24, in various embodiments either or both components can have any number of O-rings. In certain embodiments, a fixed amount of head space may be present between the face of the distributor head and the filter screen. In some embodiments, the head space may contain at least one of a filter, a porous material, a screen, or a reagent. Instead, in certain embodiments the porous outer piston may be replaced by a filter screen and the fixed head space may be directly designed into the inner piston head itself, similar to the assembly shown in FIG. 24. In particular embodiments, a flow distributor may be used in one or both of the inlet and outlet side of the chamber to further improve uniform flow (e.g., FIG. 5B). In general, the flow distributor includes a central channel (coupled to an inlet or an outlet) and a number of flow distribution channels extending radially outward from the central channel and terminating at the face of the flow distributor which faces the chamber; at the inlet side the flow distribution channels evenly distribute the influent across the reaction chamber while at the outlet side the flow distribution channels evenly collect the effluent from the across the reaction chamber and channel this to the outlet, as shown in FIG. 5B.

FIG. 25 shows different parts of a modular flow distributor, which in some embodiments may be used with a large diameter column. The right-hand panels in FIG. 25 show that the distributor can be made of different materials (e.g., 3D printed SS-316L or CNC-machined PEEK) but is not limited to the materials shown in the figure, and furthermore can be manufactured via procedures including 3D printing, CNC machining, etc.

FIG. 26 shows another design of a modular flow distributor which in various embodiments may be used for smaller diameter columns. Similar to the modular flow distributor for large diameter columns, the distributor of FIG. 26 includes three main parts: distributor head, distributor cap, and filter, and can be made of different chemical resistant materials including but not limited to natural PEEK, stainless steel, and Teflon. The distributor head of FIG. 26 includes one or more inlet ports for influent, cross flows, and/or sensors, and also may have branched outlets to more uniformly distribute the influent on and through the filter.

Figure 27:
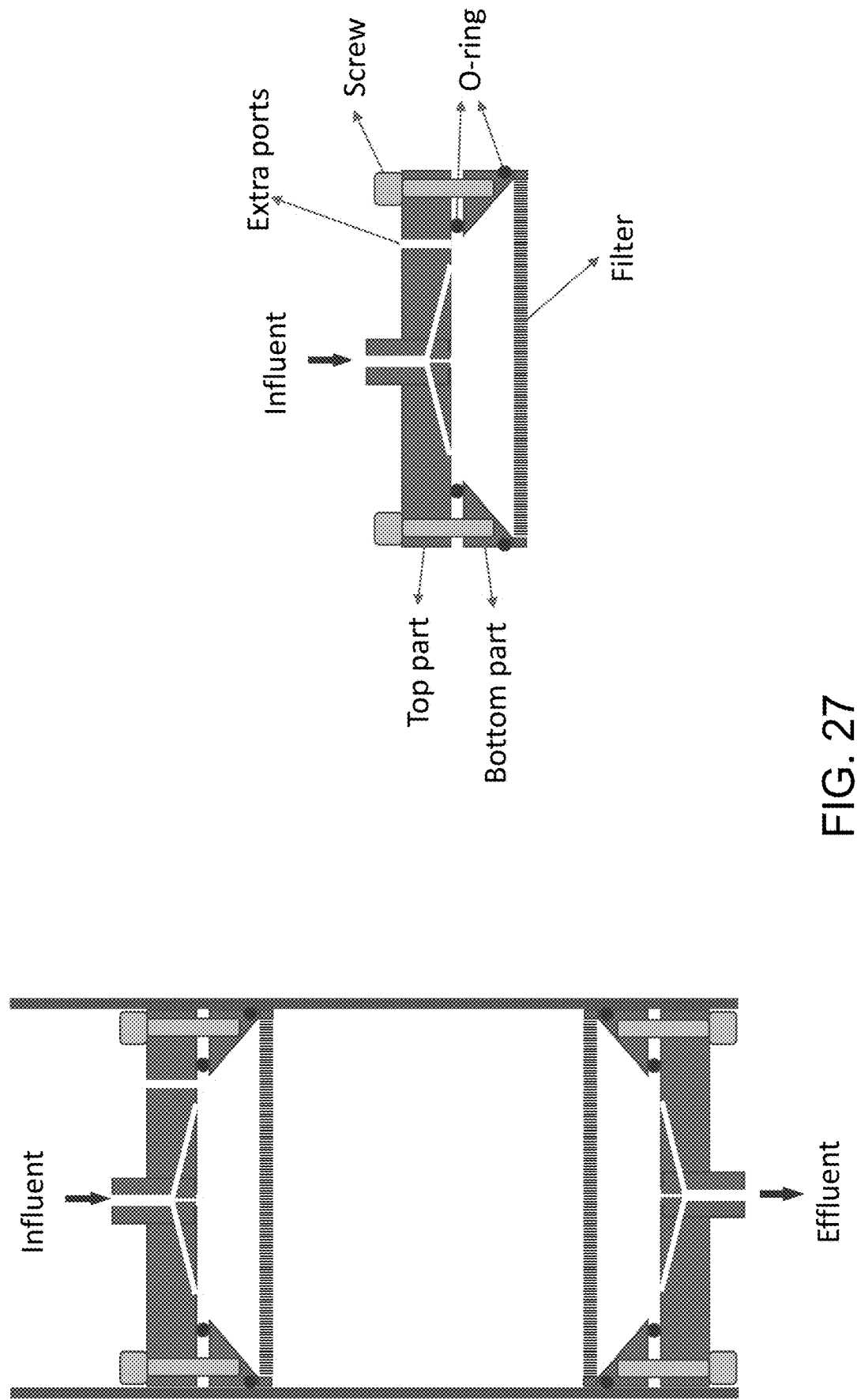

FIG. 27 shows another design of a modular flow distributor which may include two top and bottom parts that may be clamped together using screws or other suitable fasteners. The top part may include the inlet ports for influent, sensors, etc., while the bottom part includes the filter which can be regularly cleaned by unclamping the top and bottom parts.

Figure 28:
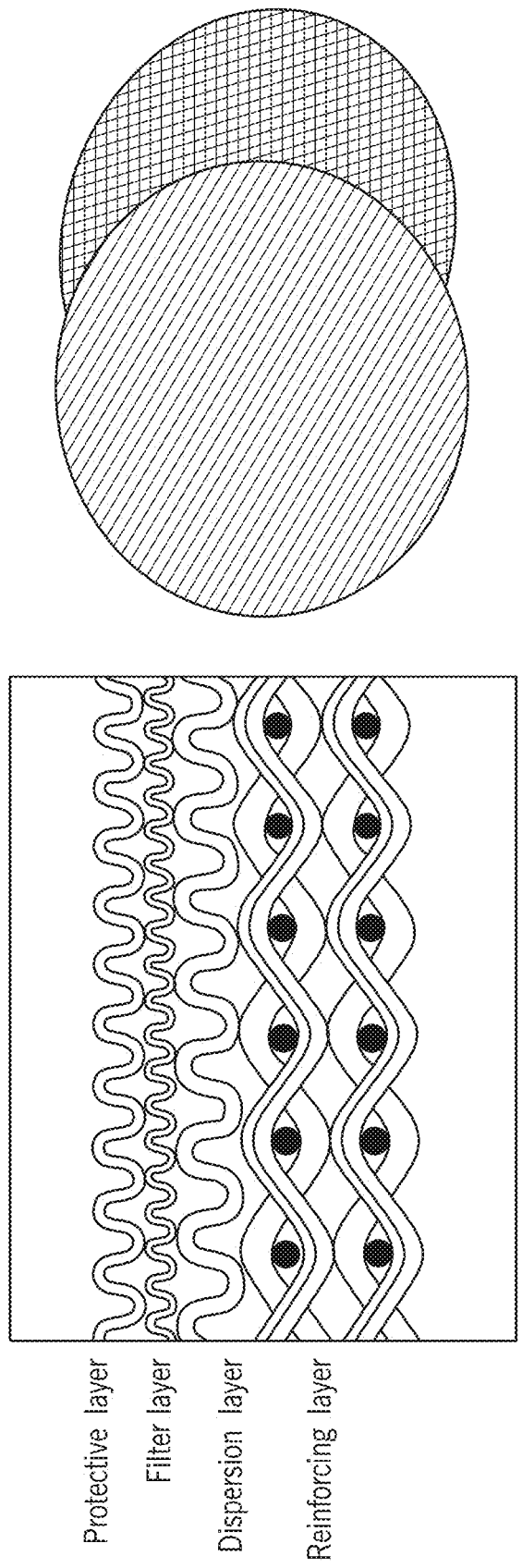

FIG. 28 shows embodiments of stainless-steel wire mesh sintered filter discs which include multi-layer structures with different pore sizes at each layer. The pore size of the filter layer is selected such that it increases the ratio of lateral flow to axial flow, hence improving the uniform flow distribution, and it is also selected such that does not let the target particle size (smallest particles) pass through it.

Figure 29:
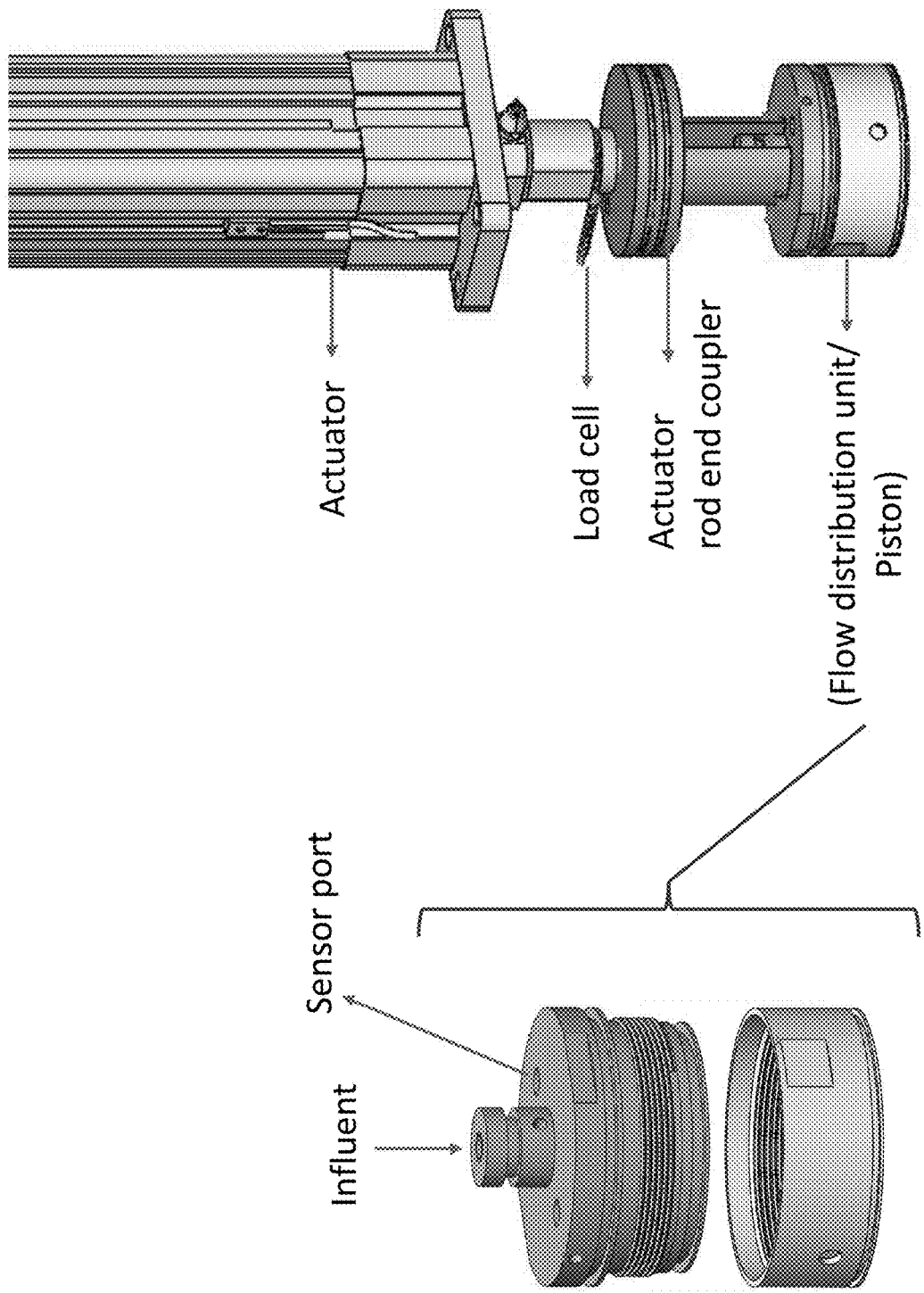

FIG. 29 shows a mechanically actuated system (linear actuator) to drive the piston (modular flow distributor) within the column in response to feedback received from sensors/detectors. The detailed view on the left shows an exploded view of the modular flow distributor assembly and the main drawing on the right shows how the modular flow distributor assembly (which is part of the piston) is coupled to a load cell by an actuator rod end coupler, where the load cell in turn is connected to the actuator. As disclosed herein the load cell is used to monitor reactions, and hence the real-time conditions inside the column, by measuring the force on one or both of the pistons.

Figure 30:
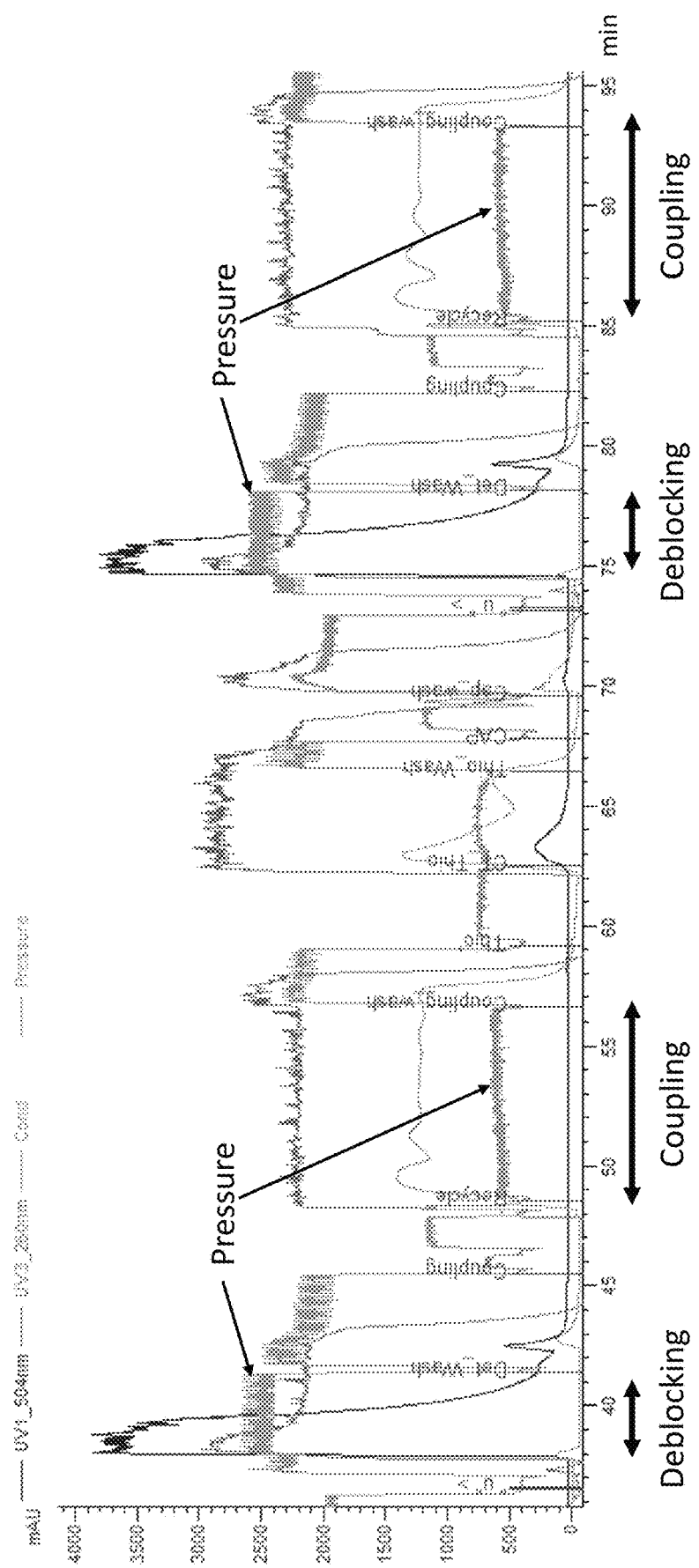
FIG. 30 shows data collected from a synthesis system at different stages during oligonucleotide synthesis.

FIG. 30 shows data collected from a synthesis system at different stages during solid state oligonucleotide synthesis. In particular, FIG. 30 shows data from sensors (UV1, 504 nm; UV3, 260 nm; Cond (conductivity); and Pressure) which monitor the progress of various parameters during two cycles of deblocking and coupling (each cycle indicated by the horizontal arrows below the graph). The data in FIG. 30 shows that dynamic adjustment of the column height, by real-time positioning of the piston which is integrated with one or more load cells, affects the pressure distributions which represent the real-time conditions inside the column, which can be monitored by reading the loadcell set values. In this particular case, the piston moves down (hence reducing the column volume) during the deblocking step when the protection groups are removed from the bases, and conversely the piston moves up (hence increasing the column volume) when new bases are added to the previous bases. As a result, pressure remains almost constant during these two steps (see labels in FIG. 30).

Figure 31:
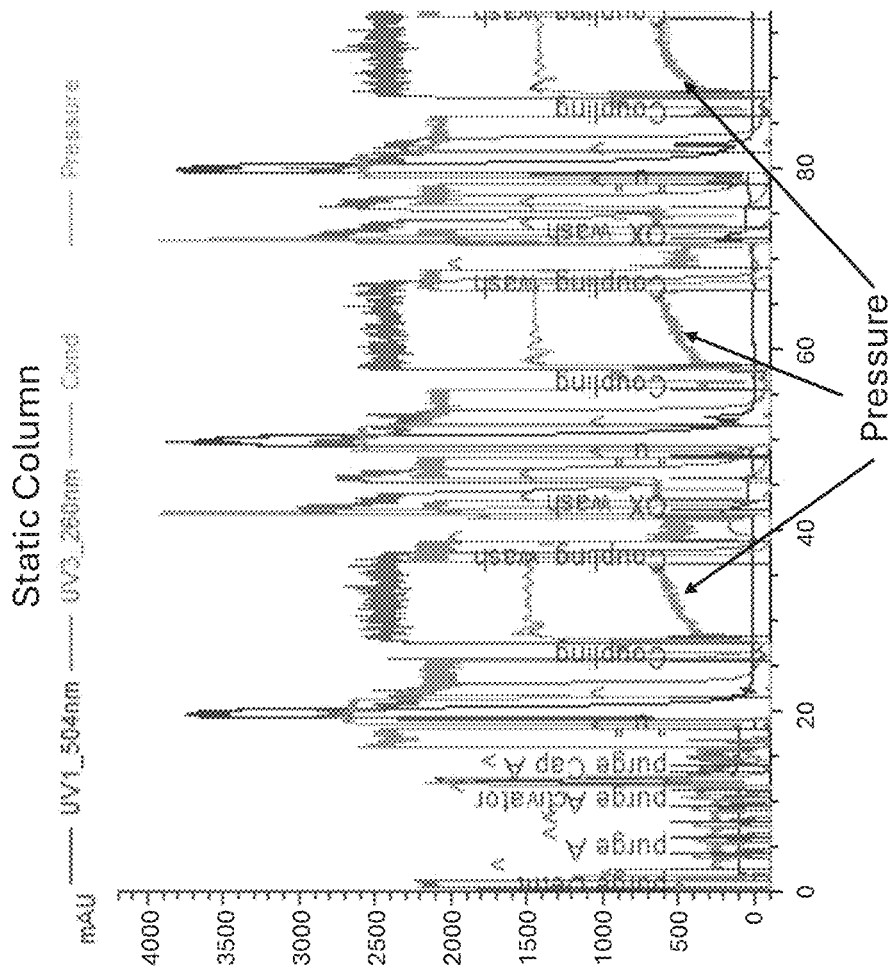
FIG. 31 shows data collected from a synthesis system at different stages during oligonucleotide synthesis, comparing a static column (left) to a column that is dynamically adjusted during operation (right).
Figure 31:
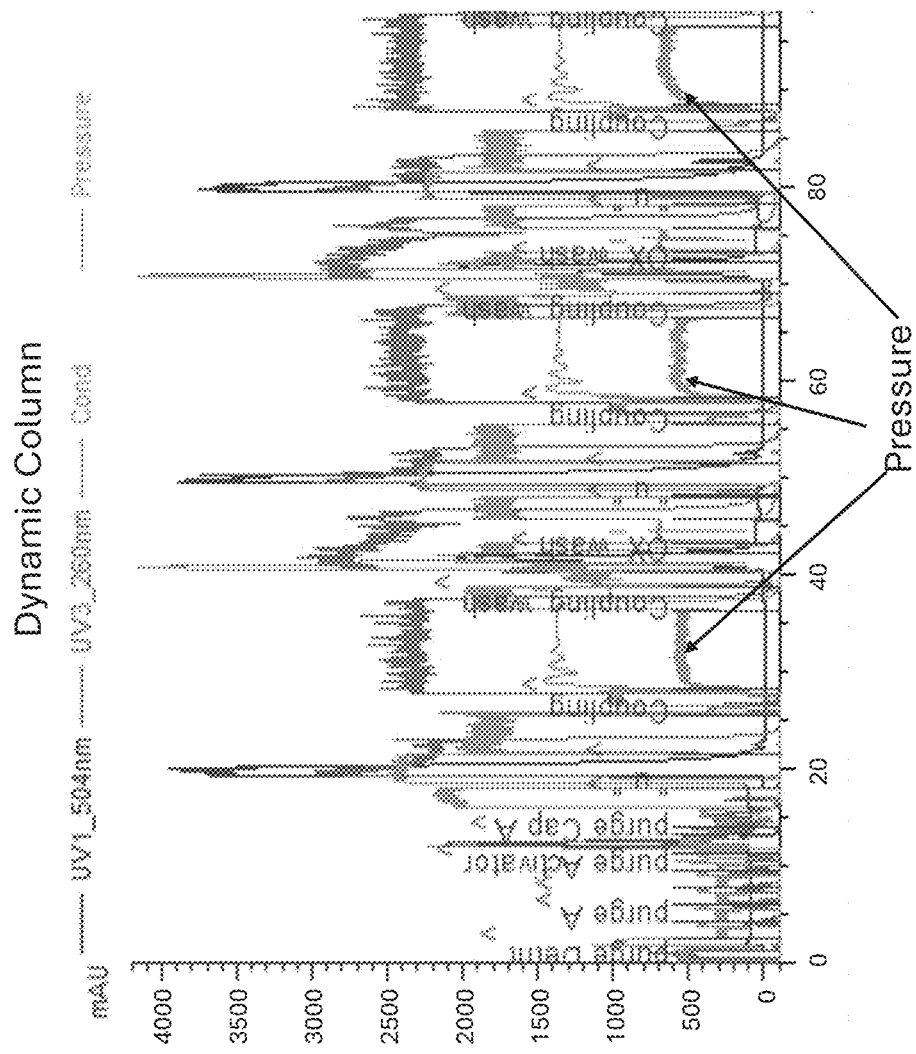

FIG. 31 shows data collected from a synthesis system at different stages during oligonucleotide synthesis, comparing a static column (left) to a column that is dynamically adjusted during operation (right), with time in minutes being indicated on the x-axis; it should be noted that in a "static" column the volume of the reaction space is held fixed during the reaction which can result in pressure changes, whereas in a dynamic column the volume of the reaction space is adjusted dynamically which can adjust the pressure during the reactions (e.g., to hold the pressure at or near a constant level or to adjust to the pressure based on desired characteristics). FIG. 31 demonstrates how changes in pressure during synthesis lead to the dynamic adjustment of the column's height via real-time motion of the piston in response to conditions inside the column which are read by sensors (e.g., load cells, pressure sensors etc.) compared to that of in a static column. As shown in the left panel of FIG. 31 (static column) the pressure increases over the course of the coupling step as the oligo length increases. However, as shown in the right panel of FIG. 31 (dynamic column) the pressure remains steady due to the feedback-driven adjustment of the volume of the column via movement of the piston(s).

Figure 32:
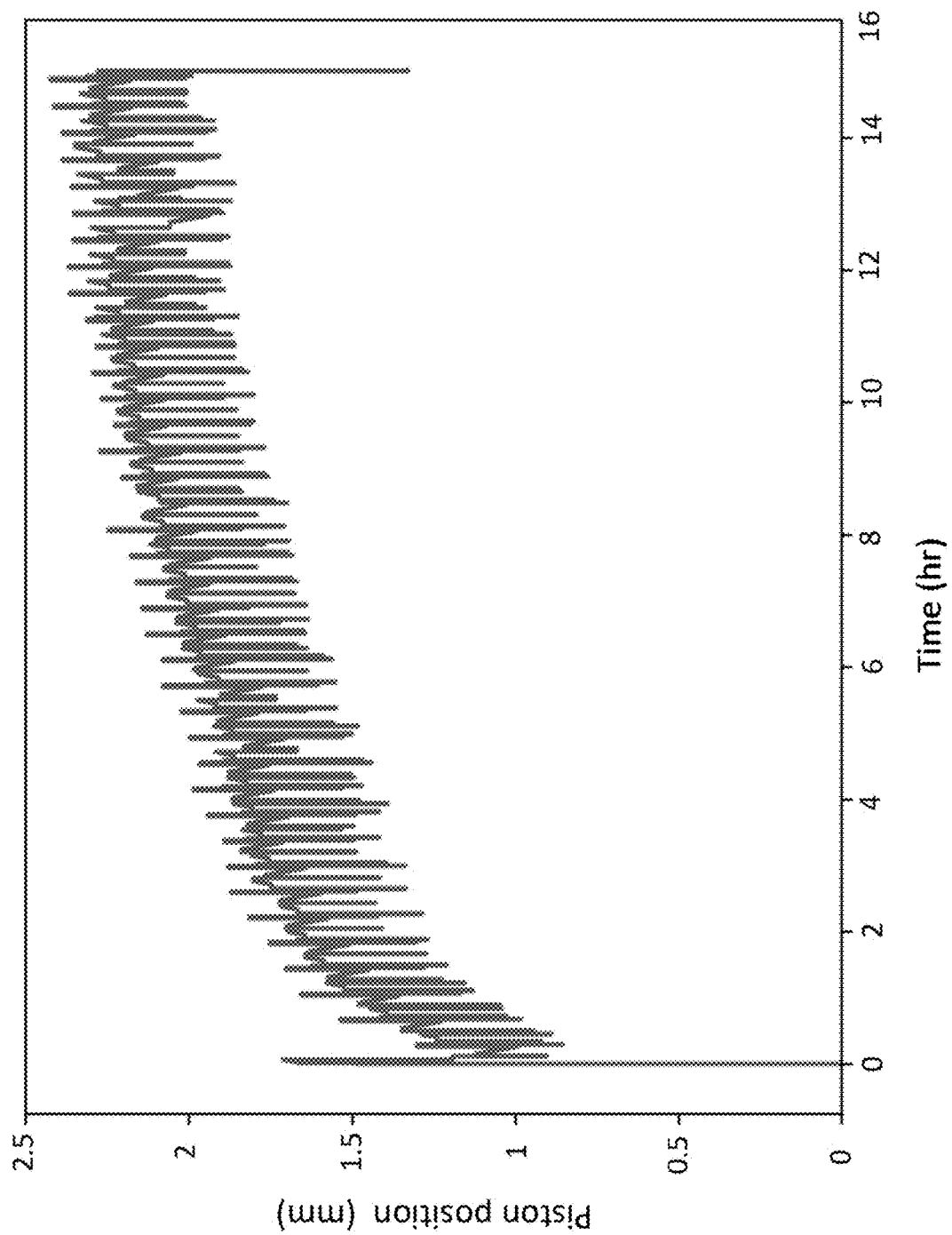
FIG. 32 shows a position of a piston during operation of a dynamic column.

FIG. 32 shows a position of a piston during operation of a dynamic column. The trace in FIG. 32 presents real-time position changes (movement) of the piston inside a dynamic column during synthesis, where the time is indicated in hours on the x-axis. Depending on how the various parameters have been set, the volume of the column increases (i.e., there is a net change in piston position increases) over the long period of a synthesis, over which the length of the oligomer increases. As shown in FIG. 32, the piston undergoes a regular pattern of increases and decreases in position corresponding to each cycle of extension of the oligonucleotides. As the overall length of the oligonucleotides grows from the start of the trace to the finish, there is a net upward movement in the position of the piston which represents the increase of volume of the solid state material (e.g., resin) inside the reaction chamber.

FIGS. 33A-33D show data indicating quality and quantity of a 100-bp oligo synthesized using several known systems (labeled "control") compared to the same oligo prepared using the presently-disclosed procedures (labeled "current invention"). These data show the quality and quantity of a particular 100-base long oligomer synthesized using several known/commercially-available "control" column systems compared to columns which incorporate the presently-disclosed features.

Figure 33A:
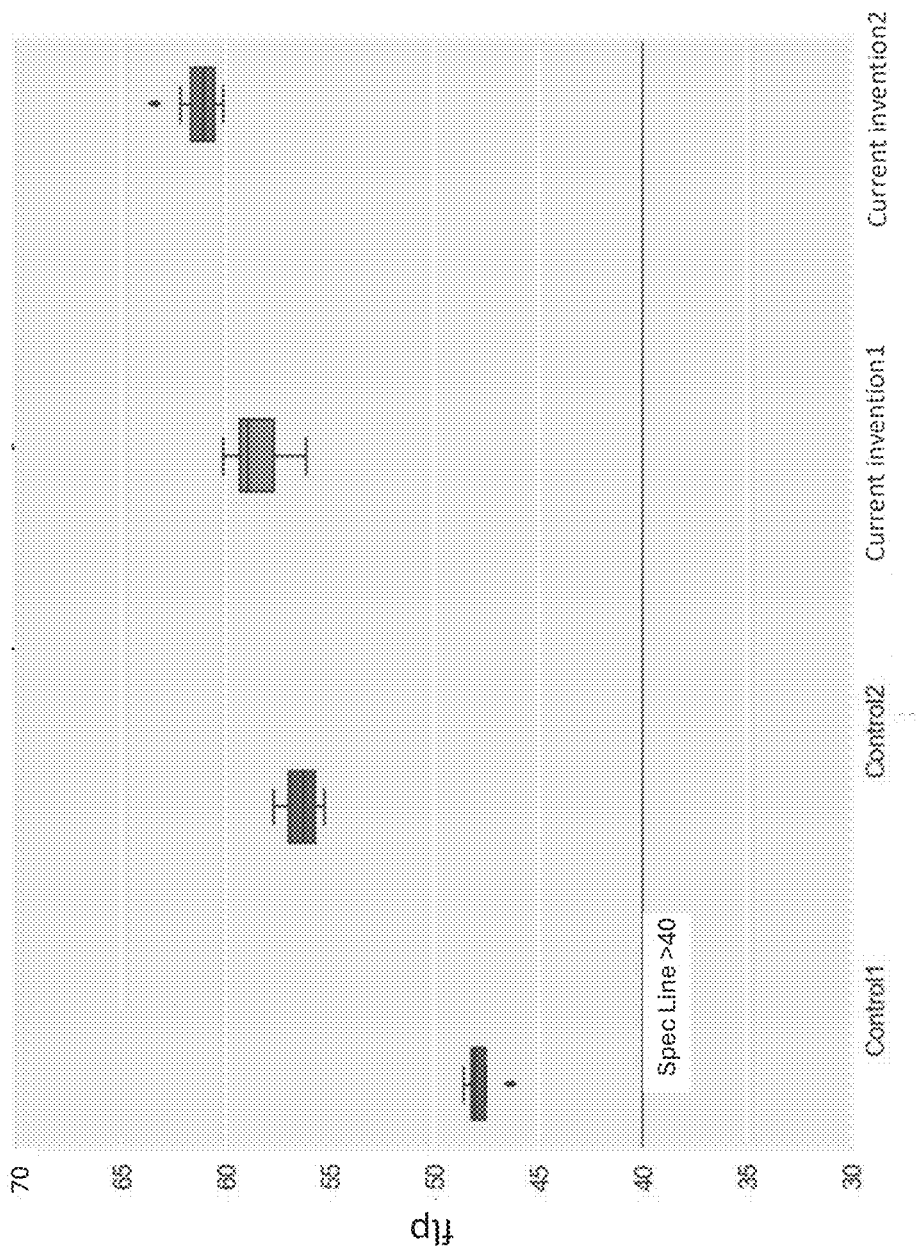
FIGS. 33A-33D show data indicating quality and quantity of a 100-bp oligo synthesized using several known systems (labeled "control") compared to the oligo prepared using the presently-disclosed procedures (labeled "current invention").
Figure 33B:
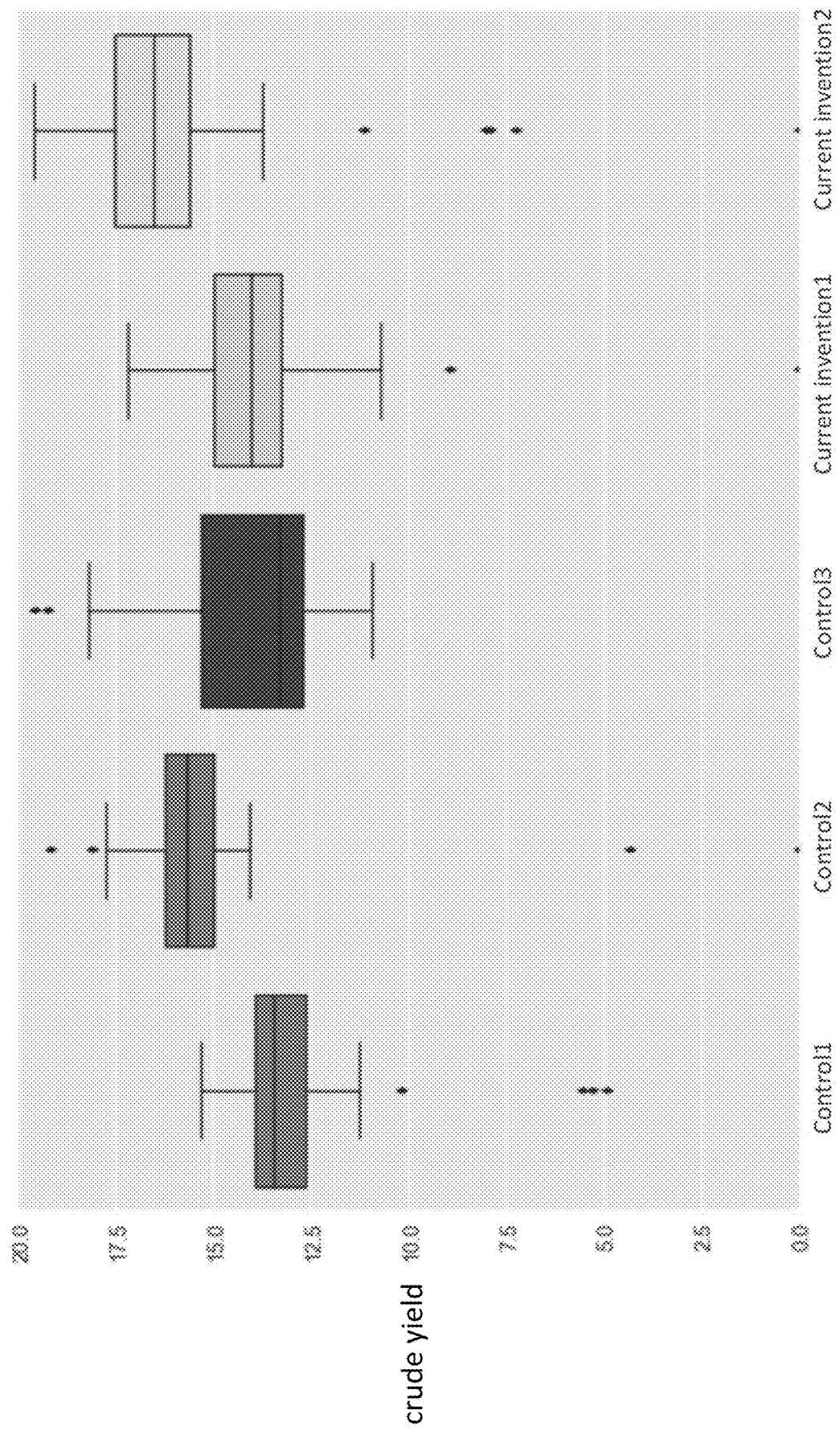
Figure 33C:
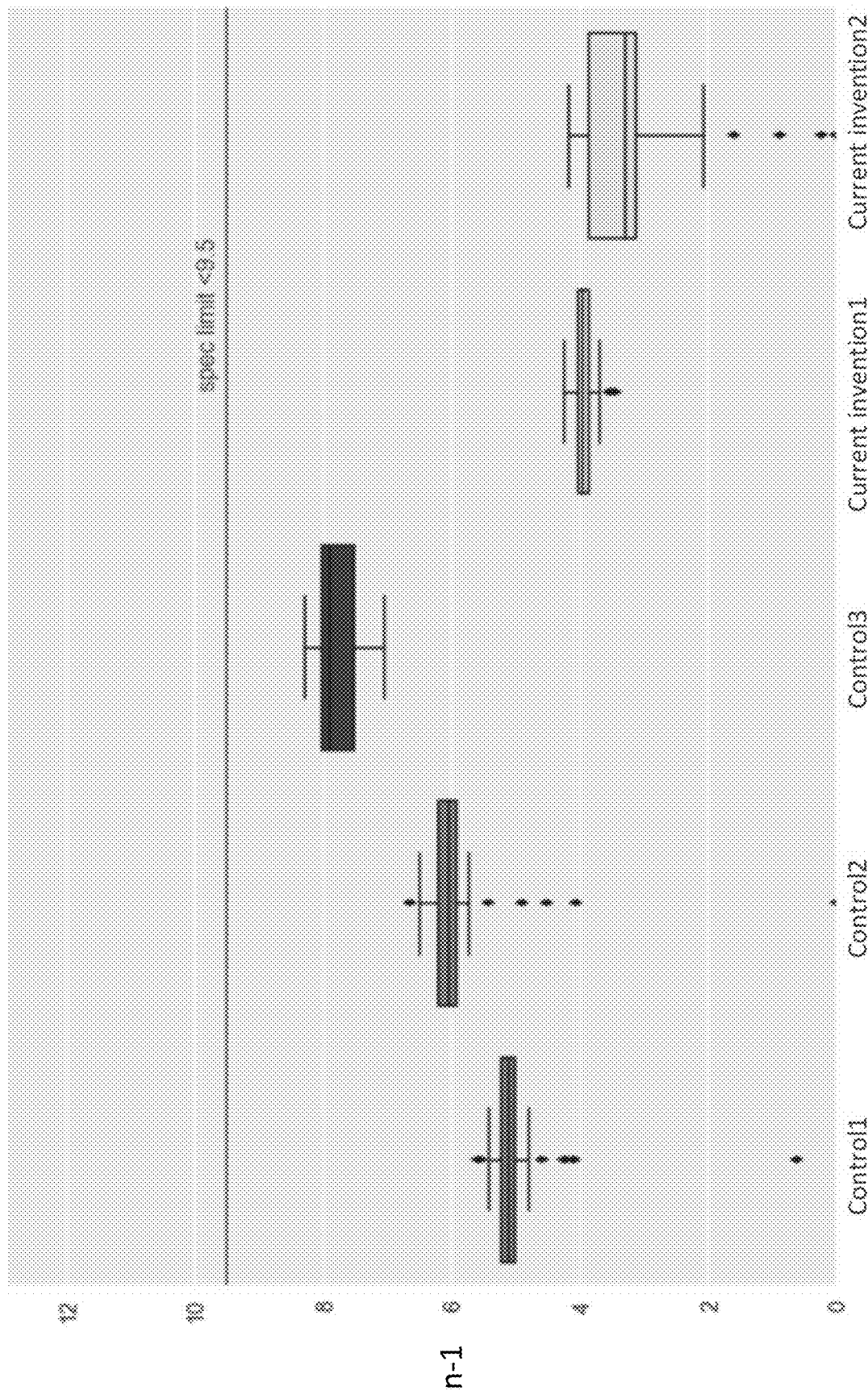
Figure 33D:
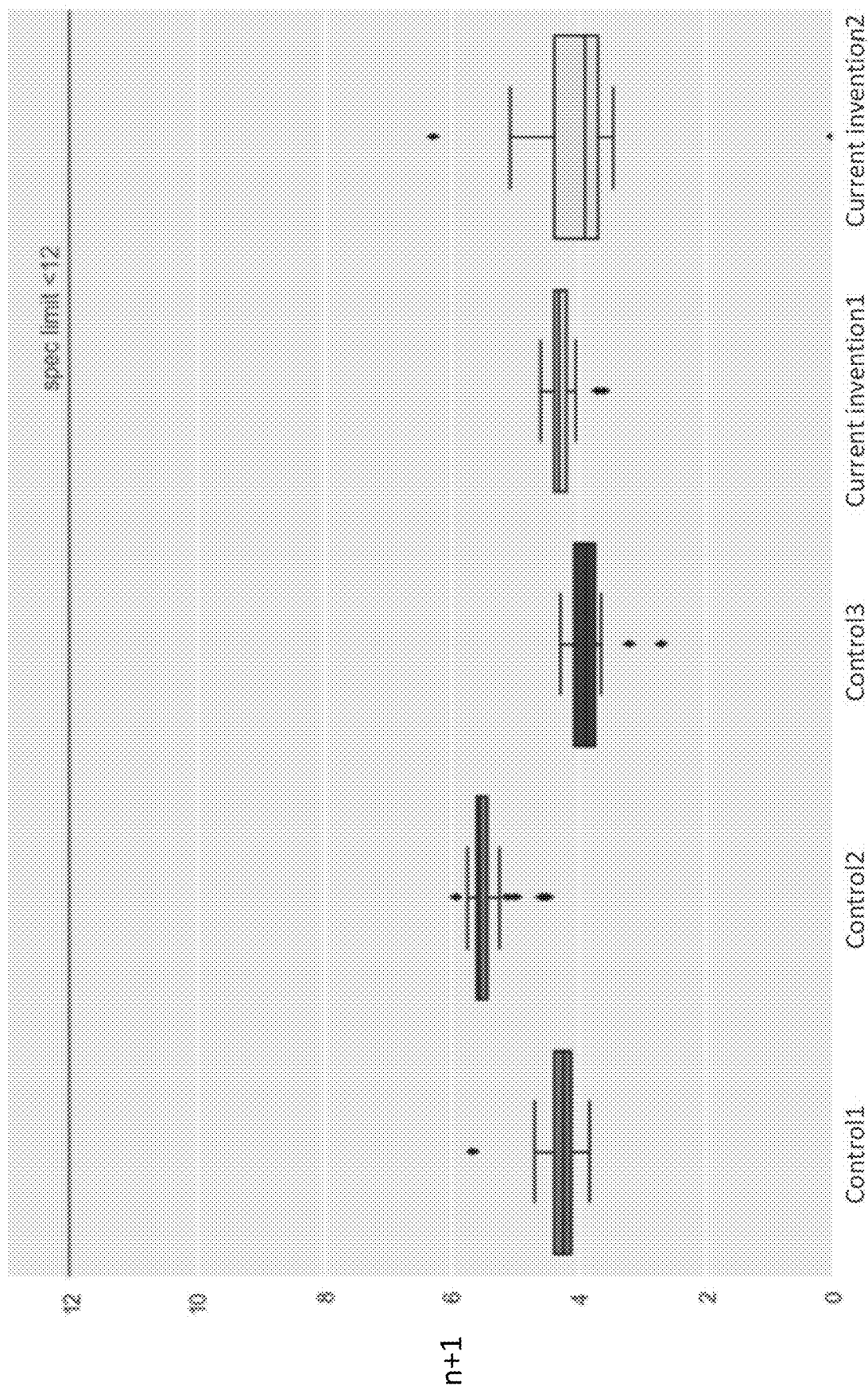

The performance of synthesis columns can be quantified in several ways. First, a high percentage of full-length oligonucleotides (i.e., full-length product or 'flp,' measured in percentage) is desired. The data presented in FIG. 33A shows that the average full-length oligomer is higher when using the current invention compared to the control systems. Second, oligomer synthesis columns should produce a high crude yield so there is enough product to be purified. FIG. 33B shows that the crude yield (measured in nmol) obtained using the disclosed synthesis systems is comparable to, or even greater than, the yield obtained with known/commercially-available "control" column systems. The graphs in FIGS. 33C and 33D show the amounts (indicated as percentages) of impurities with one missing base (FIG. 33C, n−1) or one extra base (FIG. 33D, n+1) for oligonucleotides synthesized using each of the known systems (controls) and the presently-disclosed procedures (current invention). The "spec limit" in each graph represents a maximum tolerable percentage of the particular impurity which can exist in the as-synthesized product before beginning further purification by HPLC or other post-processing techniques, where the spec limit can be determined in a number of ways (e.g., standard procedures, customer preference, etc.).

Figure 34A:
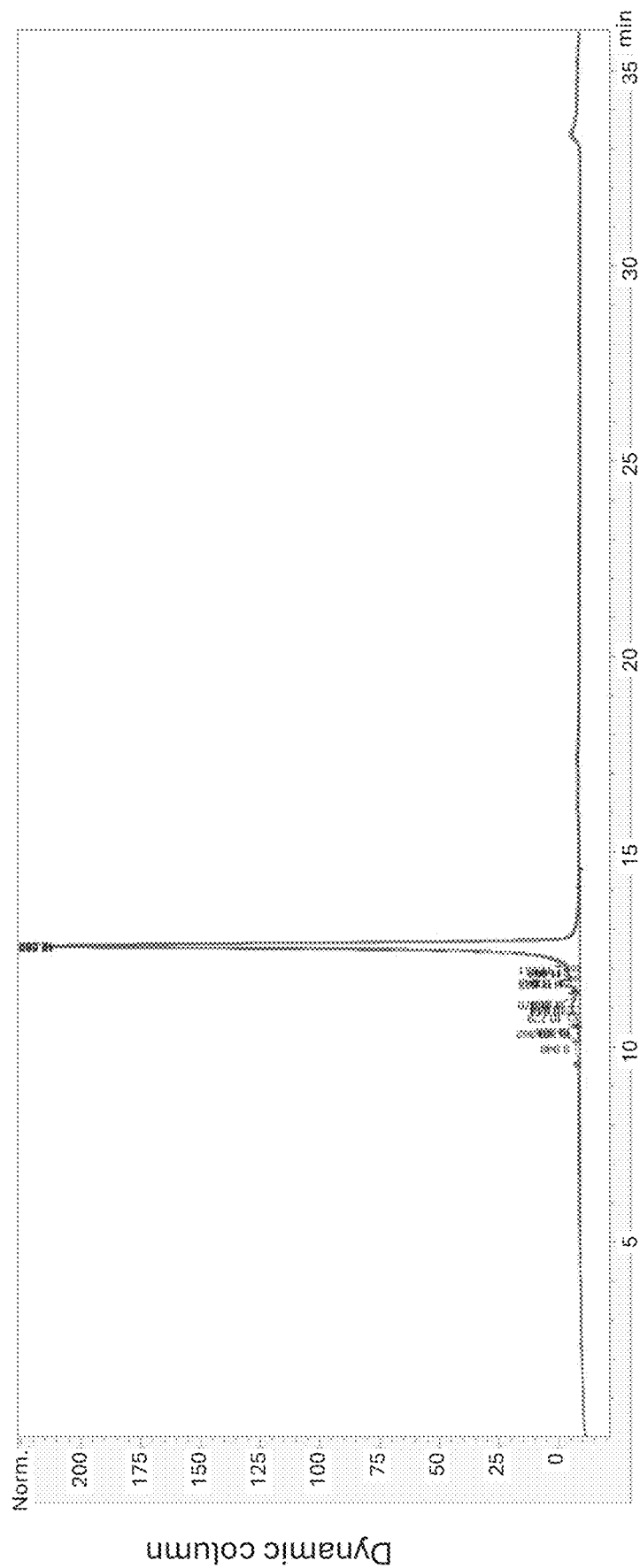
FIGS. 34A-34B show HPLC data for oligos prepared using dynamic (FIG. 34A) or static (FIG. 34B) pistons.
Figure 34B:
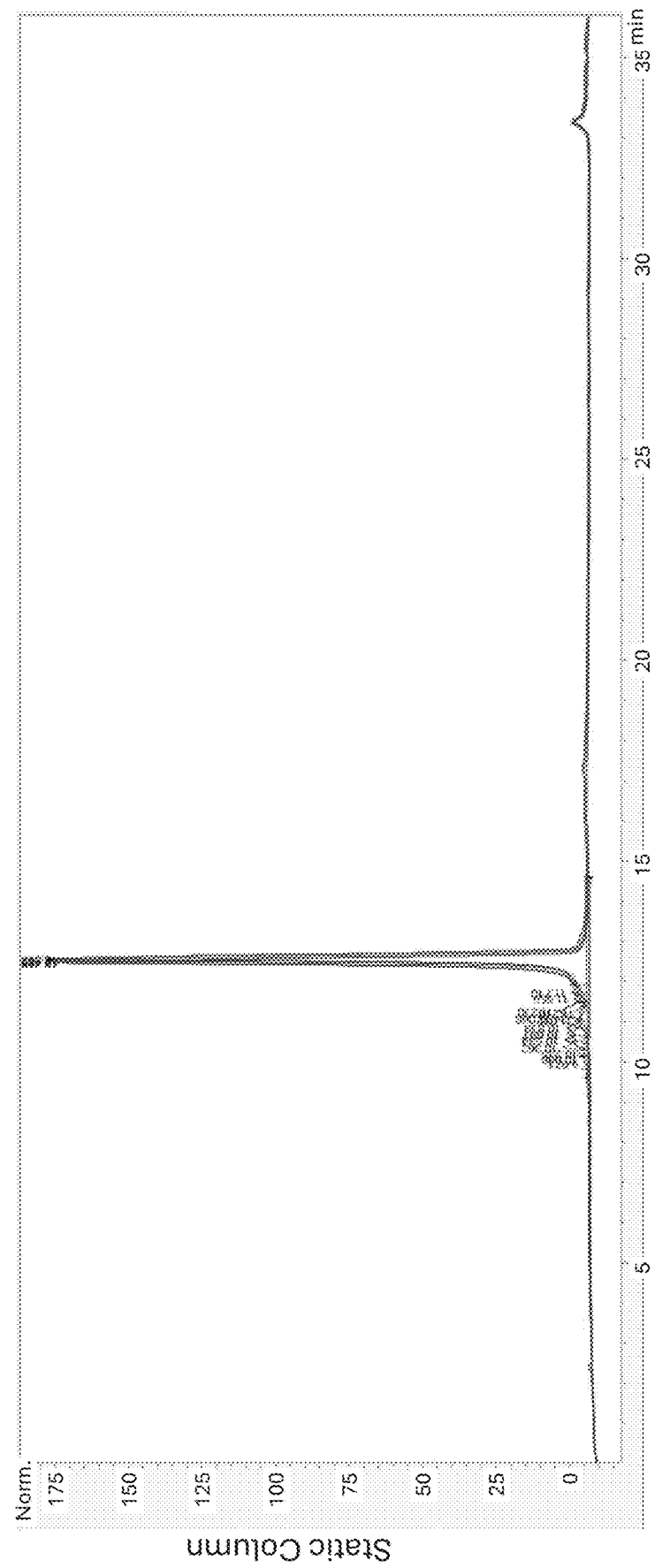

FIGS. 34A and 34B show data obtained from the output of HPLC columns for oligomers prepared using dynamic (FIG. 34A) or static (FIG. 34B) pistons. In particular, FIGS. 34A and 34B show analytical HPLC histograms for oligomers prepared using synthesis columns with a dynamic (FIG. 34A) or static (FIG. 34B) piston, i.e., with a column having a variable/adjustable column height or a fixed column height, respectively. In each of the graphs of FIGS. 34A and 34B, the area under the main large peak represents the purity percentage of the synthesized oligomers, which are above 70-80% even for a relatively long oligomer such as one that is 80 bases long.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A reactor system, comprising:
   a vessel configured to contain a solid support, the vessel comprising:
      a vessel wall defining a reaction chamber,
         the reaction chamber having a first end and a second end opposite the first end;
   a piston operatively arranged at the first end and configured to translate within the reaction chamber,
      the piston comprising a piston head coupled to a piston shaft, and
      the piston head comprising a plurality of crossflow ports disposed therein;
   a force measuring device attached to the piston shaft and configured to measure a load on the piston shaft;
   a piston driver coupled to the piston shaft; and
   a processor operably coupled to the force measuring device and the piston driver, the processor configured to:
      measure a load on the piston shaft using the force measuring device,
      adjust a position of the piston using the piston driver based on measuring the load on the piston shaft, and
      move fluid into and out of a space adjacent to the piston head using the plurality of crossflow ports.

2. The reactor system of claim 1, further comprising:
   an inlet disposed at the first end of the reaction chamber and configured to receive an influent; and
   an outlet disposed at the second end of the reaction chamber and configured to release an effluent.

3. The reactor system of claim 2, wherein the piston further comprises a flow distribution unit coupled to the piston shaft and disposed within the vessel adjacent the reaction chamber,
   wherein the flow distribution unit comprises a plurality of flow distribution channels,
   wherein a first end of each of the plurality of flow distribution channels is fluidly coupled to the inlet, and
   wherein a second end of each of the plurality of flow distribution channels is fluidly coupled to the reaction chamber.

4. The reactor system of claim 3, wherein the flow distribution unit comprises a modular flow distribution unit comprising a distributor head coupled to a distributor cap with a filter disposed therebetween,
   wherein the plurality of flow distribution channels is disposed within the distributor head.

5. The reactor system of claim 1, further comprising a pressure sensor operatively coupled to the processor and configured to measure a pressure within the vessel,
   wherein the processor is further configured to:
      obtain a measurement of the pressure within the vessel from the pressure sensor, and
      adjust the pressure within the vessel based on the measurement of the pressure comprising at least one of adjusting the position of the piston or actuating a pressure-control device comprising a valve.

6. The reactor system of claim 1, further comprising a solid support disposed within the reaction chamber,
   wherein the solid support is configured to support at least one of: oligonucleotide synthesis, pretreatment, cleavage, deprotection, or purification.

7. The reactor system of claim 1, wherein the piston is a first piston, and
   wherein the system further comprises:
      a second piston operatively arranged at the second end of the reaction chamber and configured to translate within the reaction chamber.

8. The reactor system of claim 1, wherein the vessel further comprises at least one of:
   a sampling port,
   a loading port configured to facilitate loading of the solid support into the reaction chamber, or
   an unloading port configured to facilitate unloading of the solid support out of the reaction chamber.

9. The reactor system of claim 1, wherein the force measuring device comprises at least one of a load cell or a strain gauge, and
   wherein the piston driver drives the piston using at least one of mechanical, hydrodynamic, or pneumatic force.

10. The reactor system of claim 1, wherein the load on the piston shaft measured by the force measuring device is proportional to a pressure within the reaction chamber.

11. The reactor system of claim 2, further comprising a sensor coupled to the inlet, wherein the sensor comprises at least one of a flow sensor, a pH sensor, a conductivity sensor, a thermal sensor, a spectrometer, a Raman sensor, or a mid-IR sensor.

12. The reactor system of claim 2, further comprising a fluid conditioner fluidly coupled to the inlet, wherein the fluid conditioner comprises at least one of a heat exchanger, a degasser, a de-bubbler, or a gas dryer.

13. The reactor system of claim 1, wherein the piston comprises a flow distribution plate coupled to the piston shaft and comprising a plurality of pores.

14. The reactor system of claim 13, wherein the plurality of pores of the flow distribution plate comprises different size openings, and
   wherein the different size openings of the plurality of pores are distributed in a radial pattern across the flow distribution plate.

15. The reactor system of claim 1, wherein the processor is further configured to:
   collect a plurality of real-time data based on obtaining a plurality of measurements of the load on the piston shaft using the force measuring device,
      wherein the plurality of real-time data indicates at least one of a reaction chemistry or flow dynamics within the reaction chamber, and
   adjust the position of the piston using the piston driver based on collecting the plurality of real-time data to adjust at least one of a system or operational parameter in real time.

16. A method of operating a reactor, the method comprising:
  providing a vessel configured to contain a solid support, the vessel comprising:
    a vessel wall defining a reaction chamber,
      the reaction chamber having a first end and a second end opposite the first end,
    a piston operatively arranged at the first end and configured to translate within the reaction chamber, the piston comprising a piston head coupled to a piston shaft, and
      the piston head comprising a plurality of crossflow ports disposed therein,
    a force measuring device attached to the piston shaft and configured to measure a load on the piston shaft,
    a piston driver coupled to the piston shaft, and
    a processor operably coupled to the force measuring device and the piston driver;
  measuring, using the processor, a load on the piston shaft using the force measuring device;
  adjusting, using the processor, a position of the piston using the piston driver based on measuring the load on the piston shaft; and
  moving, using the processor and via the plurality of crossflow ports, fluid into and out of a space adjacent to the piston head.

17. The method of claim 16, wherein providing a vessel further comprises:
  providing an inlet disposed at the first end of the reaction chamber and configured to receive an influent, and
  providing an outlet disposed at the second end of the reaction chamber and configured to release an effluent; and
  wherein the method further comprises at least one of:
    delivering the influent to the reaction chamber via the inlet, or
    obtaining the effluent from the reaction chamber via the outlet.

18. The method of claim 17, wherein providing the vessel further comprises:
  providing the force measuring device comprising at least one of a load cell or a strain gauge, and
  providing the piston driver wherein the piston driver drives the piston using at least one of mechanical, hydrodynamic, or pneumatic force.

19. The method of claim 16, wherein providing the vessel further comprises:
  providing a pressure sensor coupled to the reaction chamber; and
  wherein the method further comprises:
  measuring a pressure within the reaction chamber using the pressure sensor.

20. The method of claim 19, wherein, upon measuring an increase in pressure, adjusting the position of the piston further comprises:
  adjusting the position of the piston to increase a volume of the reaction chamber and reduce a pressure within the reaction chamber.

21. The method of claim 19, wherein providing the vessel further comprises:
  providing a sensor coupled to the inlet,
    wherein the sensor comprises at least one of a flow sensor, a pH sensor, a conductivity sensor, a thermal sensor, a spectrometer, a Raman sensor, or a mid-IR sensor; and
  wherein delivering the influent to the reaction chamber further comprises:
  measuring a property of the influent using the sensor.

22. The method of claim 18, wherein providing the vessel further comprises:
  providing a fluid conditioner coupled to the inlet,
    wherein the fluid conditioner comprises at least one of a heat exchanger, a degasser, a de-bubbler, or a gas dryer; and
  wherein delivering the influent to the reaction chamber further comprises:
  adjusting a property of the influent using the fluid conditioner.

23. The method of claim 18, wherein providing the vessel further comprises:
  providing a flow distribution unit coupled to the piston shaft and disposed within the vessel adjacent the reaction chamber,
    wherein the flow distribution unit is fluidly coupled to the inlet; and
  wherein delivering the influent to the reaction chamber further comprises:
  delivering the influent to the reaction chamber using the flow distribution unit.

24. The method of claim 23, wherein providing the flow distribution unit further comprises:
  providing the flow distribution unit,
    wherein the flow distribution unit comprises a plurality of flow distribution channels,
    wherein a first end of each of the plurality of flow distribution channels is fluidly coupled to the inlet, and
    wherein a second end of each of the plurality of flow distribution channels is fluidly coupled to the reaction chamber; and
  wherein delivering the influent to the reaction chamber further comprises:
  delivering the influent to the reaction chamber using each of the plurality of flow distribution channels of the flow distribution unit.

* * * * *